United States Patent
Ji et al.

(10) Patent No.: US 8,512,908 B2
(45) Date of Patent: *Aug. 20, 2013

(54) FABRICATION OF CATALYST COATED DIFFUSION MEDIA LAYERS CONTAINING NANOSTRUCTURED THIN CATALYTIC LAYERS

(75) Inventors: Chunxin Ji, Penfield, NY (US); Matthew Dioguardi, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 634 days.

This patent is subject to a terminal disclaimer.

(21) Appl. No.: 12/718,306

(22) Filed: Mar. 5, 2010

(65) Prior Publication Data

US 2010/0291467 A1  Nov. 18, 2010

Related U.S. Application Data

(63) Continuation-in-part of application No. 12/465,913, filed on May 14, 2009.

(51) Int. Cl.
 *H01M 8/10* (2006.01)
 *H01M 4/02* (2006.01)
 *H01M 8/00* (2006.01)
 *B44C 1/165* (2006.01)
 *B01J 31/00* (2006.01)

(52) U.S. Cl.
 USPC ........... 429/483; 429/532; 429/535; 156/230; 502/159

(58) Field of Classification Search
 None
 See application file for complete search history.

(56) References Cited

U.S. PATENT DOCUMENTS

| | | | |
|---|---|---|---|
| 4,812,352 A | 3/1989 | Debe | |
| 4,940,854 A | 7/1990 | Debe | |
| 5,039,561 A | 8/1991 | Debe | |
| 5,175,030 A | 12/1992 | Lu et al. | |

(Continued)

FOREIGN PATENT DOCUMENTS

| CN | 1471186 A | 1/2004 |
|---|---|---|
| CN | 1560949 A | 1/2005 |

(Continued)

OTHER PUBLICATIONS

Chia-Liang Sun, et al., Unitrafine Platinum Nanoparticles Uniformly Dispersed on Arrayed CNx Nanotubes With High Electrochemical Activity, 2005 American Chemical Society, vol. 17, pp. 3749-3753, USA.

(Continued)

*Primary Examiner* — Ula C Ruddock
*Assistant Examiner* — Matthew Van Oudenaren
(74) *Attorney, Agent, or Firm* — Dinsmore & Shohl LLP

(57) ABSTRACT

A method of transferring nanostructured thin catalytic layers to a gas diffusion layer and thus making a catalyst coated diffusion media is described. The method includes treating the gas diffusion layer with a temporary adhesive to temporarily increase the adhesion strength within the microporous layer and to carbon fiber paper substrate, transferring the nanostructured thin catalytic layer to the microporous side of a gas diffusion media layer. The nanostructured thin catalytic layer can then be further processed, including adding additional components or layers to the nanostructured thin catalytic layer on the gas diffusion media layer. Preparation of catalyst coated diffusion media and a catalyst coated diffusion media based membrane electrode assembly (MEA) are also described.

13 Claims, 44 Drawing Sheets

(56) References Cited

U.S. PATENT DOCUMENTS

| | | | |
|---|---|---|---|
| 5,238,729 A | 8/1993 | Debe | |
| 5,273,615 A | 12/1993 | Asetta et al. | |
| 5,336,558 A | 8/1994 | Debe | |
| 5,338,430 A | 8/1994 | Parsonage et al. | |
| 5,674,592 A | 10/1997 | Clark et al. | |
| 5,879,827 A | 3/1999 | Debe et al. | |
| 5,879,828 A | 3/1999 | Debe et al. | |
| 6,238,534 B1 | 5/2001 | Mao et al. | |
| 6,482,763 B2 | 11/2002 | Haugen et al. | |
| 6,521,324 B1 | 2/2003 | Debe et al. | |
| 6,524,736 B1 | 2/2003 | Sompalli et al. | |
| 6,669,801 B2 * | 12/2003 | Yoshimura et al. | 156/230 |
| 6,770,337 B2 | 8/2004 | Debe et al. | |
| 7,041,373 B2 | 5/2006 | Mukasa et al. | |
| 7,419,741 B2 | 9/2008 | Vernstrom et al. | |
| 2003/0022403 A1 * | 1/2003 | Shimoda et al. | 438/14 |
| 2005/0067345 A1 | 3/2005 | Prugh et al. | |
| 2005/0095494 A1 | 5/2005 | Fuss et al. | |
| 2005/0233198 A1 | 10/2005 | Nuzzo et al. | |
| 2006/0204831 A1 * | 9/2006 | Yan et al. | 429/42 |
| 2007/0059452 A1 | 3/2007 | Debe et al. | |
| 2007/0059573 A1 | 3/2007 | Debe et al. | |
| 2007/0082256 A1 | 4/2007 | Debe et al. | |
| 2007/0082814 A1 | 4/2007 | Debe et al. | |
| 2007/0199649 A1 | 8/2007 | Sompalli et al. | |
| 2008/0020253 A1 * | 1/2008 | Neubert et al. | 429/30 |
| 2008/0020261 A1 * | 1/2008 | Hendricks et al. | 429/40 |
| 2008/0020923 A1 | 1/2008 | Debe et al. | |
| 2008/0143061 A1 | 6/2008 | Steinbach et al. | |
| 2008/0145712 A1 | 6/2008 | Pierpont et al. | |
| 2008/0182150 A1 * | 7/2008 | De Haan et al. | 429/34 |

FOREIGN PATENT DOCUMENTS

| | | |
|---|---|---|
| CN | 101263619 A | 9/2008 |
| EP | 1 381 102 A2 | 1/2004 |
| WO | 2007032903 A2 | 3/2007 |

OTHER PUBLICATIONS

Scott C. Warren, et al., Ordered Mesoporous Materials from Metal Nanoparticle-Block Copolymer Self-Assembly, www.sciencemag.org, vol. 320, Jun. 27, 2008, pp. 1748-1752, USA.

Mark K. Debe, et al., Advanced MEAs for Enhanced Operating Conditions, FY 2005 Progress Report, DOE Hydrogen Program, pp. 730-738.

T. Hatanaka, et al., PEFC Electrodes Based on Vertically Oriented Carbon Nanotubes, Toyota Motor Corporation, 210th ECS Meeting, Abstract #549, copyright ECS, Oct. 2006, 1 page.

Mark K. Debe, Advanced MEAs for Enhanced Operating Conditions, Amenable to High Volume Manufacture, 3M/DOE Cooperative Agreement No. DE-FC36-02AL67621, Fuel Components Program, 3M Company, May 24, 2004, pp. 1-27.

Mark K. Debe, NanoStructured Thin Film Catalysts (NSTFC) for Next Generation PEM Fuel Cells, Fuel Cell Components Program, Northern Nano Workshop, Nov. 9, 2006, University of Minnesota, pp. 1-38.

Chinese Office Action dated Aug. 31, 2012 relating to Chinese Patent Application No. 201010180223.2.

Non-Final Office Action dated Feb. 1, 2013 pertaining to U.S. Appl. No. 12/701,095, filed Feb. 5, 2010.

Non-Final Office Action dated Nov. 26, 2012 pertaining to U.S. Appl. No. 12/718,330, filed Mar. 5, 2010.

Non-Final Office Action dated Oct. 13, 2011 pertaining to U.S. Appl. No. 12/465,913, filed May 14, 2009.

Non-Final Office Action dated Apr. 13, 2012 pertaining to U.S. Appl. No. 12/465,913, filed May 14, 2009.

Non-Final Office Action dated Jun. 22, 2012 pertaining to U.S. Appl. No. 12/788,915, filed May 27, 2010.

Final Office Action dated Dec. 18, 2012 pertaining to U.S. Appl. No. 12/788,915, filed May 27, 2010.

* cited by examiner

FABRICATION OF CATALYST COATED DIFFUSION MEDIA LAYERS CONTAINING NANOSTRUCTURED THIN CATALYTIC LAYERS

RELATED CASES

This application is a Continuation-In-Part of U.S. application Ser. No. 12/465,913 filed May 14, 2009, entitled ELECTRODE CONTAINING NANOSTRUCTURED THIN CATALYTIC LAYERS AND METHOD OF MAKING, which is incorporated herein by reference.

This application is related to U.S. application Ser. No. 12/718,330, filed Mar. 5, 2010, entitled FABRICATION OF ELECTRODES WITH MULTIPLE NANOSTRUCTURED THIN CATALYTIC LAYERS; and U.S. application Ser. No. 12/701,095, filed Feb. 5, 2010, entitled PREPARATION OF NANOSTRUCTURED THIN CATALYTIC LAYER-BASED ELECTRODE INK, which are incorporated herein by reference.

FIELD OF THE INVENTION

The present invention relates generally to electrodes for fuel cells, and specifically to catalyst coated diffusion media containing nanostructured thin catalytic layers, and methods of making them.

BACKGROUND OF THE INVENTION

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with catalyst layers on both sides. The catalyst coated PEM is positioned between a pair of gas diffusion media layers, and a cathode plate and an anode plate are placed outside the gas diffusion media layers. The components are compressed to form the fuel cell.

The currently widely used fuel cell electrocatalysts are platinum nanoparticles supported on carbon supports. Depending on the catalysts and loading, the electrodes prepared with carbon supported platinum catalysts normally have thickness from several microns to about 10 or 20 microns with porosities varying from 30% to 80%. One of the disadvantages of these carbon supported catalysts is the poor corrosion resistance of carbon under certain fuel cell operating conditions, which results in fast performance degradation.

The catalyst layers can be made of nanostructured thin support materials. The nanostructured thin support materials have particles or thin films of catalyst on them. The nanostructure thin catalytic layers can be made using well known methods. One example of a method for making nanostructured thin catalytic layers is described in U.S. Pat. Nos. 4,812,352. 4,940,854, 5,039,561, 5,175,030, 5,238,729, 5,336,558, 5,338,430, 5,674,592, 5,879,827, 5,879,828, 6,482,763, 6,770,337, and 7,419,741, and U.S. Publication Nos. 2007/0059452, 2007/0059573, 2007/0082256, 2007/0082814, 2008/0020261, 2008/0020923, 2008/0143061, and 2008/0145712, which are incorporated herein by reference. The basic process involves depositing a material on a substrate, such as polyimide, and annealing the deposited material to form a layer of nanostructured support elements, known as whiskers. One example of a material which can be used to form the nanostructured support elements is "perylene red" (N,N'-di(3,5-xylyl)perylene-3,4,9,10 bis(dicarboximide) (commercially available under the trade designation "C. I. PIGMENT RED 149" from American Hoechst Corp. of Somerset, N.J.)). A catalyst material is then deposited on the surface of nanostructured support elements to form a nanostructured thin film (NSTF) catalyst layer, which is available from 3M.

The nanostructured thin catalytic layers can be transferred directly to a proton exchange membrane, such as a Nafion® membrane, using a hot press lamination process, for example. The polyimide substrate is then peeled off, leaving the layer of whiskers attached to the membrane.

These types of nanostructured thin catalytic layers have demonstrated high catalytic activities, which is helpful to reduce the platinum utilization in fuel cell stacks. Most importantly, because the supporting layer is not made of carbon as in the traditional platinum catalysts for fuel cell application, the nanostructured thin catalytic layers are more resistant to corrosion under certain fuel cell operating conditions, and thus improve the fuel cell's durability.

However, after the annealing process is completed, a thin layer of residual non-crystallized perylene red remains at the surface of the polyimide substrate. In addition, the deposition of catalyst material can form a thin film of catalyst material between the whiskers. Therefore, when the whiskers have been transferred to the PEM and the polyimide substrate peeled off, the surface of the whiskers that was adjacent to the polyimide substrate is exposed and becomes the surface of membrane electrode assembly (MEA). Consequently, the residual non-crystallized perylene red backing, which originally was adjacent to the polyimide substrate, is exposed. This can be detrimental to the fuel cell operation because it can block water and gas transfer in and out of the electrode.

In addition, an MEA made with this type of whisker catalyst layer has a narrow range of operating conditions (i.e., they cannot be too dry or too wet) to provide good performance. If the fuel cell is operated under wet conditions, the thin layer of whiskers, which is less than 1 μm thick, cannot provide enough storage capacity for the product water, resulting in flooding. Under dry conditions, it is believed that not all portions of the whiskers are utilized to catalyze the reaction due to poor proton transfer characteristics.

Besides the NSTF whisker catalyst described above, there are other uniformly dispersed (or dispersed with a desired pattern) catalytic nanostructured materials prepared on a substrate. For example, aligned carbon nanotubes, aligned carbon nanofibers, or nanoparticles, and the like could be grown on silicon or other substrates. Catalytic materials are then deposited onto the nanostructured materials. Electrocatalyst decals incorporating such materials are described, for example, in Hatanaka et al., PEFC Electrodes Based on Vertically Oriented Carbon Nanotubes, 210$^{th}$ ECS Meeting, Abstract #549 (2006); Sun et al., Ultrafine Platinum Nanoparticles Uniformly Dispersed on Arrayed $CN_x$ Nanotubes with High Electrochemical Activity, Chem. Mater. 2005, 17, 3749-3753; Warren et al., Ordered Mesoporous Materials from Metal Nanoparticle-Block Copolymer Self-Assembly, Science Vol. 320, 1748-1752 (27 Jun. 2008).

In U.S. application Ser. No. 12/465,913, filed May 14, 2009, we described a different way to prepare restructured electrodes containing the nanostructured thin catalyst layer in the format of catalyst coated membrane (CCM). Depending on the architecture of the fuel cell design, catalyst coated diffusion media (CCDM) sometimes has advantages over CCM. Gas diffusion media in PEM fuel cells is normally composed of a layer of carbon fiber paper or carbon cloth and a microporous layer (MPL) thereon. The microporous layer normally contains carbon powders and hydrophobic fluoropolymers. The microporous layer does not have strong inherent adhesive strength within itself and to the carbon fiber substrate. So it is difficult to transfer the nanostructured thin catalyst layer from its original carrying substrate to a diffusion layer through a decal transfer process as described in the CCM case.

Traditionally, CCDM is prepared by coating a catalyst-containing ink directly onto the microporous side of the gas diffusion layer. This method cannot be applied to nanostructured thin catalyst layers described above since the nanostructured thin catalyst layer is normally prepared on a carrying substrate.

Therefore, there is a need for processing and constructing an electrode containing various types of nanostructured thin catalytic layers which can provide good performance over a wider range of operating conditions.

SUMMARY OF THE INVENTION

A method of making a catalyst coated gas diffusion media comprising a carbon fiber layer and an adjacent microporous layer is described. A solution containing a temporary adhesive is preferably applied onto the microporous layer side of the gas diffusion media, although in some circumstances it might be applied to the nanostructured thin catalytic layer, or to both. With appropriate selection of the solvent, the adhesive solution will seep into the microporous layer. Once dried, the adhesive will be able to temporarily increase the inherent adhesion strength within the microporous layer and to the carbon fiber substrate. The nanostructured thin catalyst layer can then be transferred to the microporous layer side of the gas diffusion media. Or the nanostructured thin catalyst layer can be first transferred to a temporary transfer substrate, cleaned and reconstructed thereon and then transferred to the microporous layer side of the gas diffusion media from the transfer substrate. The adhesive is removed with appropriate solvents. The nanostructured thin catalytic layer on the gas diffusion media layer can be further processed, if desired. Such further processing includes, but is not limited to, incorporating additional layers/materials to construct an improved electrode containing the nanostructured thin catalytic layer (e.g., to increase the water storage capacity, or to increase conductivity). The gas diffusion media layer with the transferred nanostructured thin catalytic layer can be laminated to a proton exchange membrane (PEM) to fabricate the membrane electrode assembly (MEA) for use in fuel cell stack.

In one embodiment, a method of making a catalyst coated diffusion media is provided. The method comprises providing an electrode decal comprising a substrate with a nanostructured thin catalytic layer; providing a gas diffusion media layer comprising a conductive porous substrate and a microporous layer; applying a bonding layer adjacent to the microporous layer, the nanostructured thin catalytic layer, or both; adhering the nanostructured thin catalytic layer adjacent to the microporous layer with the bonding layer; removing the substrate; and removing at least a portion of the bonding layer; to form the catalyst coated diffusion media comprising the conductive porous substrate, the microporous layer, and the nanostructured thin catalytic layer adjacent to the microporous layer on the side opposite the conductive porous substrate.

In another embodiment, a catalyst coated diffusion media is provided. The catalyst coated diffusion media comprises a gas diffusion media layer containing a conductive porous substrate and an adjacent microporous layer; and a transferred nanostructured thin catalytic layer adjacent to the microporous layer on the side opposite the conductive porous substrate, the nanostructured thin catalytic layer having been transferred from a substrate.

In another embodiment, a membrane electrode assembly is provided. The membrane electrode assembly comprises a proton exchange membrane; a pair of catalyst coated gas diffusion media on opposite sides of the proton exchange membrane; wherein at least one of the catalyst coated diffusion media comprises a transferred nanostructured thin catalytic layer on the diffusion media, the nanostructured thin catalytic layer having been transferred from a substrate.

Other features and advantages will be apparent in light of the description embodied herein.

BRIEF DESCRIPTION OF THE DRAWINGS

The following detailed description can be best understood when read in conjunction with the following drawings, where like structure is indicated with like reference numerals, where various components of the drawings are not necessarily illustrated to scale, and in which.

DETAILED DESCRIPTION

Figure 1A:
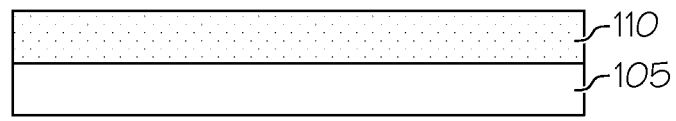
FIGS. 1A-D are an illustration of one embodiment of general method of fabricating a nanostructured thin catalytic layer electrode donor decal according to one or more embodiments.

Methods of transferring a nanostructured thin catalytic layer from the carrying substrate to a porous transfer substrate coated with an adhesive are described in U.S. Ser. No. 12/465, 913, filed May 14, 2009, entitled Electrode Containing Nanostructured Thin Catalytic Layers And Method Of Making, which is incorporated herein by reference. The nanostructured thin catalytic layer can be further processed on the porous transfer substrate. The adhesive can be removed, and any residual material (e.g., non-crystallized perylene red used to make whiskers, or catalysts used to make carbon nanotubes, and the like) can also be removed. Additional layers can be incorporated into the structure to increase the water storage capacity, if desired. Ionic conducting components can be incorporated into the nanostructured thin catalytic matrix, if desired. An electrode incorporating such a nano structured thin catalytic layer provides good performance over a wider range of operating conditions, and takes advantage of its high catalytic activity and resistance to corrosion under certain fuel cell operating conditions.

The processes generally involve methods of transferring the nanostructured thin catalytic layer from its carrying substrate to another substrate. The carrying substrate can be the substrate the nanostructured thin catalytic layer was grown on or carried on. The transfer substrate that the nanostructured thin catalytic layer will be transferred to is pre-coated with a thin layer of temporary adhesive and/or a layer that contains particles (e.g., conductive particles, including but not limited to, carbon powder, and carbon fibers; catalyst; titanium dioxide; silica; nanofibers; nanotubes; or combinations thereof), and/or ionomer, and the temporary adhesive. In doing so, the catalyst loading (mg/cm$^2$) on the transfer substrate is essentially the same as the carrying substrate where the nanostructured thin catalytic layer was formed.

An ionomer solution or an ink that contains particles and ionomer can be deposited on top of the nanostructured thin catalytic layer to form additional layers, if desired. An electrode with a nanostructured thin catalytic layer and additional layers and components can thus be prepared for later MEA or CCM fabrication.

Because of the transfer of the nanostructured thin catalytic layer from the carrying substrate to the transfer substrate, the nanostructured thin catalytic layer is inverted on the transfer substrate compared to the carrying substrate. In other words, after the transfer, the surface of the nanostructured thin catalytic layer that was exposed on the carrying substrate is adjacent to the transfer substrate, while the surface that was adjacent to the carrying substrate is exposed. The surface that was adjacent to the carrying substrate can contain residual materials that were used to form the nanostructured catalyst support elements (e.g., residual non-crystallized perylene red, or catalysts that were used to grow carbon nanofibers or carbon nanotubes, and the like), which can be cleaned through later treatment. This surface may also have a film of fuel cell catalyst material.

One method of transferring a nanostructured thin catalytic layer from a carrying substrate to a porous transfer substrate involves providing an electrocatalyst decal comprising a carrying substrate having the nanostructured thin catalytic layer thereon, the nanostructured thin catalytic layer having a first surface and a second surface, the first surface of the nanostructured thin catalytic layer adjacent to the carrying substrate; providing a porous transfer substrate with an adjacent adhesive layer; adhering the second surface of the nanostructured thin catalytic layer to the adhesive layer to form a composite structure; removing the carrying substrate from the composite structure; and removing the adhesive layer from the composite structure to form a reconstructed electrode decal comprising the porous transfer substrate and the nanostructured thin catalytic layer, wherein the second surface of the nanostructured thin catalytic layer is adjacent to the porous transfer substrate.

The porous transfer substrate can optionally have an intermediate layer first coated on the transfer layer before the adhesive is coated thereon. The intermediate layer can be positioned between the transfer substrate and the adhesive layer. It can include one or more of adhesive; ionomer; conductive particles, including but not limited to, carbon powder, and carbon fiber; catalyst; titanium dioxide; silica; nanofibers; nanotubes; or combinations thereof. For example, an ionomer can be added to increase the proton conduction of the whisker catalysts under dry conditions. A hydrophobic component, such as PTFE particles, can be included to improve wet performance.

Conductive particles, such as carbon (powder, fibers, or both), or catalyst (typically the catalyst would be on a carbon support) can be included to increase the overall electrode thickness and thus improve the product water storage capability.

More durable conductive particles can also be used to provide void space within the electrode for product water storage. Suitable compounds include, but are not limited to, conductive borides, carbides, nitrides, and silicides (B, C, N, Si). Suitable metals for the conductive particles include, but are not limited to Co, Cr, Mo, Ni, Ti, W, V, Zr. The use of such compounds, for example, TiN, is described in US Publication 2006/251954. One advantage of nanostructured thin catalytic layers over carbon supported electrodes is durability enhancement because the carbon support is susceptible to corrosion especially during fuel cell startup. These other conductive materials have not been fully suitable for electrode supports because they do not provide enough surface area, and consequently, Pt dispersion, as is obtainable with carbon. However, for the present use, the conductive particles would only need to function to provide void space and conductivity but not catalyst support, so the high surface area is not needed. Material durability is needed in the acidic and high electrochemical potential fuel cell environment. Thus, their use would be acceptable.

Titanium dioxide and/or silica, which are hydrophilic and could be used to retain product water under dry conditions, can also be included. The addition of non-conductive particles such as titanium dioxide or silica would likely require the addition of a conductive material to provide the electrical conductivity function. Ionomer could also be added to this layer or be pulled in by later coating processes to provide the needed protonic conductivity for this layer.

Nanofibers and/or nanotubes, which can be used as structural materials to incorporate into the intermediate layer, can also be used.

When the intermediate layer includes adhesive, the method further includes removing the adhesive in the intermediate layer after the carrying substrate is removed.

A solution can optionally be coated onto the nanostructured thin catalytic layer after the carrying substrate and the adhesive layer have been removed, the solution forming an additional layer on the first surface of the nanostructured thin catalytic layer. The solution can include, but is not limited to, one or more of, an ionomer; conductive particles, including, but not limited to carbon powder, and carbon fibers; catalyst; titanium dioxide; silica; nanofibers; nanotubes; or combinations thereof.

The reconstructed electrode decal can be used to make a catalyst coated membrane. The method comprises providing an electrocatalyst decal comprising a carrying substrate having a nanostructured thin catalytic layer thereon, the nanostructured thin catalytic layer having a first surface and a second surface, the first surface of the nanostructured thin catalytic layer adjacent to the carrying substrate; providing a porous transfer substrate with an adjacent adhesive layer; adhering the second surface of the nanostructured thin catalytic layer to the adhesive layer to form a composite structure; removing the carrying substrate from the composite structure; and removing the adhesive layer from the composite structure to form an electrode decal comprising the porous transfer substrate and the nanostructured thin catalytic layer, wherein the second surface of the nanostructured thin catalytic layer is adjacent to the porous transfer substrate; providing a proton exchange membrane; transferring the nanostructured thin catalytic layer from the electrode decal to a first surface of the proton exchange membrane to form a catalyst coated membrane, the first surface of the nanostructured thin catalytic layer being adjacent to the first surface of the proton exchange membrane.

The reconstructed electrode decal comprises a porous transfer substrate; and a nanostructured thin catalytic layer having a first surface and a second surface, the nanostructured thin catalytic layer having been transferred from a carrying substrate, the first surface having been adjacent to the carrying substrate, and wherein the second surface of the nanostructured thin catalytic layer is adjacent to the porous transfer substrate.

The catalyst coated proton exchange membrane comprises a proton exchange membrane; a nanostructured thin catalytic layer having a first surface and a second surface, the nanostructured thin catalytic layer having been transferred from a carrying substrate to a transfer substrate, the first surface having been adjacent to the carrying substrate, the second surface having been adjacent to the transfer substrate, and wherein the first surface is adjacent to the proton exchange membrane.

This process transfers the nanostructured thin catalytic layers from the carrying substrate they are grown on or carried on to another transfer substrate. In doing so, the nanostructured thin catalytic layer is inverted so that the surface that was adjacent to the carrying substrate is exposed. This allows that surface to be cleaned, and the residual material (if present) to be removed, which can help improve electrode performance and durability. This also places any platinum films that were adjacent to the carrying substrate towards the membrane where such a film would not impede gas mass transfer (as it would be if it were located towards the DM side of the electrode).

The transfer process allows additional layers to be deposited on the cleaned surface of the nanostructured thin catalytic layer after transfer. Additional layers can also be pre-coated on the porous transfer substrate before the adhesive layer is coated on. The pre-coated layer can contain particles (e.g., conductive particles including, but not limited to, carbon powder, and carbon fibers; catalyst; titanium dioxide; silica; nanofibers; nanotubes; or combinations thereof), and/or ionomer, and the temporary adhesive as well. As a result, the structures of the electrodes formed and the catalyst coated membranes made using them can be adjusted by selection of the location, types, composition, and thicknesses of these additional layers.

The reconstructed electrodes on the porous transfer substrate formed by the above process can then be used to form a catalyst coated membrane. The reconstructed electrode is adhered to one or both surfaces of a PEM, and the porous transfer substrate is then removed to form the catalyst coated membrane. Typically, pressure and optionally heat are applied to adhere the reconstructed electrodes containing the nanostructured thin catalytic layer to the PEM, allowing transfer of the reconstructed electrode from the transfer substrate to the PEM. Processes suitable for adhering the reconstructed electrodes containing the nanostructured thin catalytic layer to the PEM include, but are not limited to, static pressing with heat and pressure, or for continuous roll production, laminating, nip rolling, or calendering.

Generally, a pressure of between about 90 and about 900 MPa can be used to adhere the reconstructed electrodes containing the nanostructured thin catalytic layers to the PEM. The press temperature should be high enough to attach the reconstructed electrodes containing the nanostructured thin catalytic layers to the PEM, but below the melting temperature of the PEM. For example, the press temperature is generally between about 80° and about 300° C. The pressing time is typically greater than about 1 second; for example, a pressing time of about one minute is suitable for many situations.

When the MEA or CCM fabrication process using one nanostructured thin catalytic layer is done and the transfer substrate is removed, the surface which was exposed on the original nanostructured thin catalyst layer carrying substrate will be again exposed to be the surface of the CCM. In general, the surface exposed on the original carrying substrate is more open compared to the surface against the carrying substrate. So the CCM prepared through the process described above would be more favorable for reactant gas transport and product water removal when a single nanostructured thin catalytic layer is used.

The catalyst coated membrane can be used in a membrane electrode assembly for a fuel cell, or other electrochemical energy conversion devices, such as electrolyzers.

Additional nanostructured thin catalytic layers can be added to the restructured electrode decal, if desired. The reconstructed electrode decals having a plurality of nanostructured thin catalytic layer can optionally include one or more intermediate layers which can be designed to increase water storage capacity and/or improve conductivity, if desired. The intermediate layers can be between the substrate and the nanostructured thin catalytic layer, between the nanostructured thin catalytic layers, or on top of the upper nanostructured thin catalytic layer.

By using more than one nanostructured thin catalytic layer, structures can be designed and fabricated to have increased overall electrode water storage capacity. The catalyst loading in each of the nanostructured thin catalytic layers can be adjusted. In addition, the intermediate layers can use different types and/or amounts of additional material at different positions in the structure; for example, a more porous carbon layer can be used closer to the diffusion media. Furthermore, ionomer can be included in one or more intermediate layers, and an ionomer gradient can be built into the structure with the highest ionomer concentration near the proton exchange membrane.

Such adjustments will allow an electrode to be designed to perform optimally under both dry and wet conditions. Under dry conditions, most of the current will be drawn from the nanostructured thin catalytic layer(s) close to the membrane, while under wet conditions, most of the current will be drawn from nanostructured thin catalytic layers further from the membrane.

The basic process is modified to make reconstructed electrode decals having more than one nanostructured thin catalytic layers, as described below.

Reconstructed electrode decals having a plurality of nanostructured thin catalytic layers can be made by combining one or more "donor" decals with an "acceptor" decal.

A reconstructed electrode decal with a single nanostructured thin catalytic layer as described above can used as a donor decal. Donor decals can be made as shown in FIG. 1. FIG. 1A shows a transfer substrate 105 coated with an adhesive layer 110. The transfer substrate 105 can be any stiff or soft porous substrate. If the nanostructured thin catalytic layer is made on a smooth substrate, a stiffer substrate can be used as the transfer substrate. Stiff substrates can also be used if a thick layer of the temporary adhesive is coated on the transfer substrate, and the thickness of the adhesive layer is thicker than the roughness feature (e.g., corrugations) of the carrying substrate. For example, if the carrying substrate has a surface feature (e.g., corrugations) which is 6 microns between the highest and lowest points of the corrugated structure, then the thickness of the adhesive layer should be greater than 6 microns.

The transfer substrate can be porous or non-porous.

Porous transfer substrates are desirable because pores of the porous transfer substrate can then act as a drain for waste products used in further processing the nanostructured thin catalytic layer. It also allows vacuum to be applied to help hold the nanostructured thin catalytic layer in place after the adhesive is removed. Soft porous substrates can accommodate the surface roughness of the carrying substrate in case the nanostructured thin catalytic layers were not made on smooth substrates. Suitable types of porous substrates include, but not are limited to, porous polyethylene (PE), porous polypropylene (PP), porous polyester, porous Nylon, polyimide (PI), expanded polytetrafluoroethylene (ePTFE), and porous siloxane.

One suitable porous substrate is expanded polytetrafluoroethylene (ePTFE). ePTFE is soft, which allows it to receive the nanostructured thin catalytic layers from both the top and the bottom of the corrugations of the electrocatalyst decal on which they were grown. ePTFE has another advantage when an adhesive dissolved in a hydrophilic solution is used. Because ePTFE is hydrophobic, only a thin film of the adhesive, such as polyvinyl alcohol (PVA), is formed on the surface of the ePTFE when the adhesive is coated from a PVA water solution, and the PVA will not fill the pores of the ePTFE substrate.

The adhesive layer 110 acts as a temporary glue which adheres the nanostructured thin catalytic layer and the porous substrate together, allowing the removal of the nanostructured thin catalytic layer from the carrying substrate. Any suitable adhesive can be used. Desirably, the adhesive is easily removable, and does not poison the catalyst. Water soluble adhesives are desirable because they can be easily removed with water. However, other solvents can be used to remove the adhesive, if desired. Suitable adhesives include, but are not limited to, polyvinyl alcohol (PVA), polyethylene oxide, polyacrylate, polyethylene vinyl acetate, and soluble cellulose. One suitable adhesive is a water soluble PVA, for example, a water soluble PVA having a molecular weight (MW) of about 10,000. Generally, the PVA layer loading is between about 0.1 $mg/cm^2$ and about 10 $mg/cm^2$, or about 0.5 $mg/cm^2$ to about 2 $mg/cm^2$.

The adhesive layer can optionally include one or more additional materials, including, but not limited to, ionomer, conductive particles, including, but not limited to, carbon powder, and carbon fibers; catalyst; titanium dioxide; silica; nanofibers; or nanotubes, if desired. If the adhesive layer contains one or more additional materials, there should be sufficient adhesive in the layer so that the nanostructured thin catalytic layer will adhere to it. If ionomer is included, the amount of ionomer should be enough so that, combined with the adhesive, it will hold the nanostructured thin catalytic layer, but not so much that it blocks the pores of the porous transfer substrate. The adhesive layer desirably includes an adhesive, such as PVA, and ionomer.

The porous transfer substrate can be either hydrophobic or hydrophilic. Preferably, an adhesive soluble in an aqueous or hydrophilic solution is applied when the porous transfer substrate is hydrophobic, or vice versa. This allows a thin film of the adhesive to form only on the surface of the porous transfer substrate. In this way, the pores are not filled with the adhesive initially.

Figure 1B:
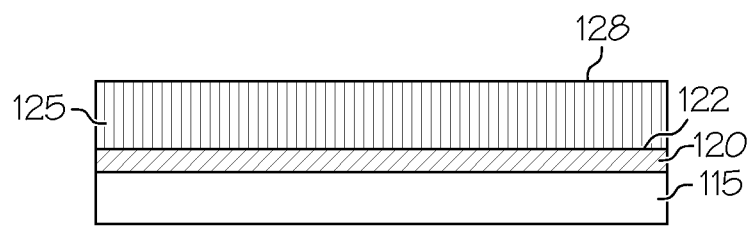

As shown in FIG. 1B, an electrocatalyst decal is provided. The electrocatalyst decal includes a carrying substrate 115 with nanostructured thin catalytic layer 125 on it. In some cases, there may be a residual layer 120 of the material used to form the nanostructured catalyst support elements between the carrying substrate 115 and the nanostructured thin catalytic layer 125. The nanostructured thin catalytic layer has a first surface 122 adjacent to the carrying substrate and an exposed second surface 128.

Suitable electrocatalyst decals comprising whiskers made from perylene red on a polyimide substrate known as NSTF catalyst layers are available from 3M. Other electrocatalyst decals with nanostructured thin catalytic layers could also be used. The nanostructured catalytic materials are either uniformly dispersed on the substrate or dispersed in a desired pattern. For example, aligned carbon nanotubes, aligned carbon nanofibers, or nanoparticles, and the like with uniformly dispersed catalyst could be used. Electrocatalyst decals incorporating such materials are described, for example, in Hatanaka et al., PEFC Electrodes Based on Vertically Oriented Carbon Nanotubes, $210^{th}$ ECS Meeting, Abstract #549 (2006); Sun et al., Ultrafine Platinum Nanoparticles Uniformly Dispersed on Arrayed $CN_x$ Nanotubes with High Electrochemical Activity, Chem. Mater. 2005, 17, 3749-3753; Warren et al., Ordered Mesoporous Materials from Metal Nanoparticle-Block Copolymer Self-Assembly, Science Vol. 320, 1748-1752 (27 Jun. 2008).

Figure 1C:
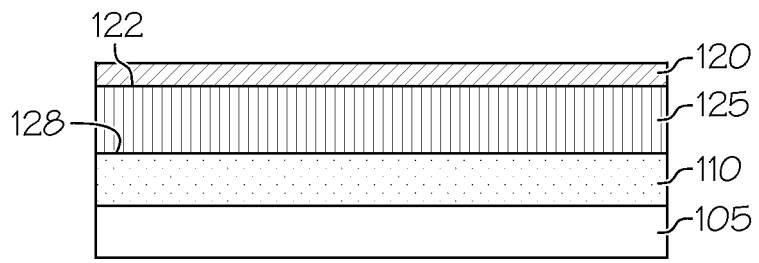

The nanostructured thin catalytic layer on the carrying substrate is inverted, and the second surface 128 of the nanostructured thin catalytic layer 125 is placed in contact with the adhesive layer 110 to form a composite structure. Suitable processes include, but are not limited to, static pressing with heat and pressure, or for continuous roll production, laminating, nip rolling, or calendering. The carrying substrate 115 is then removed (for example, by peeling off the carrying substrate). As shown in FIG. 1C, after the carrying substrate is removed, the residual layer 120 (if present) remains on the nanostructured catalytic layer 125.

Figure 1D:
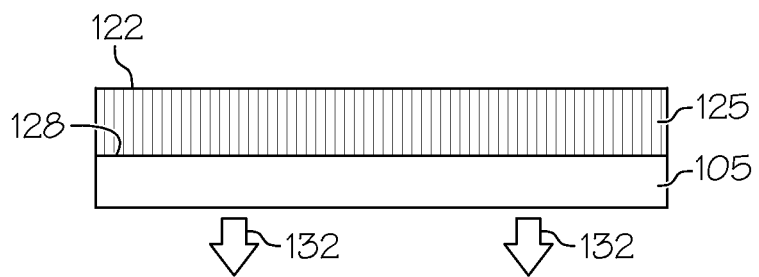

The adhesive layer 110 is then removed by a suitable process, as shown in FIG. 1D. One example of a suitable process involves rinsing the composite structure with a solvent to dissolve the adhesive. The solvent desirably wets the surface of the porous transfer substrate 105. Suitable solvents include, but are not limited to, water/alcohol mixtures, such as for example, a water/isopropanol (IPA) mixture when an ePTFE substrate is used. The alcohol in the water/alcohol mixture helps wet the hydrophobic ePTFE substrate, and the pores of the porous substrate act as a drain for the solvent.

The nanostructured thin catalytic layer 125 can be further treated to remove the residual layer 120 (if necessary), exposing the first surface 122 of the nanostructured thin catalytic layer 125. The residual layer is typically the left over materials used to form the nanostructured catalyst support elements. For example, when the nanostructured thin catalytic layer is a layer of whiskers made from perylene red, the residual layer is non-crystallized perylene red. For other nanostructured thin catalytic layers, the residual layer would be different. For example, it might be Fe or Ni catalysts used to grow carbon nanofibers or carbon nanotubes.

The residual layer 120 can be removed by any suitable process. One example of a suitable process is rinsing the nanostructured thin catalytic layer with a solvent to remove the residual layer. If the nanostructured thin catalytic layer comprises whiskers made from perylene red, suitable solvents for perylene red, include, but are not limited to, mixtures of water, acetone, n-propanol (NPA), or 1-methyl-2-pyrolidone (NMP). Water/NPA mixtures can remove small amounts of perylene red (low solubility). NMP appears to be very effective to dissolve perylene red, but it has a high boiling point and thus further solvent rinsing is required to fully remove it. Consequently, mixtures of the above mentioned solvents are preferred to perform the cleaning process. Again, the pores of the porous substrate act as a drain for the solvent and dissolved residual materials. If Fe or Ni catalysts are used to grow carbon nanotubes or carbon nanofibers, nitric acid, sulfuric acid, and other acids could be used to dissolve the residual metals. Alcohol could be added to the acidic solution to help wet the ePTFE substrate, if desired.

The adhesive layer 110 and residual layer 120 can be removed simultaneously by applying solvents for both layers at the same time. Alternatively, one layer can be removed after the other. In this situation, the adhesive layer 110 would preferably be removed first in order to clear up the path to the pores in the porous transfer substrate.

Vacuum 132 can be applied when removing the adhesive and/or the residual layer, if desired.

Alternatively, a nanostructured thin catalytic layer on its original carrying substrate can be used as the donor decal.

Figure 2A:
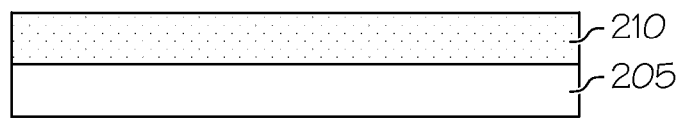
FIGS. 2A-D are an illustration of one embodiment of a general method of fabricating a nanostructured thin catalytic layer electrode acceptor decal according to one or more embodiments.
Figure 2B:
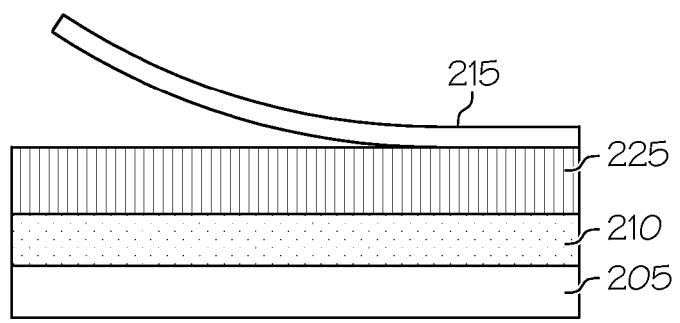
Figure 2C:
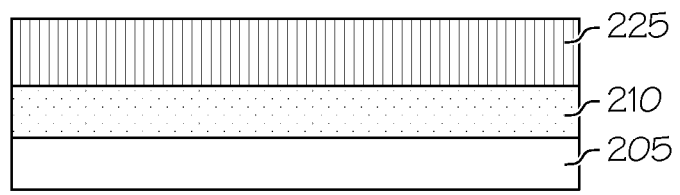

The acceptor decal can be made as shown in FIGS. 2A-D. Similar to FIG. 1, the nanostructured thin catalytic layer is transferred from its carrying substrate to a transfer substrate. There is a transfer substrate 205 with an adhesive layer 210, as shown in FIG. 1A. That is combined with an electrocatalyst electrode decal having a carrying substrate 215 and a nanostructured thin catalytic layer 225, and the carrying substrate 215 is removed, as shown in FIG. 2B. The structure shown in FIG. 2C is left after the removal of the carrying substrate.

The main difference between the donor decal and the acceptor decal is that the adhesive layer is removed from the donor decal, but it is not removed from the acceptor decal. The presence of the adhesive layer between the substrate and the nanostructured thin catalytic layer in the acceptor decal means that the nanostructured thin catalytic layer is more securely bonded to the substrate than it is in the donor decal. This ensures that the donor nanostructured thin catalytic layer is transferred to the acceptor decal.

An intermediate layer 230 can be added, if desired. A second adhesive layer 235 is applied, yielding the structure shown in FIG. 2D. The adhesive layer is preferably applied to the nanostructured thin catalytic layer of the acceptor decal, and the nanostructured thin catalytic layer of the donor decal preferably does not have adhesive on it. This helps to obtain a clean transfer of the nanostructured thin catalytic layer from the donor decal to the acceptor decal. If the adhesive is applied on the donor decal as shown in FIG. 1, the solvent should be carefully selected so that the adhesive layer only forms on top of the nano structured thin catalytic layer. If the adhesive penetrates through the nanostructured thin catalytic layer during the coating process, the adhesive could bond the nanostructured thin catalytic layer to the donor substrate again. However, the adhesive layer can be applied to either the nanostructured thin catalytic layer of the acceptor decal, or the donor decal, or both, if desired.

Figure 2D:
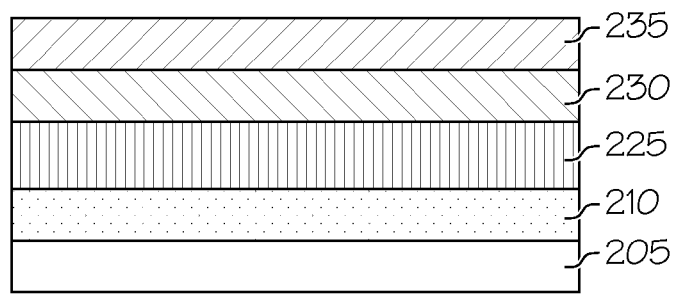
Figure 3A:
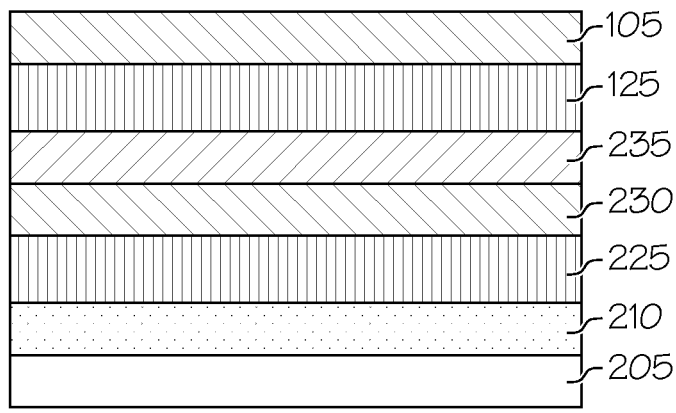
FIGS. 3A-C are an illustration of one embodiment of a general method of fabricating a reconstructed electrode decal having a plurality of nanostructured thin catalytic layers.
Figure 3B:
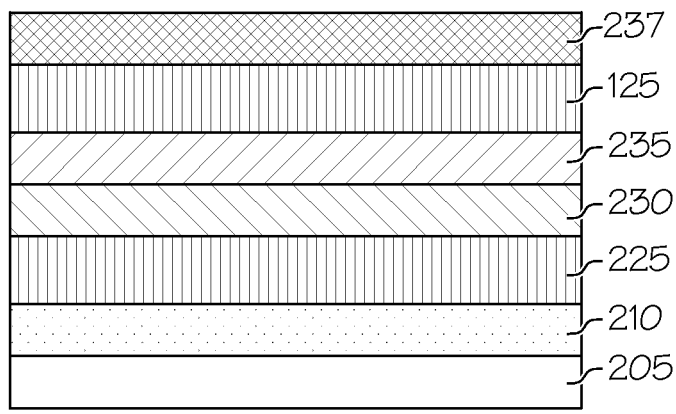
Figure 3C:
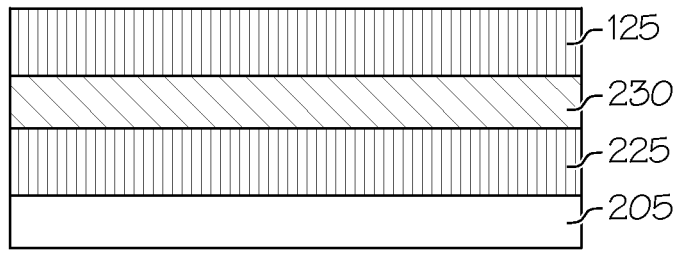

As shown in FIG. 3A, a reconstructed electrode decal with two nanostructured thin catalytic layers can be made by combining the donor decal from FIG. 1D with the acceptor decal of FIG. 2D. The donor substrate 105 is then removed. A cleaning solution 237 is then applied to the structure to remove adhesive layers 210 and 235, as shown in FIG. 3B. After removal of the adhesive layers, there is a reconstructed electrode decal with two nanostructured thin catalytic layers 225, 125 separated by intermediate layer 230 on acceptor substrate 205, as shown in FIG. 3C.

The process can be repeated with additional donor decals (having either the same structure or a different structure) to add additional nanostructured thin catalytic layers to the stack. In this case, the adhesive layers in the acceptor decal would not be removed until all the desired layers had been transferred to the acceptor decal.

Figure 4A:
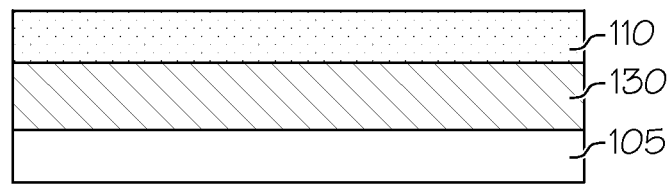
FIGS. 4A-C are an illustration of another embodiment of general method of fabricating a nanostructured thin catalytic layer electrode donor decal according to one or more embodiments.
Figure 4B:
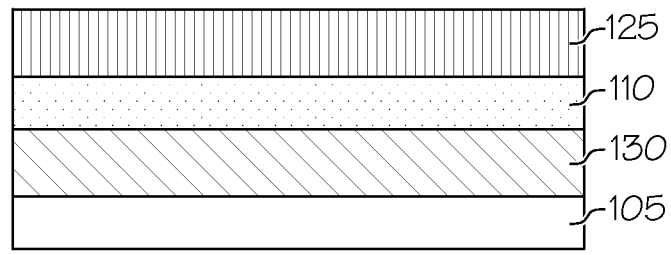
Figure 4C:
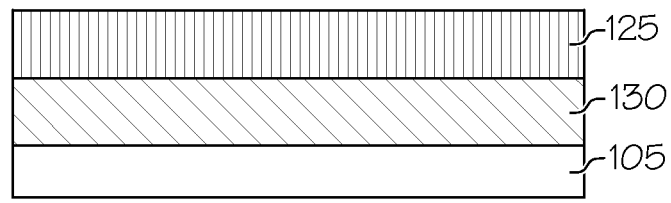

An alternative embodiment of the donor decal is shown in FIGS. 4A-C. FIG. 4A shows a porous substrate 105 pre-coated with an intermediate layer 130. An adhesive layer 110 is coated over the intermediate layer 130. The nanostructured thin catalytic layer 125 is transferred from a carrying substrate and the carrying substrate is removed, leaving the structure shown in FIG. 4B. The adhesive layer 110 (and the residual layer on the nanostructured thin catalyst layer, if any) is removed, leaving the structure of FIG. 4C.

Intermediate layer 130 can include adhesive and one or more of conductive particles, including, but not limited to carbon powder, and carbon fibers; catalyst; titanium dioxide; silica; nanofibers; or nanotubes. Ionomer could be included in the intermediate layer 130 to adjust the final ionomer content in the intermediate layer. Its usage needs to be kept to minimum so that ionomer would not block the pores of the porous substrate, and make the intermediate layer adhere too strongly to the porous substrate 105. Desirably, the intermediate layer includes a removable adhesive and one or more additional materials.

The intermediate layer can be made using the same adhesive as in the adhesive layer used to transfer the nanostructured thin catalytic layer from the carrying substrate to the transfer substrate or using a different adhesive. If the same adhesive is used in adhesive layer and the intermediate layer (or if a solvent is used which can remove both adhesives), the adhesive in the intermediate layer will be removed at the same time as adhesive layer, leaving ionomer and any additional materials (if present). If a different adhesive it used, another solvent can be used to remove the adhesive in the intermediate layer.

If the adhesive layer contains one or more additional materials, the additional materials in the intermediate layer can be same as those in the adhesive layer, or they can be different, if desired.

Figure 5A:
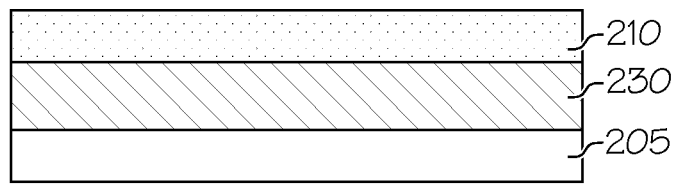
FIGS. 5A-C are an illustration of another embodiment of a general method of fabricating a nanostructured thin catalytic layer electrode acceptor decal according to one or more embodiments.
Figure 5B:
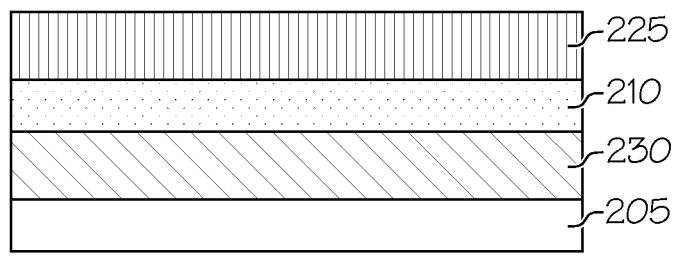
Figure 5C:
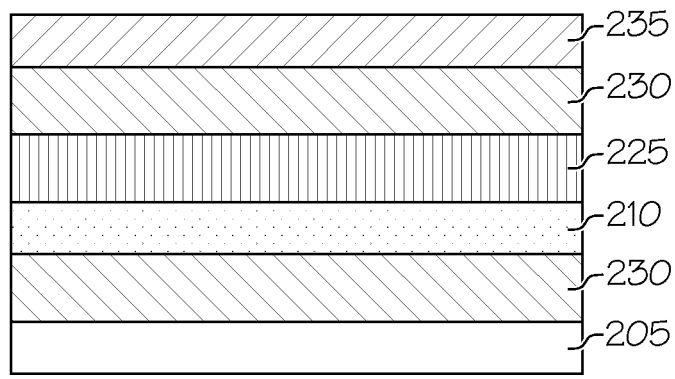

An alternative embodiment of the acceptor decal is shown in FIGS. 5A-C. FIG. 5A shows a porous substrate 205 pre-coated with an intermediate layer 230. An adhesive layer 210 is coated over the intermediate layer 230. The nanostructured thin catalytic layer 225 is transferred from a carrying substrate and the carrying substrate is removed, leaving the structure shown in FIG. 5B. An additional intermediate layer 233 is applied over the nanostructured thin catalytic layer 225. The additional intermediate layer can generally include the same materials as discussed above with respect to the intermediate layer. The intermediate layers can be made of the same materials in the same or different amounts, or different materials, as desired. For example, ionomer can be added to adjust the final ionomer content in the additional intermediate layer for the final electrode, or the amount and/or type of carbon or catalyst can be adjusted in various intermediate layers.

The thickness of the intermediate layer can be controlled by depositing different amounts of the intermediate layer materials on the substrate or nanostructured thin catalytic layer.

An adhesive layer 235 is applied over the additional intermediate layer 230, resulting in the structure of FIG. 5C, which can be used as an acceptor decal.

FIGS. 6A-H illustrate one method of making a reconstructed electrode decal having three nanostructured thin catalytic layers.

Figure 6A:
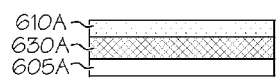
FIGS. 6A-H are an illustration of one embodiment of a method of fabricating a reconstructed electrode decal having three nanostructure thin catalytic layers.
Figure 6B:
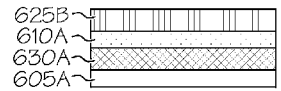

As shown in FIG. 6A, there is an acceptor decal with a porous substrate 605A with an intermediate layer 630A, and an adhesive layer 610A (the same structure as shown in FIG. 5A). A donor decal with a nanostructured thin catalytic layer 625B is hot pressed adjacent to the adhesive layer 610A. The substrate is removed, leaving the structure shown in FIG. 6B.

Figure 6C:
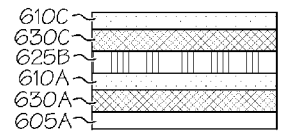

An intermediate layer 630C and an adhesive layer 610C are then coated on the stack, as shown in FIG. 6C.

A donor decal having the same structure as shown in FIG. 4C is provided including transfer substrate 605D, intermediate layer 630D, and nanostructured thin catalytic layer 625D.

Figure 6D:
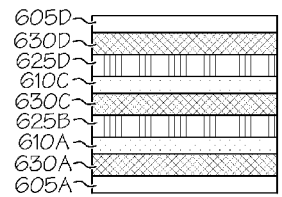
Figure 6E:
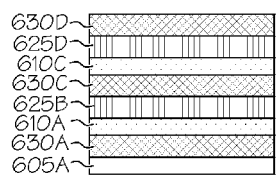

The donor decal is bonded to the stack, as shown in FIG. 6D. The substrate 605D is then removed, as shown in FIG. 6E.

Figure 6F:
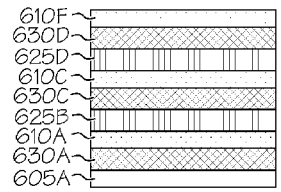

An adhesive layer 610F is then coated on the stack, as shown in FIG. 6F.

Figure 6G:
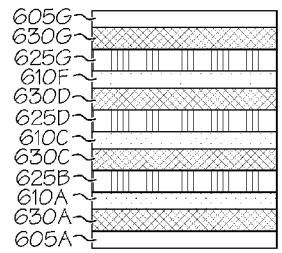

A second donor decal having the same structure as FIG. 4C is provided including transfer substrate 605G, intermediate layer 630G, and nanostructured thin catalytic layer 625G. The second electrode decal is bonded to the stack, as shown in FIG. 6G. The substrate 605G is then removed.

The stack is then treated to remove the adhesive layers, and the adhesive in the intermediate layers (if any), using appropriate methods as discussed above, such as coating with one of more solvents. The porous substrate 605A acts as a drain for the wastes. Vacuum is preferably applied. Optionally, ionomer can be applied at one or more steps during the process.

Figure 6H:
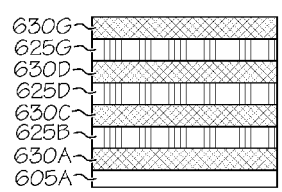

The resulting reconstructed electrode decal has three nanostructured thin catalytic layers separated by intermediate layers, as shown in FIG. 6H. There is an acceptor substrate 605A, intermediate layer 630A, nanostructured thin catalytic layer 625B, intermediate layer 630C, nanostructured thin catalytic layer 625D, intermediate layer 630D, nanostructured thin catalytic layer 625G, and intermediate layer 630G. Additional layers, such as an ionomer solution, can be coated on top of 630G before MEA fabrication.

When a reconstructed electrode decal with multiple nanostructured thin catalytic layers is made, the arrangement of the first and second surfaces of the nanostructured thin catalytic layers will depend on what type of decals are used to produce it (e.g., electrocatalyst decals on carrying substrates, or reconstructed electrode decals on transfer substrates, and how many nanostructured thin catalytic layers are included). This is not an important consideration for this type of structure, and any suitable arrangement can be used.

It should be noted that the terms donor decal and acceptor decal are relative terms and depend on whether the structure is donating its nanostructured thin catalytic layer(s) or accepting a nanostructured thin catalytic layer(s) from another decal in the particular transfer process being discussed. For example, after an acceptor decal has accepted one or more nanostructured thin catalytic layer(s), the temporary adhesive in the stack on the acceptor decal can be removed, and it can be used as a donor decal to donate its nanostructured thin catalytic layer(s) to another acceptor decal, as shown above in FIGS. 6D and 6G once the temporary adhesive is removed.

FIGS. 7A-D show one embodiment of a method of transferring a 3M NSTF catalyst layer made with perylene red from a polyimide carrying substrate to an ePTFE transfer substrate.

Figure 7A:
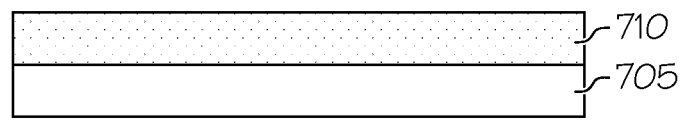
FIGS. 7A-D are an illustration of one embodiment of a method of fabricating a reconstructed electrode decal having one nanostructure thin catalyst layer for CCM fabrication.

FIG. 7A shows an ePTFE porous substrate 705 coated with a water soluble PVA (molecular weight around 10,000) adhesive layer 710 through a 5 wt % aqueous solution. The PVA loading is about 6 mg/cm² after drying.

Figure 7B:
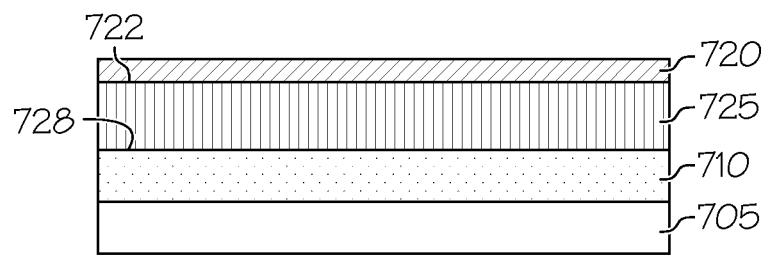

A 3M NSTF catalyst layer supported on a carrying substrate was provided. In this case, the catalyst loading in the nanostructured thin catalytic layer was 0.15 mg Pt/cm². The 3M NSTF catalyst layer included a polyimide carrying substrate, and a nanostructured thin catalytic layer of whiskers made from perylene red 725. There was a residual layer of perylene red 720 on the interface between the whiskers and the polyimide carrying substrate. Using a hot press (105° C., 3.5 MPa, 4 minutes) process, the second surface 728 of the layer of whiskers 725 was pressed against the PVA adhesive layer 710 on the ePTFE porous transfer substrate 705. The carrying substrate was then peeled off, leaving whisker layer 725 on the porous transfer substrate 705 and the residual layer of perylene red 720 exposed, as shown in FIG. 7B.

Figure 7C:
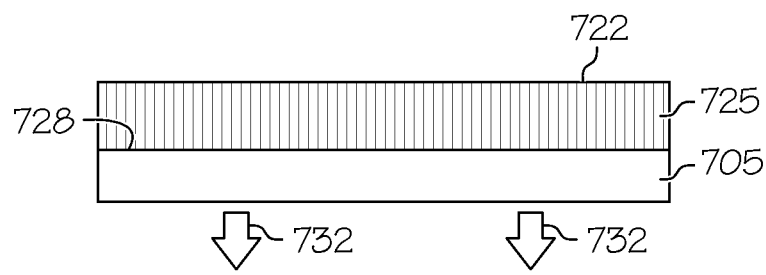

As shown in FIG. 7C, the PVA adhesive layer 710 was then removed by coating a water/IPA (1:1 weight ratio) mixture solution multiple times until the solvent drained freely through the ePTFE substrate. An EtOH/NPA (1:1) mixture solution was then coated on top of the whiskers 725 multiple times to remove the residual layer of perylene red 720, exposing first surface 722.

Figure 7D:
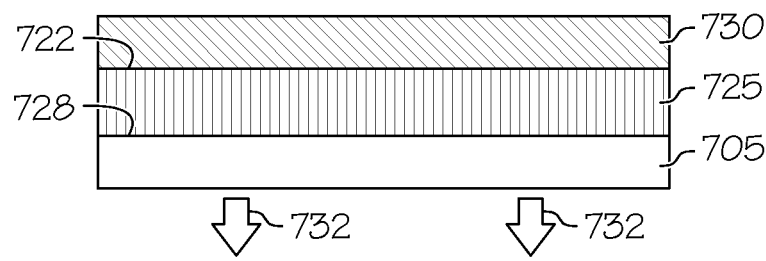

A diluted DuPont DE2020 ionomer solution (0.2 wt % in NPA:EtOH:H$_2$O=1:2:2 solution) was then coated on top of the whiskers to incorporate the ionomer into the whisker matrix. The ionomer solution drains across the whisker layer and thus coats a thin ionomer film on the surfaces of the whiskers. Depending on the ionomer concentration and the amount of the ionomer solution coated, a layer of ionomer film could be built up on top of the exposed surface 722 of the whiskers as well, layer 730, as shown in FIG. 7D. Excessive ionomer drained through the pores of the ePTFE substrate, and thus no continuous ionomer film would be formed on the interface 728 between the whiskers 725 and the porous carrying substrate 705.

Vacuum 732 was applied during the removal of the adhesive layer, and/or the removal of the residual materials from the formation of the nanostructured elements, and/or the deposition of the ionomer solution.

An excess amount of ionomer can also be used by increasing the ionomer concentration or through multiple coating passes, and a thick ionomer film would be formed on top the whiskers layer 725. The excessive thick ionomer film will help to improve the interface between the whiskers and the PEM during the final CCM fabrication process, especially when the nanostructured thin catalytic layer carries over the corrugated structure from its carrying substrate. The thick ionomer film will be against the PEM during the hot press process to fabricate the CCM, and it will become part of the membrane once it is made into MEAs, and thus it would not hurt the fuel cell performance.

Figure 8A:
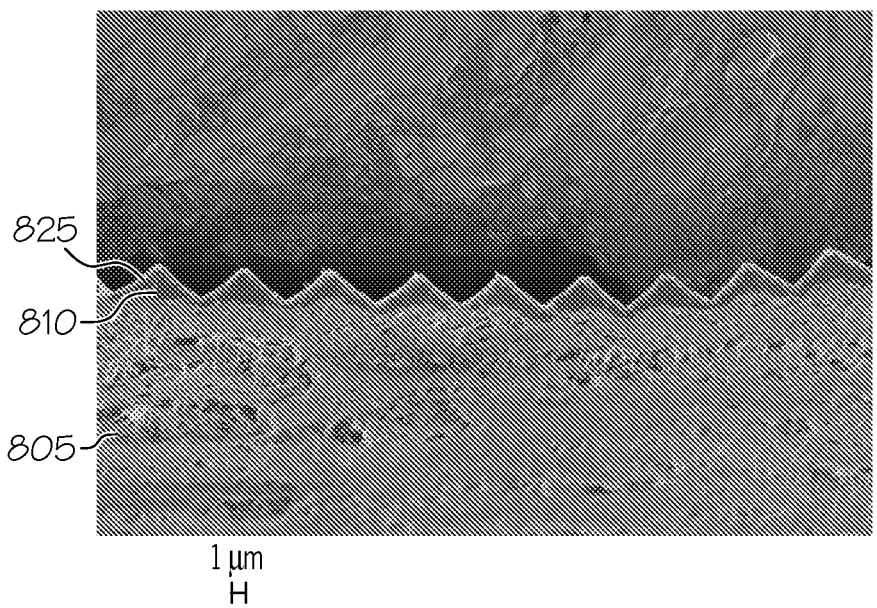
FIGS. 8A-B are SEM cross-section images of the reconstructed electrode donor decal of FIG. 1C.
Figure 8B:
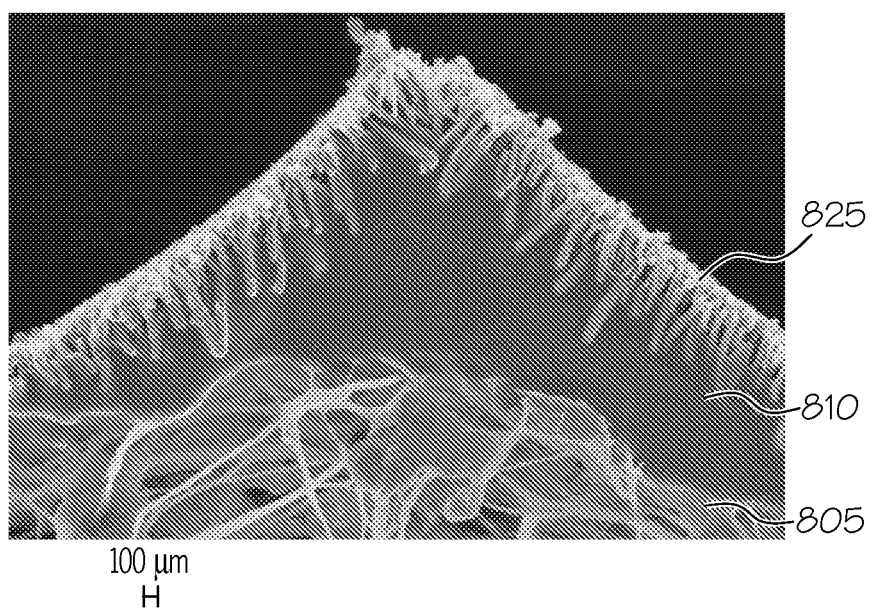
Figure 9A:
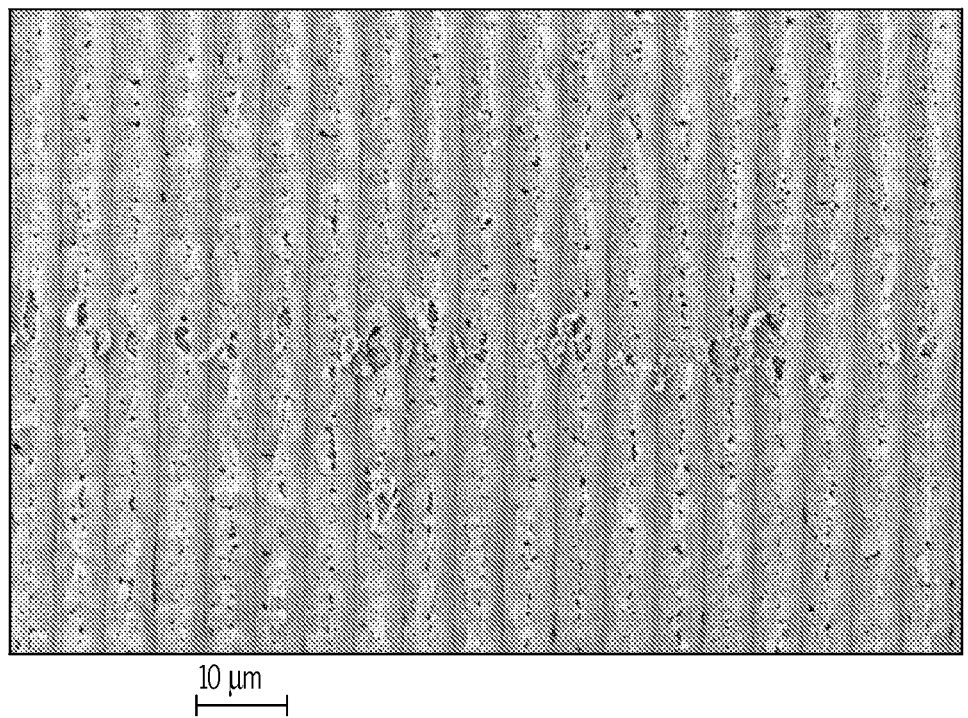
FIGS. 9A-D show top down SEM images of a nanostructured thin catalytic layer on the porous transfer substrate at the stage of FIG. 1D at different magnifications.
Figure 9B:
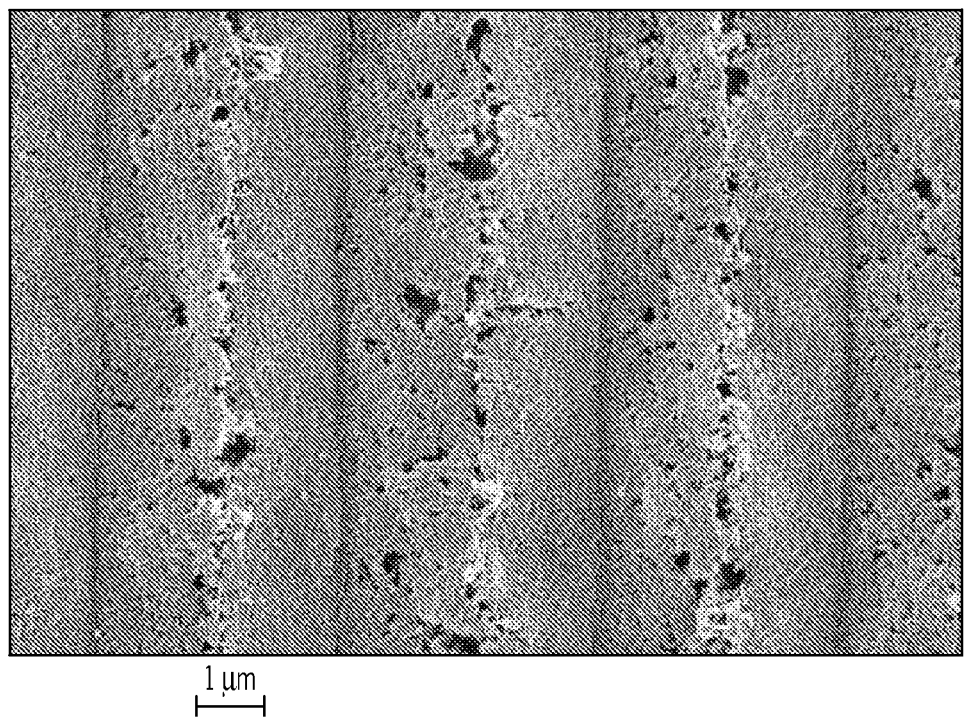
Figure 9C:
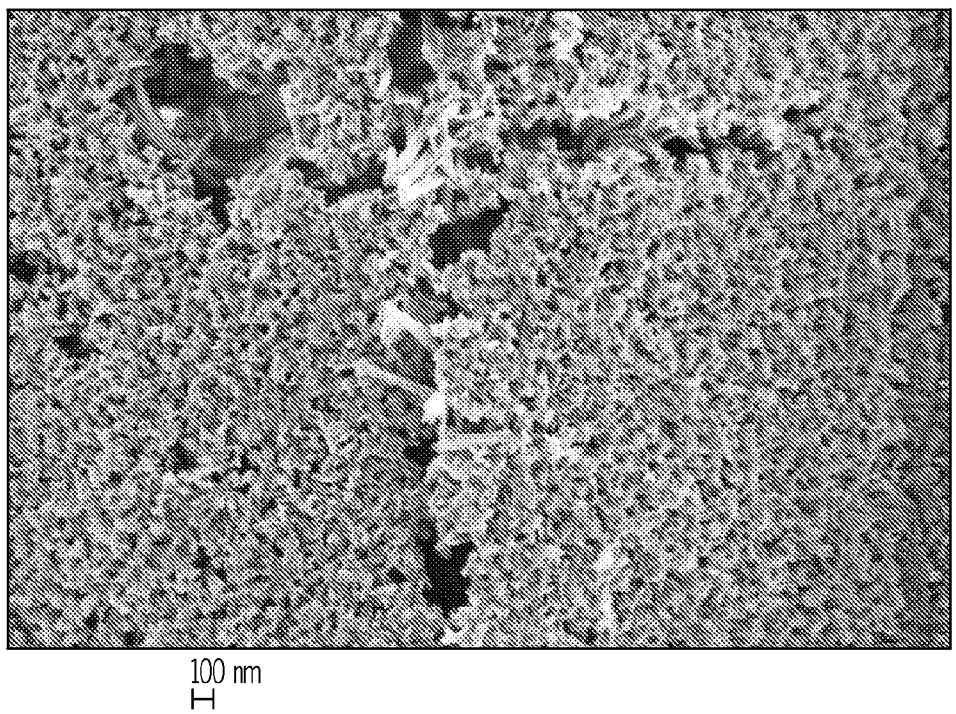
Figure 9D:
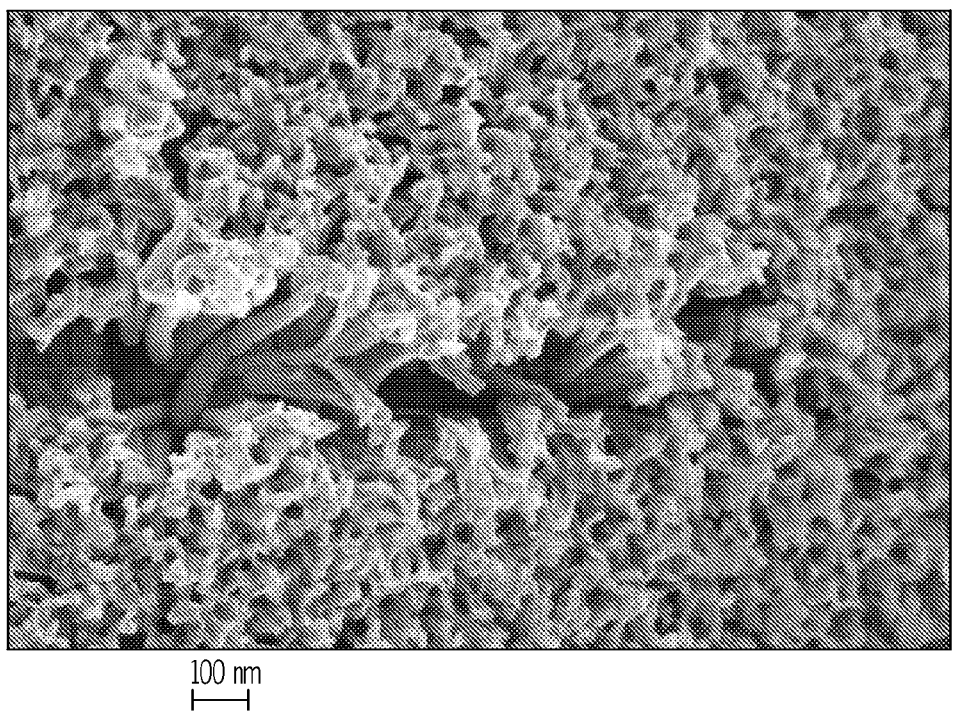

FIGS. 8A-B show SEM images of the cross-section of the reconstructed decal of FIG. 1C. This figure shows that the temporary adhesive PVA 810 on the ePTFE substrate 805 deformed itself to fit into the corrugated structure of NSTF. The whiskers 825 penetrate into PVA layer 810. It also shows that the residual backing layer 820 is exposed to the outer surface. The catalyst loading in the nanostructured thin catalyst layer was 0.15 mg Pt/cm².

Figure 10A:
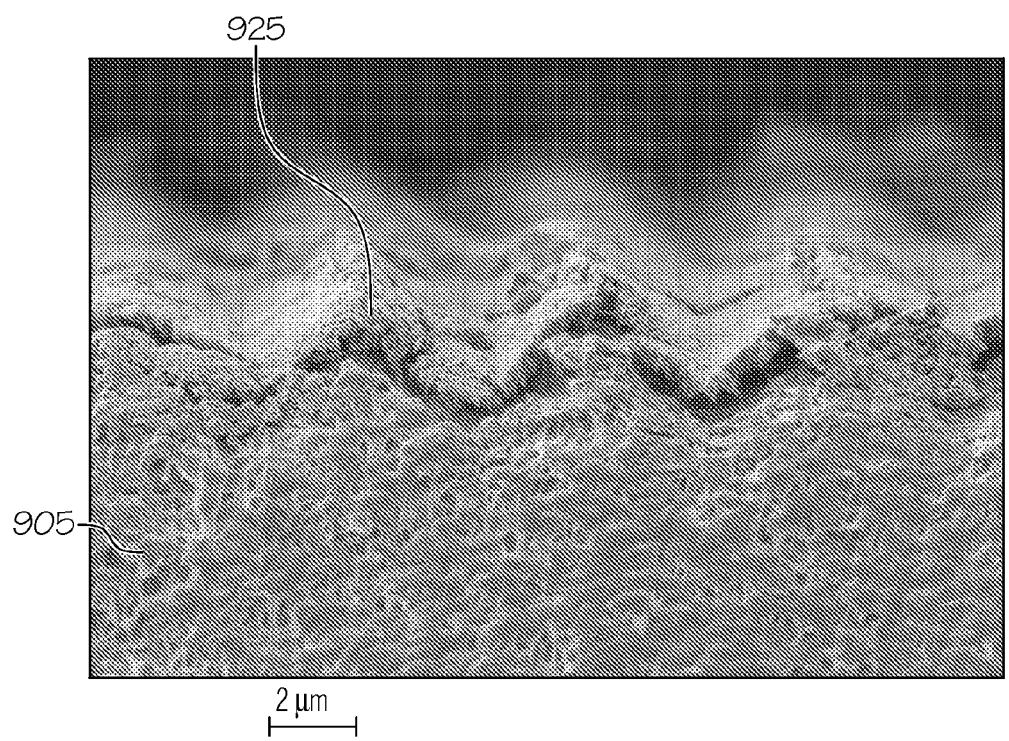
FIGS. 10A-B show SEM images of the cross-section of the nanostructured thin catalytic layer on the porous transfer substrate of FIG. 9.
Figure 10B:
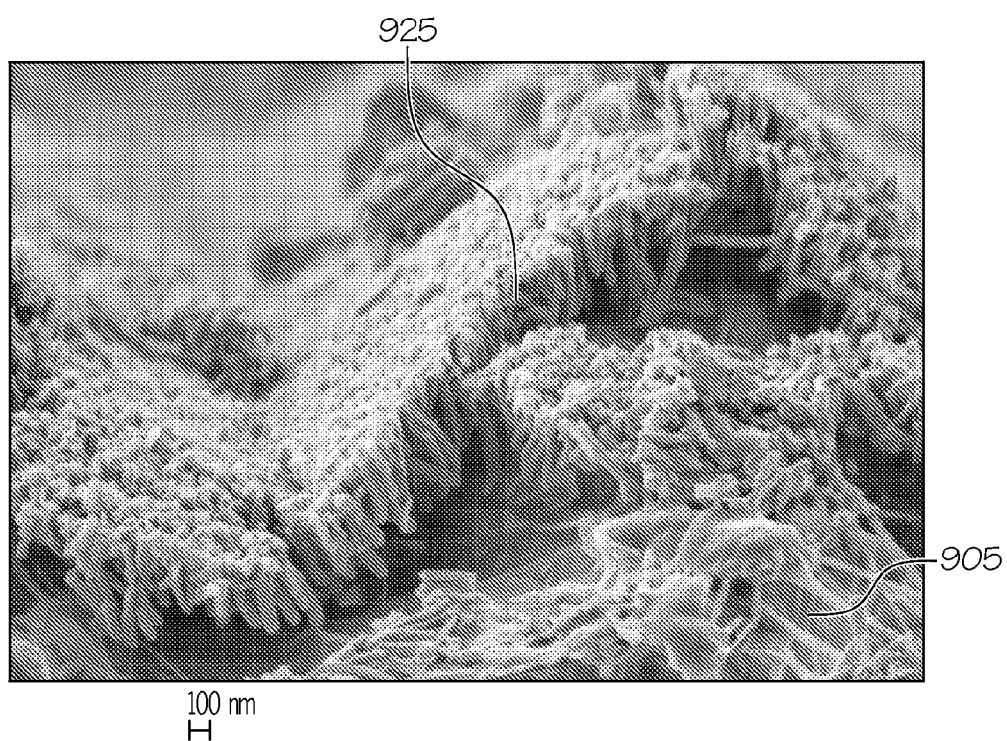

FIGS. 9A-D show top down SEM images of a set of whiskers transferred to the ePTFE substrate at the stage of FIG. 1D at successively higher magnifications after the temporary adhesive PVA is removed. These figures show the clean and nearly complete transfer of the whiskers to the ePTFE substrate with the whisker backing layer exposed. FIGS. 10A-B show SEM images of the cross-section of the whiskers on the ePTFE substrate of FIG. 9. The ePTFE porous substrate 905 with the layer of whiskers 925, and the exposed first surface can be seen. The SEM images of FIGS. 9-10 were taken after the PVA adhesive was removed and before any additional layer was deposited. The whiskers stay intact on the ePTFE substrate after the removal of the temporary PVA adhesive.

EXAMPLE 1

An ePTFE porous substrate was coated with a water soluble PVA (molecular weight around 10,000) adhesive layer using a 5 wt % aqueous solution. The PVA loading was about 0.6 mg Pt/cm² after drying.

A 3M NSTF catalyst layer supported on a carrying substrate was provided. In this example, the catalyst loading in the nanostructured thin catalyst layer was 0.05 mg Pt/cm².

The 3M NSTF catalyst layer included a polyimide carrying substrate, and a nanostructured thin catalytic layer of whiskers made from perylene red. There was a residual layer of perylene red on the interface between the whiskers and the polyimide carrying substrate. Using a hot press (105° C., 3.5 MPa, 4 minutes) process, the second surface of the layer of whiskers was pressed against the PVA adhesive layer on the ePTFE porous transfer substrate. The carrying substrate was then peeled off, leaving whisker layer on the porous transfer substrate and the residual layer of perylene red exposed.

The PVA adhesive layer was removed by coating a water/IPA (1:1 weight ratio) mixture solution multiple times until the solvent drained freely through the ePTFE substrate. An EtOH/NPA (1:1) mixture solution was coated on top of the whiskers multiple times to remove the residual layer of perylene red, exposing the first surface.

A diluted DuPont DE2020 ionomer solution (0.2 wt % in NPA:EtOH:H$_2$O=1:2:2 solution) was then coated on top of the whiskers to incorporate the ionomer into the whisker matrix. The ionomer solution drains across the whisker layer and thus coats a thin ionomer film on the surfaces of the whiskers.

Figure 11A:
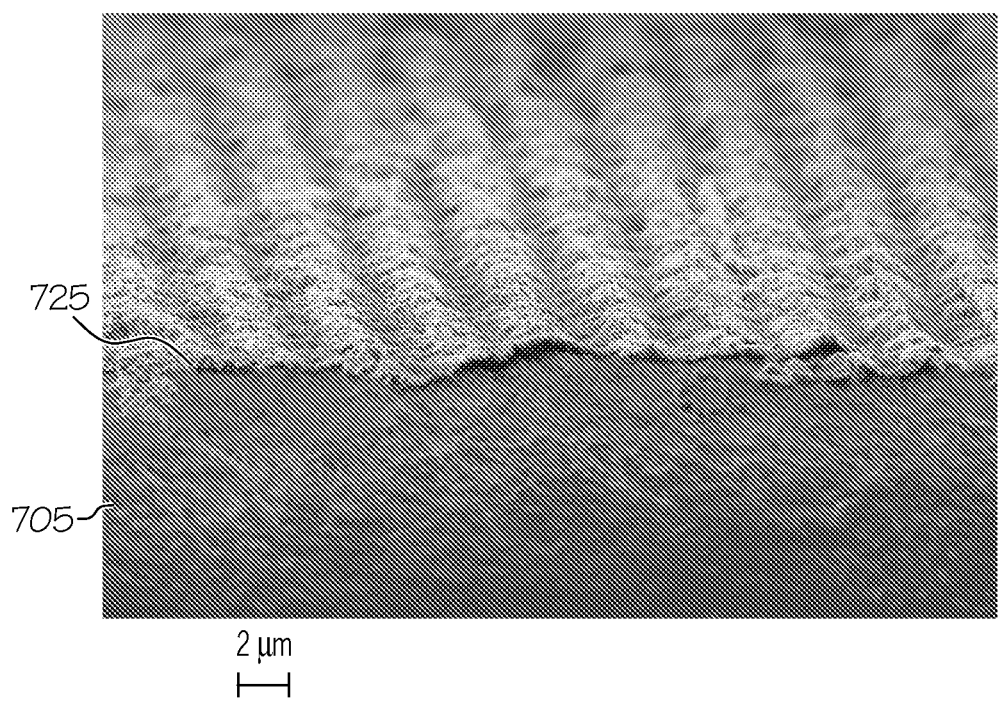
FIGS. 11A-B are SEM images of the reconstructed electrode donor decal of FIG. 7D.
Figure 11B:
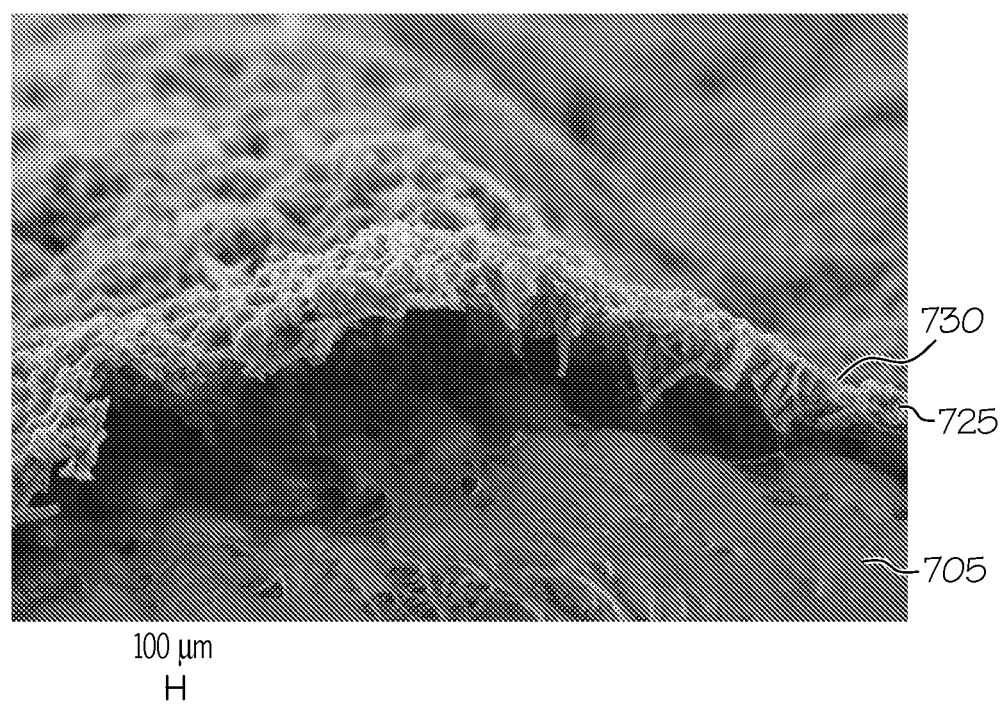

FIGS. 11A-B show SEM images of the cross section of the whiskers on the ePTFE substrate of FIG. 7D. In this case, the catalyst loading in the whisker catalyst layer was 0.05 mg Pt/cm$^2$. The image shows the ePTFE substrate 705 with the thin layer of ionomer 730 on the exposed surface of the nanostructured whisker catalyst layer 725.

Figure 12A:
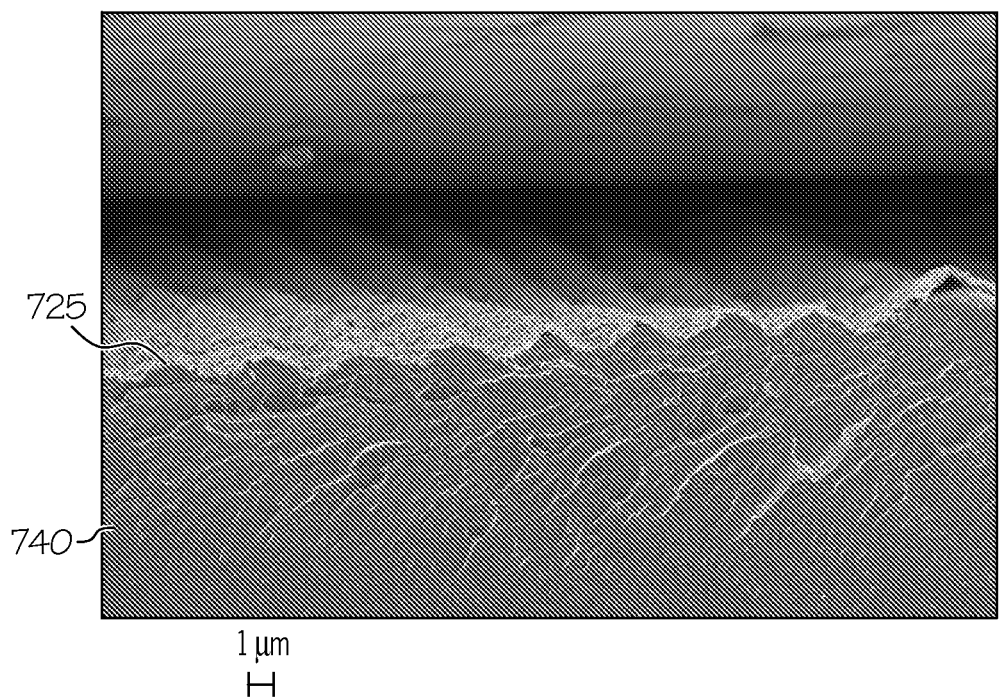
FIGS. 12A-B show SEM images of the cross-section of one embodiment of a catalyst coated membrane made with the reconstructed nanostructured thin catalytic layer electrode decal of FIG. 11.
Figure 12B:
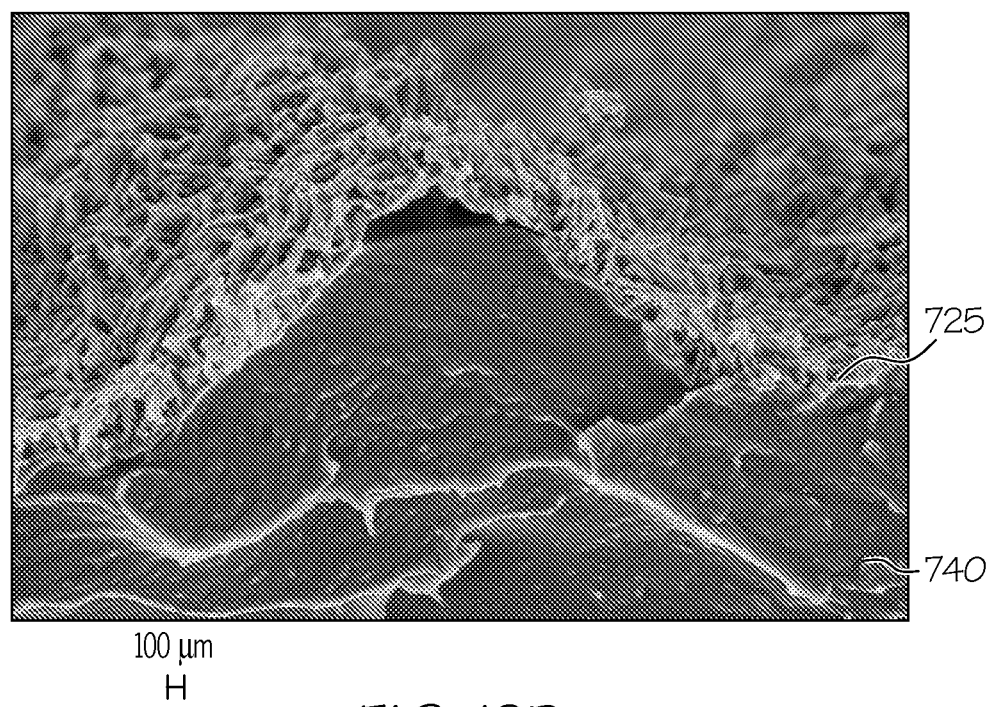

FIG. 12A-B show the cross-section of an CCM made through hot pressing (145° C., 1.4 MPa, 4 minutes) the reconstructed electrode decal shown in FIG. 11 onto a DuPont Nafion® NRE211 membrane. The whiskers have been attached to the PEM 740 and the ePTFE porous substrate 705 has been removed. As it can be seen, the ionomer coated side of the whisker layer is now against the PEM. The thin ionomer film 730 has become part of the PEM 740 and the whiskers 725 are intimately against the PEM 740.

EXAMPLE 2

Another embodiment of a method of transferring a 3M NSTF catalyst layer made from perylene red on a polyimide carrying substrate to an ePTFE transfer substrate is shown in FIGS. 13A-D.

Figure 13A:
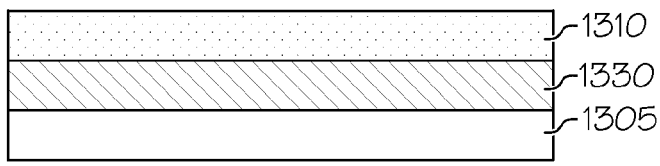
FIGS. 13A-D are an illustration of another embodiment of the method of fabricating an electrode decal containing a nanostructured thin catalytic layer.

FIG. 13A shows an ePTFE porous substrate 1305 is precoated with an intermediate layer 1330. Intermediate layer 1330 included a mixture of PVA and Vulcan XC-72 carbon from Cabot Corporation. The weight ratio between PVA and Vulcan carbon was 1:1. The solvent used in this ink was NPA:EtOH:H$_2$O=1:2:2.

A PVA adhesive layer 1310 was coated on top of the intermediate layer 1330.

Figure 13B:
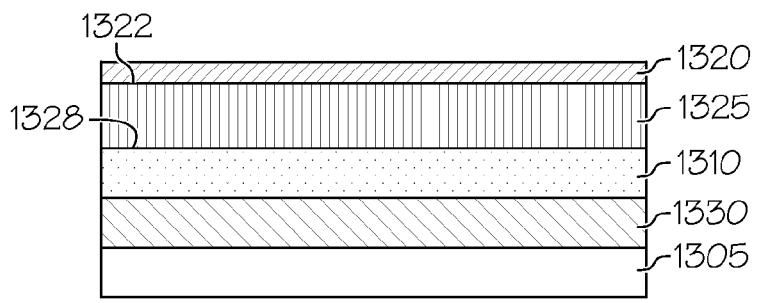

A nanostructured thin catalytic layer on a carrying substrate including a polyimide substrate, a residual layer of perylene red 1320, and whiskers 1325 was placed in contact with the PVA adhesive layer 1310 to form a composite structure. The polyimide substrate was removed after hot press. The remaining structure is shown in FIG. 13B.

The PVA adhesive layer 1310 and the PVA adhesive in intermediate layer 1330 was then removed with a water/IPA mixture. The whiskers could mix into the intermediate layer 1330 after the temporary PVA adhesive is removed.

Figure 13C:
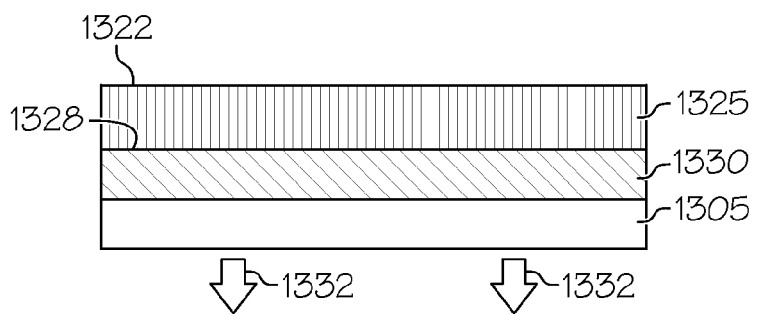

The residual layer of perylene red 1320 was removed by rinsing the whiskers 1325 with an EtOH/NPA mixture, exposing first surface 1322, as shown in FIG. 13C.

Figure 13D:
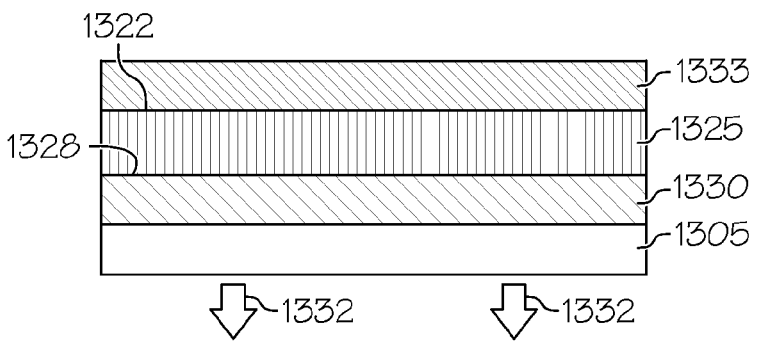

An ionomer solution diluted from DuPont Nafion® DE2020, 1333 was added as shown in FIG. 13D by coating the diluted ionomer solution (0.5 wt % with IPA:H$_2$O=1:1 solution) onto the whiskers. The ionomer solution drained through the intermediate layer 1330 and the whisker layer 1325 and thus coated a thin ionomer layer film on the particles in the intermediate layer 1330 and on the surface of the whiskers. In this case, excessive ionomer was used to build up a thick ionomer layer 1333 on top of the whisker layer 1325.

Vacuum 1332 was applied during the removal of the adhesive layer, and/or the removal of the residual material from the whisker formation, and/or the deposition of the ionomer layer.

Figure 14A:
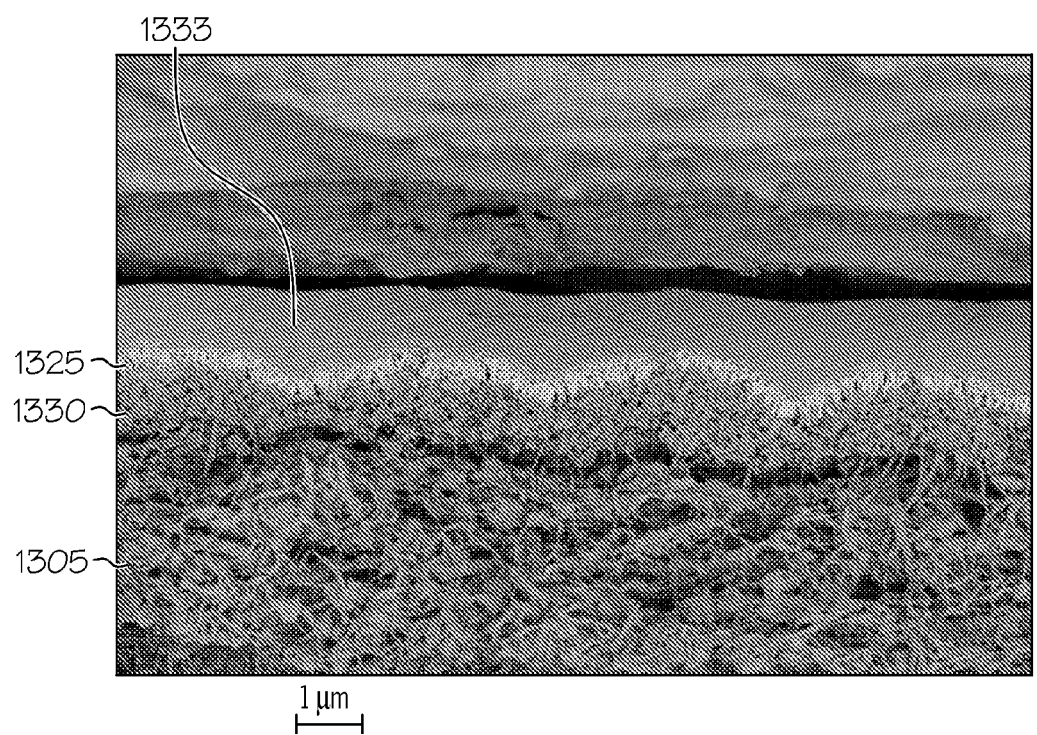
FIGS. 14A-B show SEM images of the cross-section of one embodiment of a nanostructured thin catalytic layer on the porous transfer substrate of FIG. 13D.
Figure 14B:
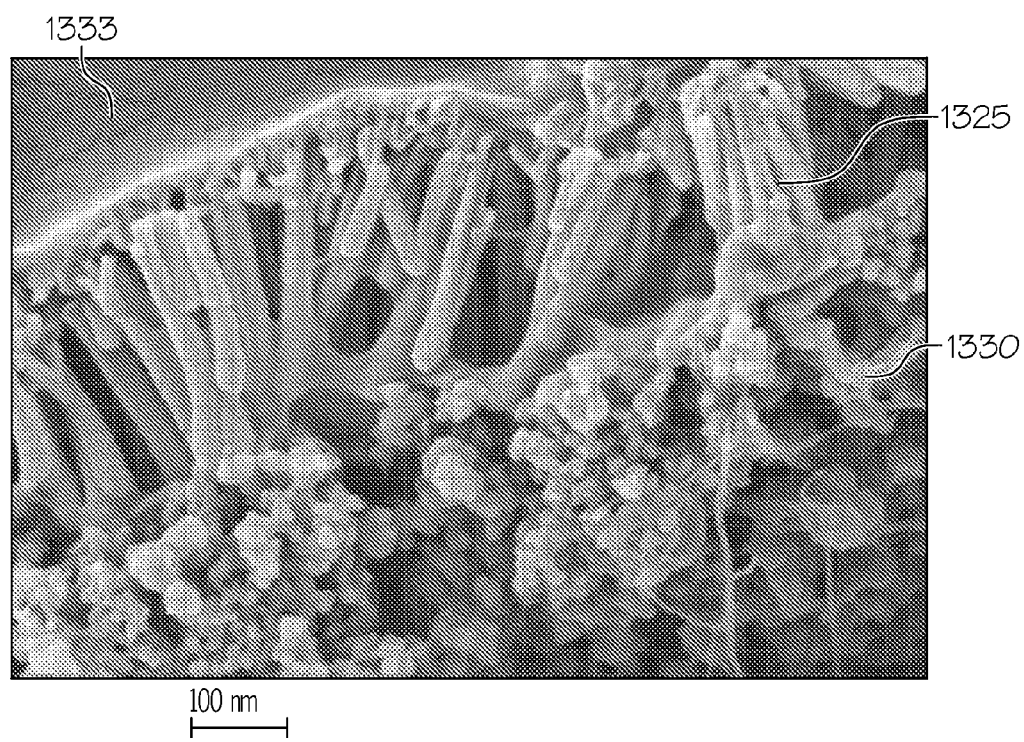
Figure 15A:
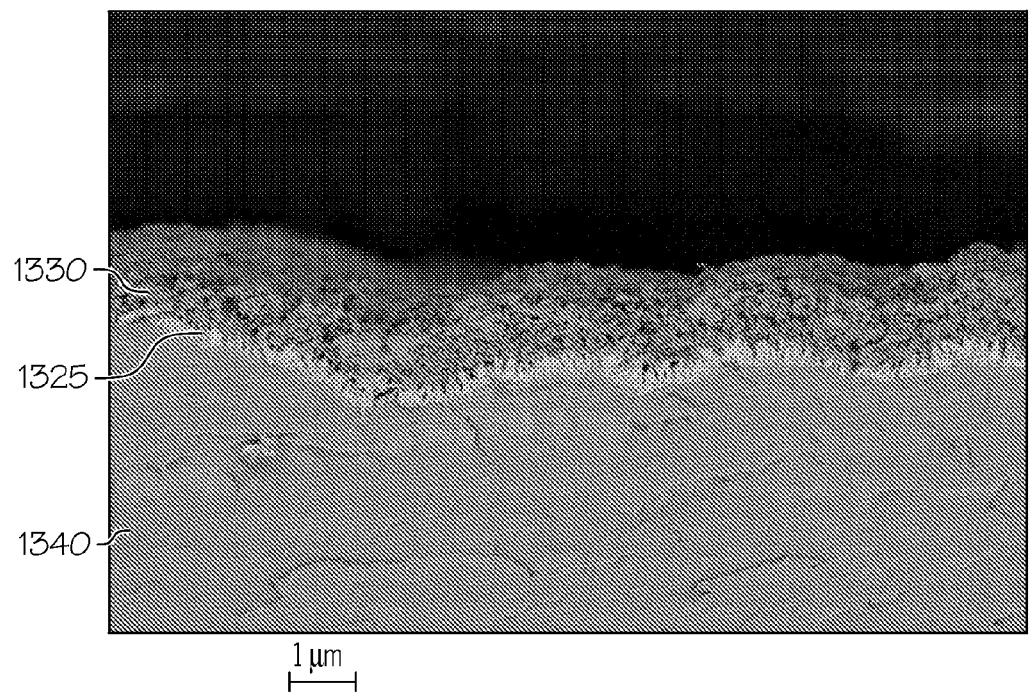
FIGS. 15A-B show SEM images of the cross-section of one embodiment of a catalyst coated membrane made with the reconstructed nanostructured thin catalytic layer electrode decal of FIG. 14.
Figure 15B:
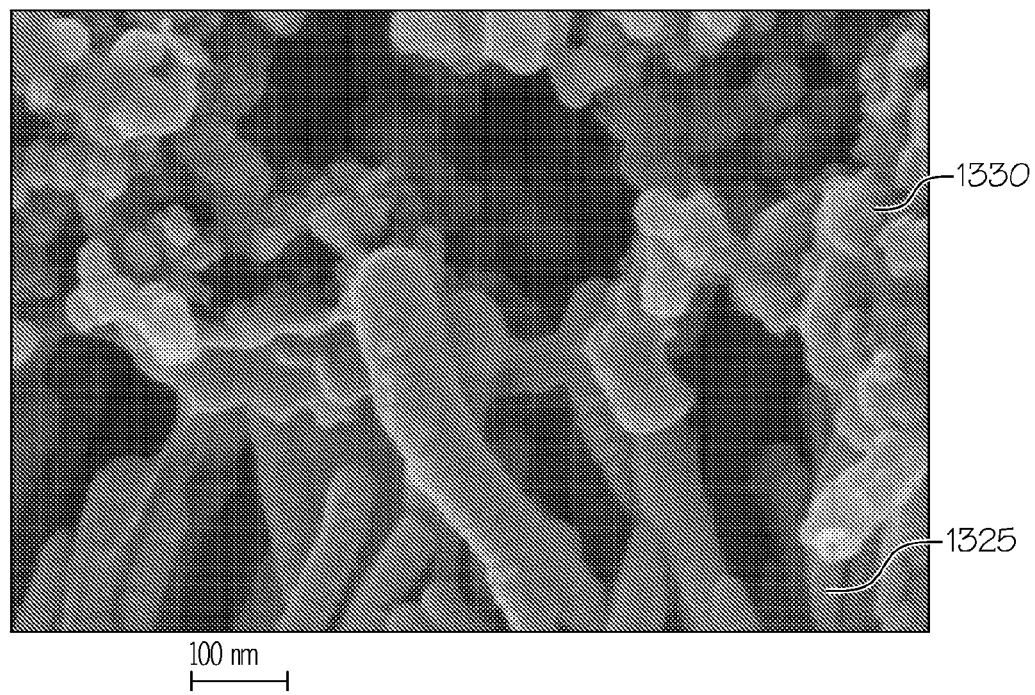

FIGS. 14A-B are SEM images of the cross-section of the reconstructed electrode made according to Example 2. The ePTFE substrate 1305 has the layer of Vulcan carbon 1330 sandwiched between the layer of whiskers 1325 and ePTFE substrate 1305. The excessive ionomer 1333 built up on top the whisker layer can be clearly seen. FIGS. 15A-B are SEM images of the cross-section of an CCM made through hot pressing (145° C., 1.4 MPa, 4 minutes) the electrode decal shown in FIG. 14 onto a DuPont Nafion® NRE211 membrane. The whiskers have been attached to the PEM 1340 and the ePTFE porous substrate 1305 has been removed. As it can be seen, the excessive ionomer film 1333 formed on top of the whisker layer is not visible any more. It has become part of the PEM 1340, and the whiskers 1325 are intimately against the PEM 1340. The carbon layer 1330 is now exposed and becomes the surface of the catalyst coated membrane.

EXAMPLE 3

Figure 16A:
FIGS. 16A-D are an illustration of another embodiment of the method of fabricating an electrode decal containing a nanostructured thin catalytic layer.
Figure 16B:
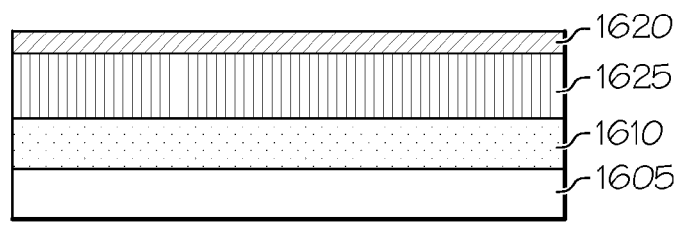
Figure 16C:
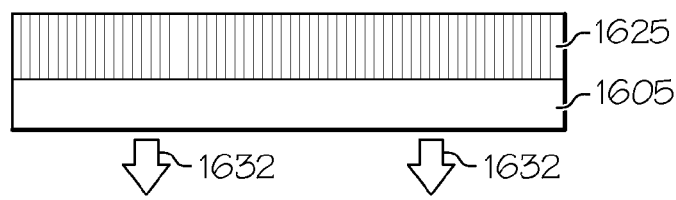

Another embodiment of a method of transferring a NSTF catalyst layer from a polyimide carrying substrate to an ePTFE transfer substrate is shown in FIGS. 16A-D. FIG. 16A shows an ePTFE porous substrate 1605 coated with a PVA adhesive layer 1610.

The nanostructured thin catalytic layer including a polyimide carrying substrate, a perylene red residual layer 1620, and whiskers 1625 with nanostructured thin catalyst Pt loading at 0.05 mg Pt/cm$^2$, was contacted with the PVA adhesive layer 1610 using a hot press process (105° C., 3.5 MPa, and 4 minutes) to form a composite structure. The polyimide substrate was peeled off after hot pressing, leaving the structure shown in FIG. 16B.

The PVA adhesive layer 1610 was then removed using a water/IPA solution (1:1 weight ratio), and the perylene red residual layer 1620 was also removed using an EtOH/NPA mixture.

Figure 16D:
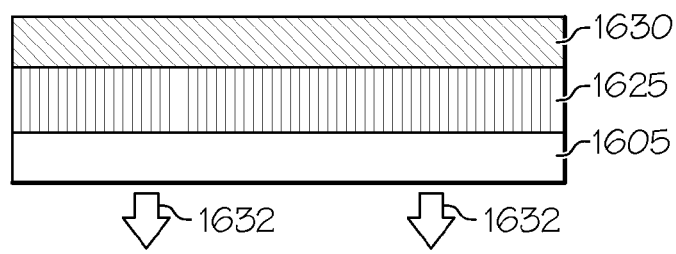

An intermediate layer 1630 containing DuPont Nafion® DE2020 ionomer and Pt/Vulcan TEC10V50E catalyst from Tanaka Kikinzoku Kogyo K. K., was added as shown in FIG. 16D by coating an ink with the ionomer to Vulcan carbon weight ratio at 1.5 in a solvent of H$_2$O:EtOH:NPA=2:2:1 onto the whiskers layer 1625. The Pt loading in the Pt/Vulcan layer 1630 is 0.05 mg Pt/cm$^2$. When the ink of carbon or catalyst mixed with ionomer is coated onto the whisker layer 1625, the solution will drain through the whisker layer 1625 and thus also coat a thin ionomer layer film on the surface of the whiskers.

Vacuum 1632 was applied during the removal of the adhesive layer, and/or the removal of the residual perylene red, and/or the deposition of the ionomer layer.

Figure 17A:
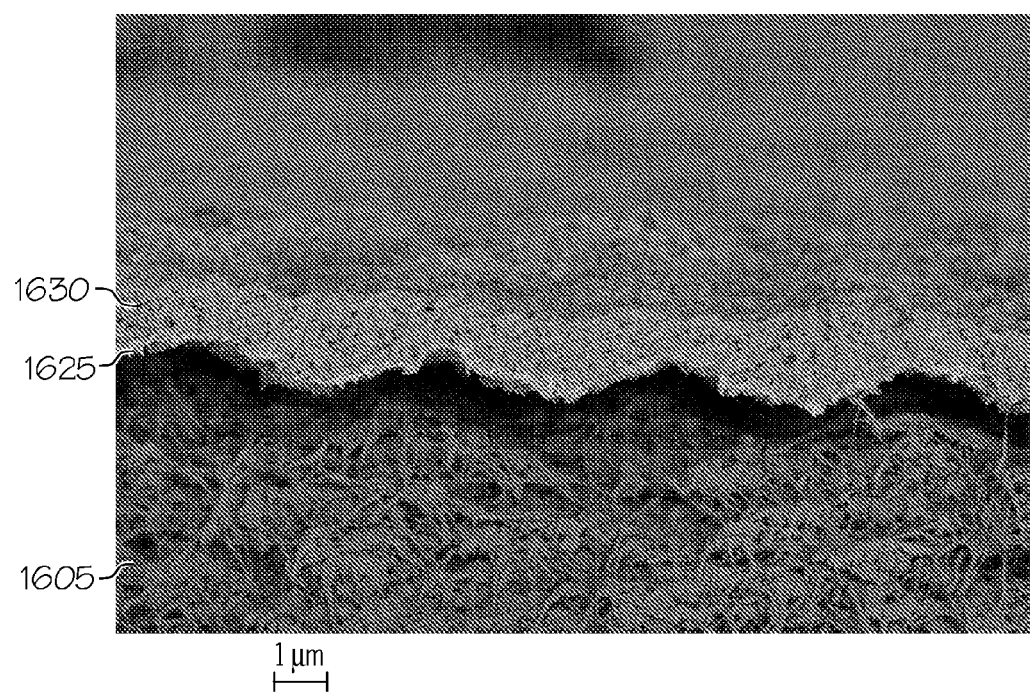
FIGS. 17A-B are SEM images of the cross-section of one embodiment of a nanostructured thin catalytic layer on the porous substrate of FIG. 16D.
Figure 17B:
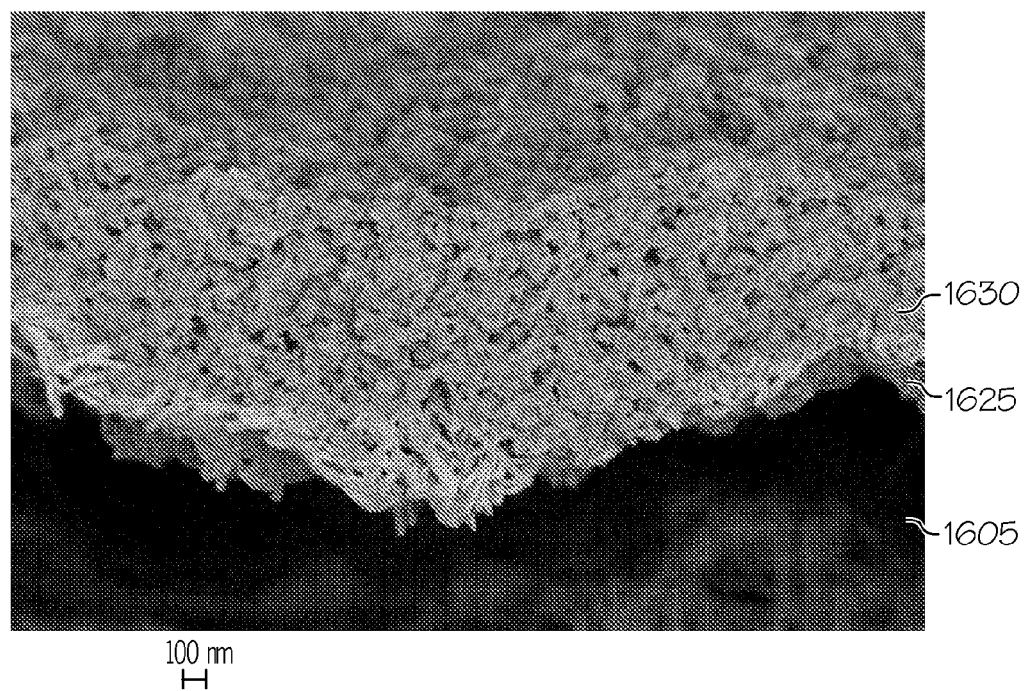
Figure 18A:
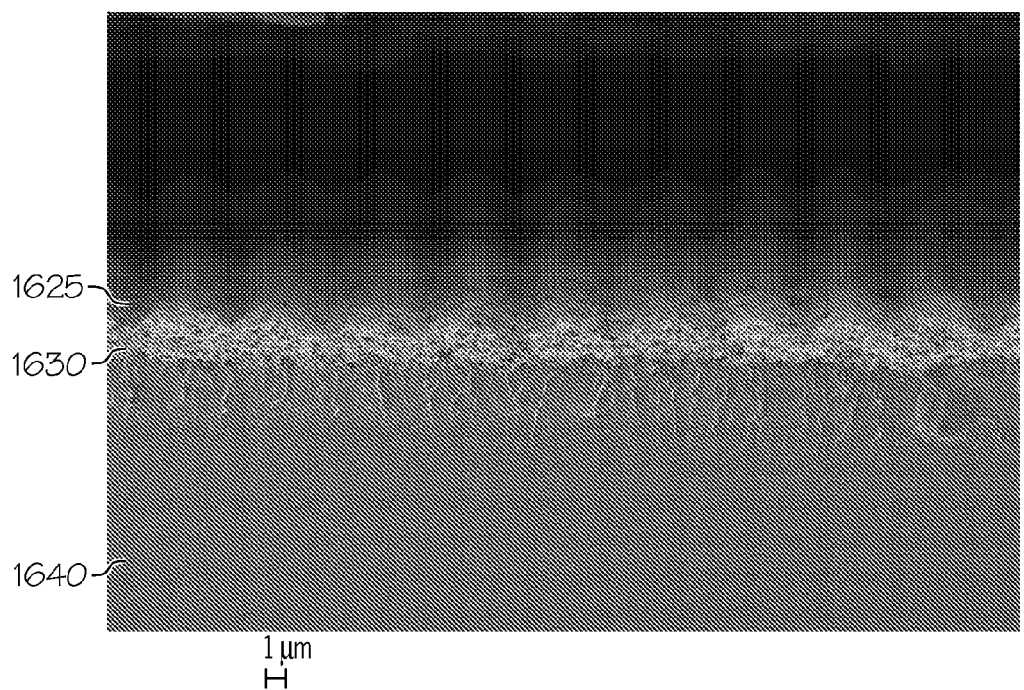
FIGS. 18A-B show SEM images of the cross-section of one embodiment of a catalyst coated membrane made with the reconstructed nanostructured thin catalytic layer electrode decal of FIG. 17.
Figure 18B:
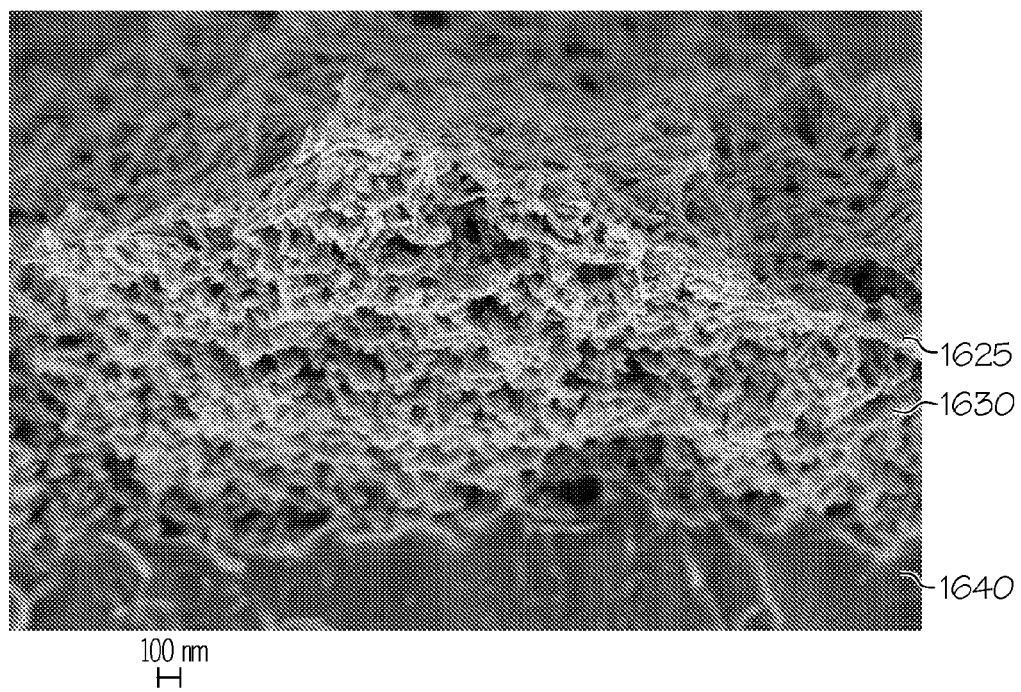

FIGS. 17A-B are SEM images of the cross-section of the reconstructed electrode decal made according to Example 3. The electrode has the whiskers 1625 between a layer of Pt/Vulcan catalyst mixed with Nafion® DE2020 ionomer 1630 and ePTFE substrate 1605. FIGS. 18A-B are SEM images of the cross-section of a catalyst coated membrane made using the reconstructed electrode decal from FIG. 17 through hot pressing (145° C., 1.4 MPa, 4 minutes) onto a DuPont Nafion® NRE211 membrane. The electrode has a layer of Pt/Vulcan catalyst mixed with Nafion® DE2020 ionomer 1630 between PEM 1640 and the whiskers 1625. After the transfer, the whiskers 1625 are exposed on the CCM.

EXAMPLE 4

Figure 19A:
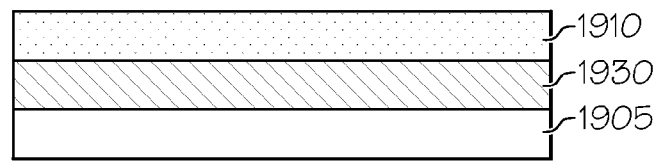
FIGS. 19A-D are an illustration of another embodiment of the method of fabricating an electrode decal containing a nanostructured thin catalytic layer.
Figure 19B:
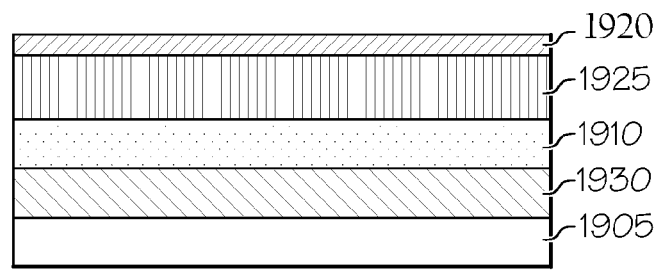
Figure 19C:
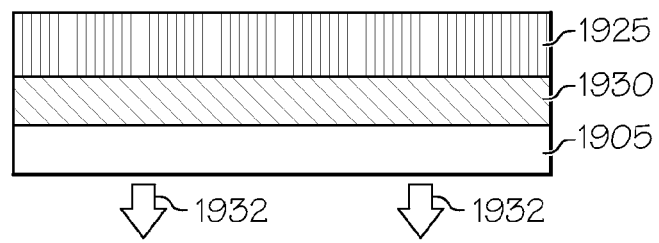

Another embodiment of a method of transferring a nanostructured thin catalytic layer from a polyimide carrying substrate to an ePTFE transfer substrate is shown in FIGS. 19A-D. FIG. 19A shows an ePTFE porous substrate 1905 first coated with an intermediate layer 1930 before coating a PVA adhesive layer 1910 on top of intermediate layer 1930. Intermediate layer 1930 is a mixture of PVA adhesive and Vulcan XC-72 carbon from Cabot Corporation.

The nanostructured thin catalytic layer including a polyimide substrate, a perylene red residual layer 1920, and whiskers 1925 was contacted with the PVA adhesive layer 1910 using a hot press process to form a composite structure (105° C., 3.5 MPa, and 4 minutes). The polyimide substrate was removed, leaving the structure shown in FIG. 19B.

The PVA adhesive layer 1910 and the PVA in the intermediate layer 1930 was then removed using a water/IPA solution (H2O:IPA=1:1 weight ratio). The perylene red residual layer 1920 was removed by rinsing the whiskers with an $H_2O$/NPA mixture.

Figure 19D:
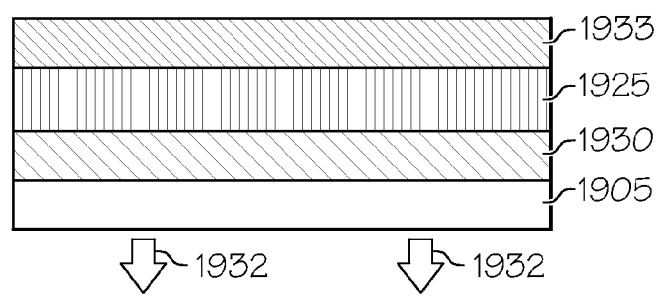

An additional intermediate layer 1933 containing DuPont Nafion® DE2020 ionomer solution and Vulcan XC-72 carbon from Cabot Corporation was added as shown in FIG. 19D by coating an ink with the ionomer to Vulcan carbon weight ratio at 1.5 in a solvent of $H_2O$:EtOH:NPA=2:2:1 onto the whiskers matrix 1925.

Vacuum 1932 was applied during the removal of the adhesive layer, and/or the removal of the residual perylene red, and/or the deposition of the ionomer layer.

Figure 20A:
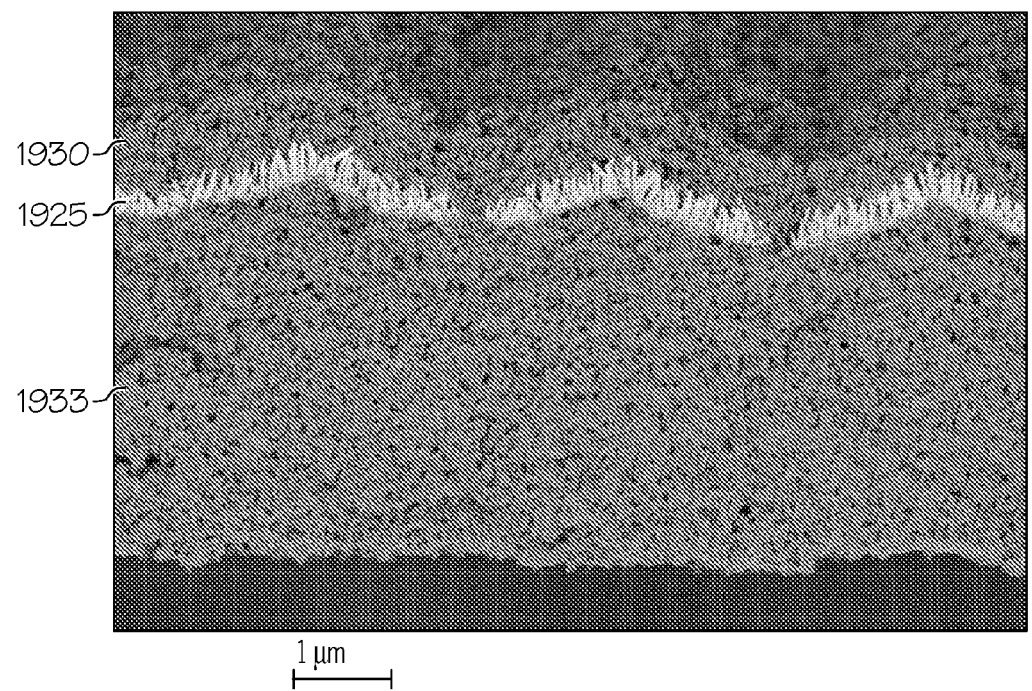
FIGS. 20A-B are SEM images of the cross-sections of embodiments of nanostructured thin catalytic layer on the porous transfer substrate made using the method of FIG. 19.
Figure 20B:
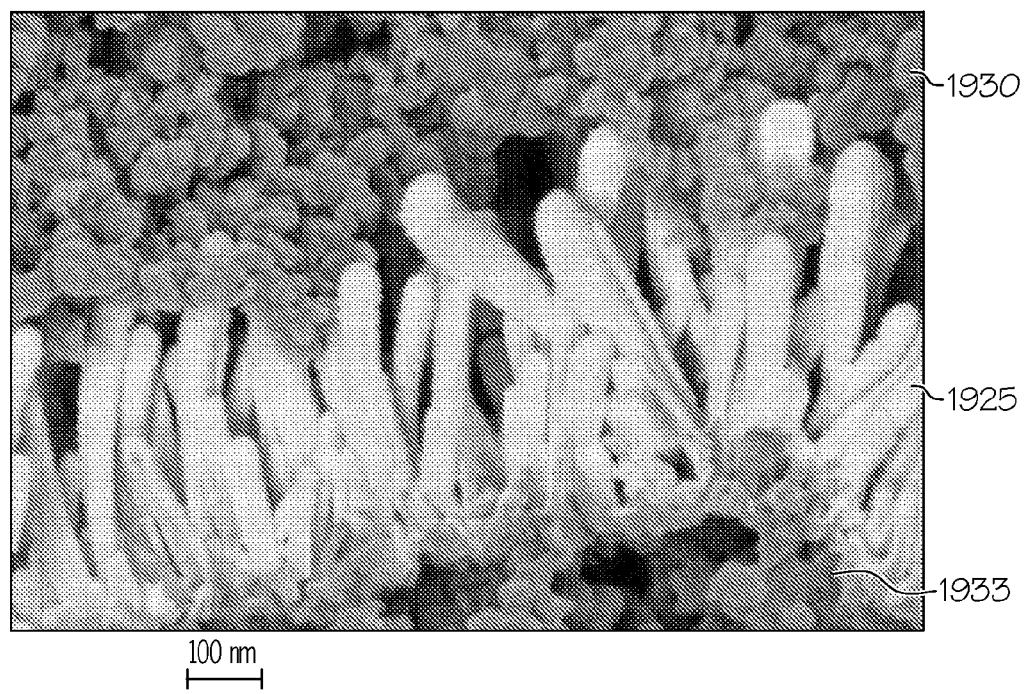
Figure 21A:
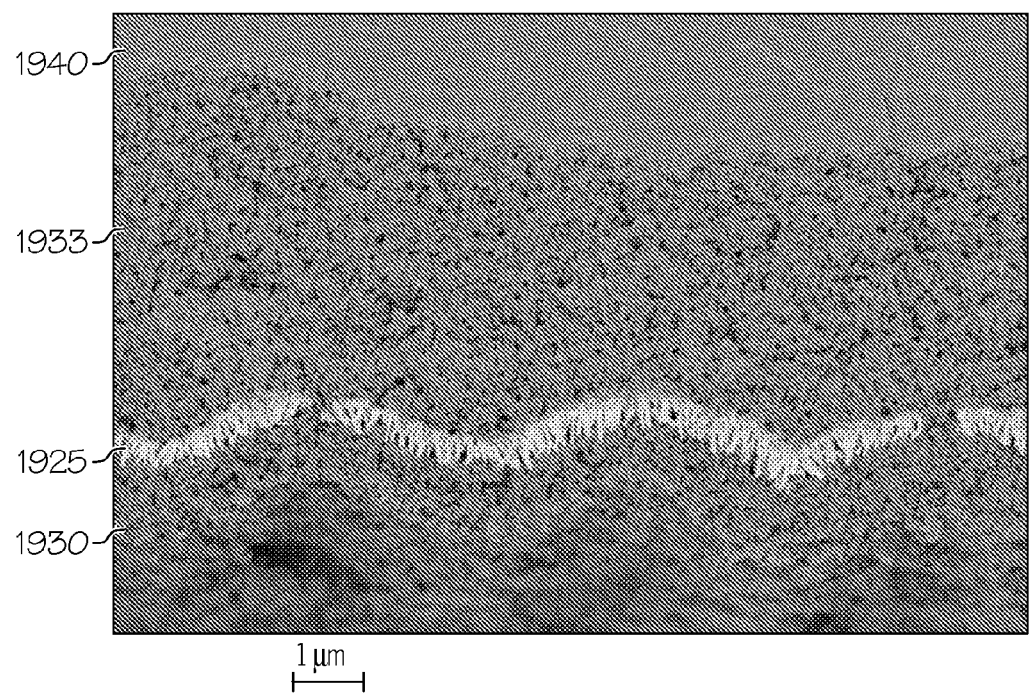
FIGS. 21A-B are SEM images of the cross-sections of embodiments of catalyst coated membrane made with porous nanostructured thin catalytic layer electrode decals of FIG. 20.
Figure 21B:
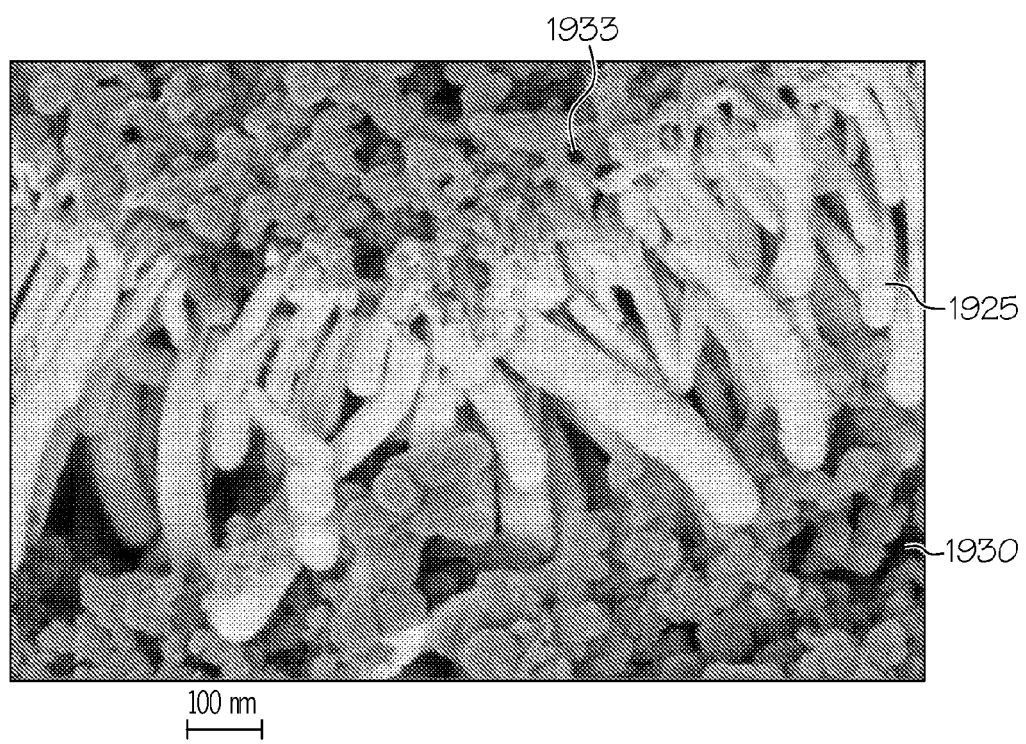

FIGS. 20A-B show SEM images of the reconstructed electrode containing the nanostructured thin catalytic layer on the porous ePTFE substrate of Example 4 with the whiskers 1925 sandwiched between the carbon intermediate layer 1930 and the carbon/ionomer intermediate layer 1933. FIGS. 21A-B show SEM images of catalyst coated membranes made using the reconstructed electrode decal containing the nanostructured thin catalytic layer of Example 4 by hot pressing the finished decal from FIG. 14 against a DuPont Nafion® NRE211 PEM. On PEM 1940 are carbon/ionomer intermediate layer 1933, the whiskers 1925, and exposed carbon intermediate layer 1930.

During the application of the ionomer solution or an ink containing ionomer and other particles, the ionomer will drain across the whisker layer and the intermediate layer to the pores of the porous substrate and thus coat a thin layer of ionomer on the particles in the intermediate layer and the surfaces of the individual whiskers, which would help the proton conduction during fuel cell operation.

EXAMPLE 5

This example shows the manufacture of an MEA using a reconstructed electrode decal having two nanostructured thin catalytic layers made according to the general process described in FIGS. 1-3.

FIGS. 22A-D show the preparation of one embodiment of a reconstructed electrode decal containing two layers of the nanostructured thin catalyst layers. A donor decal as described in FIG. 1, having an NSTF layer (0.05 mg Pt/cm$^2$) 2225A on a porous ePTFE substrate 2205A, was compressed against an acceptor decal as described in FIG. 2, having an ePTFE porous substrate 2205B, a temporary PVA adhesive layer 2210B, an NSTF layer (0.05 mg Pt/cm$^2$) 2225B, an intermediate layer 2230B containing DuPont Nafion® DE2020 ionomer and Pt/Vulcan TEC10V50E catalyst from Tanaka Kikinzoku Kogyo K. K. (0.05 mg Pt/cm$^2$), and another temporary PVA adhesive layer 2235B. The whole stack was hot pressed (105° C., 3.5 MPa, and 4 minutes) to form a composite structure, and the substrate 2205A from the donor substrate was peeled off.

Figure 22A:
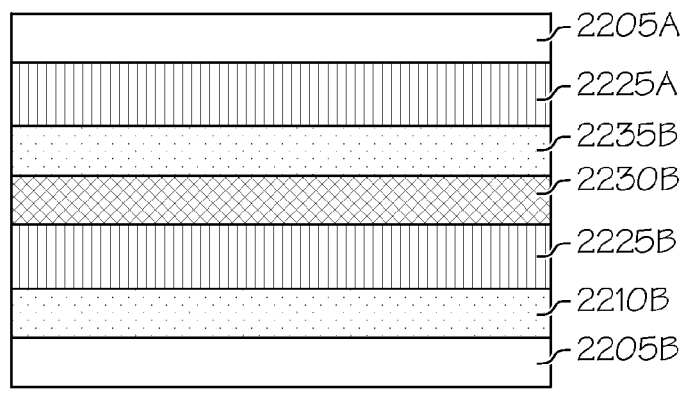
FIGS. 22A-D are an illustration of one embodiment of a method of fabricating a reconstructed electrode decal having two nanostructured thin catalytic layers.
Figure 22B:
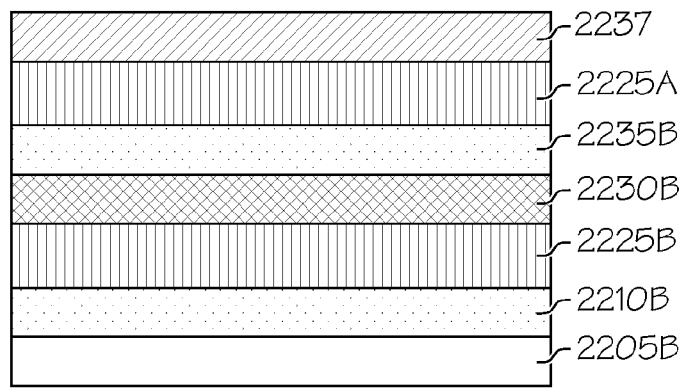
Figure 22C:
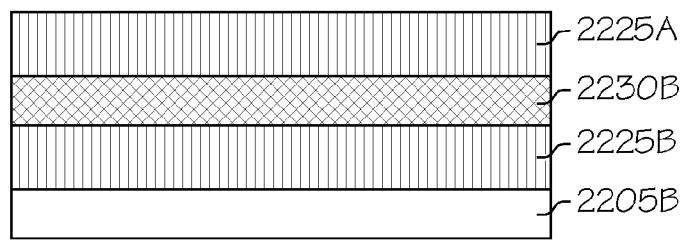

The PVA adhesive layers, 2210B and 2235B, were removed using a water/IPA solution (1:1 weight ratio) by coating the solution 2237 multiple times on top of 2225A as shown in FIG. 22B until the solution drained freely. A reconstructed decal having a Pt/Vulcan catalyst layer 2230B between two NSTF layers 2225B and 2225A on the acceptor substrate 2205B was formed, as shown in FIG. 22C.

Figure 22D:
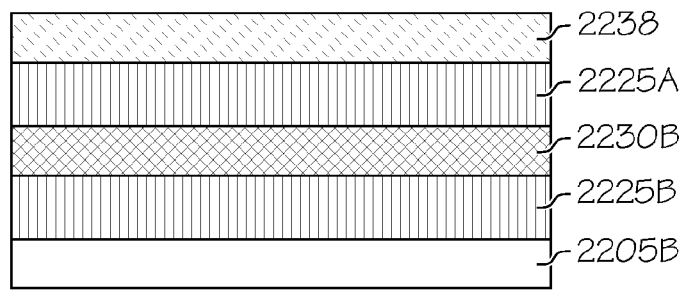

An ionomer solution diluted from DuPont Nafion® DE2020 was added as shown in FIG. 22D by coating the diluted ionomer solution (0.5 wt % with IPA:$H_2O$=1:1 solution) onto the NSTF layer 2225A. The ionomer solution drained through the intermediate layer 2230B and the NSTF layers 2225A and 2225B and thus coated a thin ionomer layer film on the particles in the intermediate layer 2230B (not shown) and on the surface of the whiskers 2238.

Figure 23A:
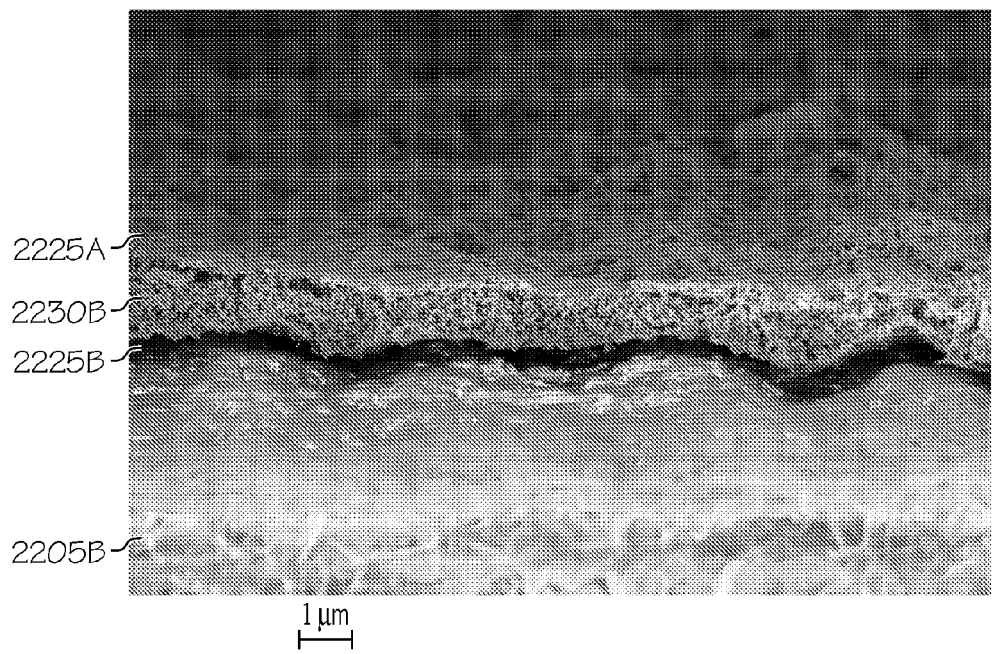
FIGS. 23A-B are SEM images of the cross-sections of embodiments of the nanostructured thin catalytic layers on the porous transfer substrate made using the method of FIG. 22.
Figure 23B:
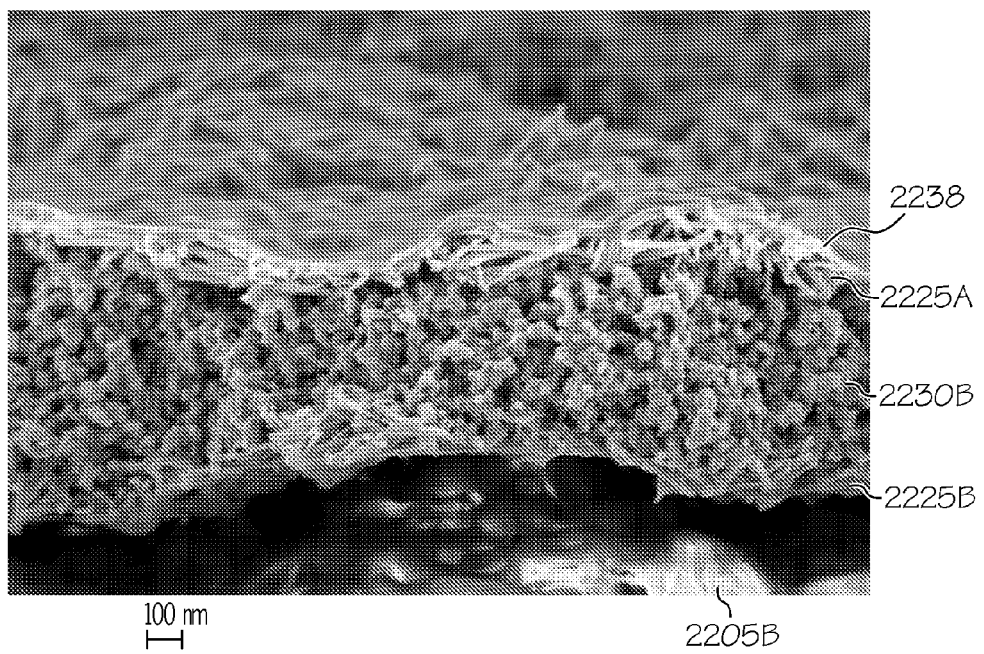
Figure 24A:
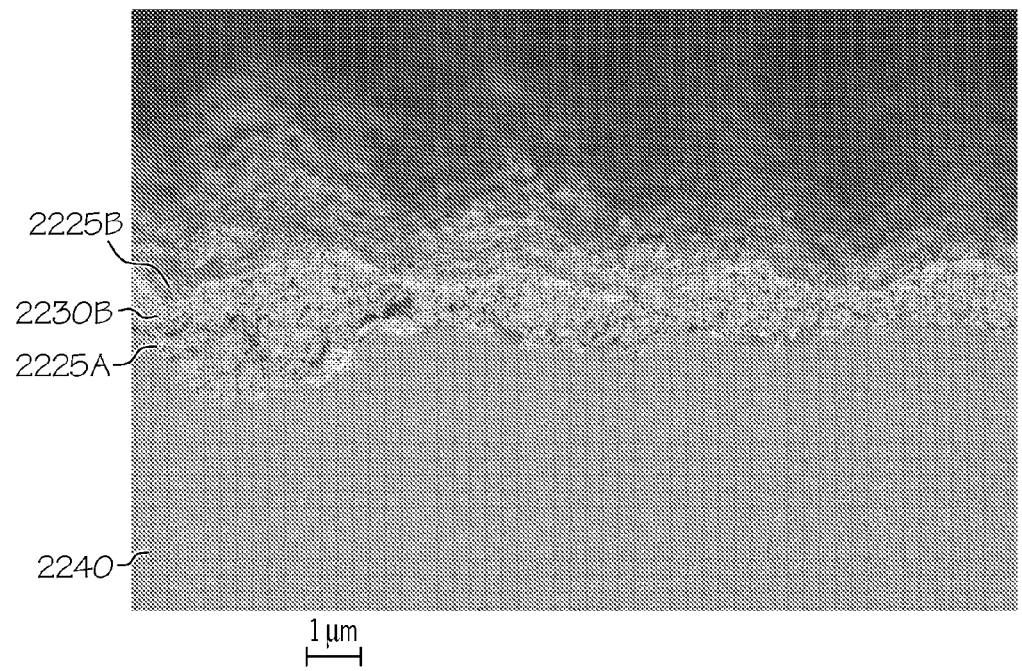
FIGS. 24A-B are SEM images of the cross-sections of embodiments of catalyst coated membrane made with porous nanostructured thin catalytic layer electrode decals of FIG. 23.
Figure 24B:
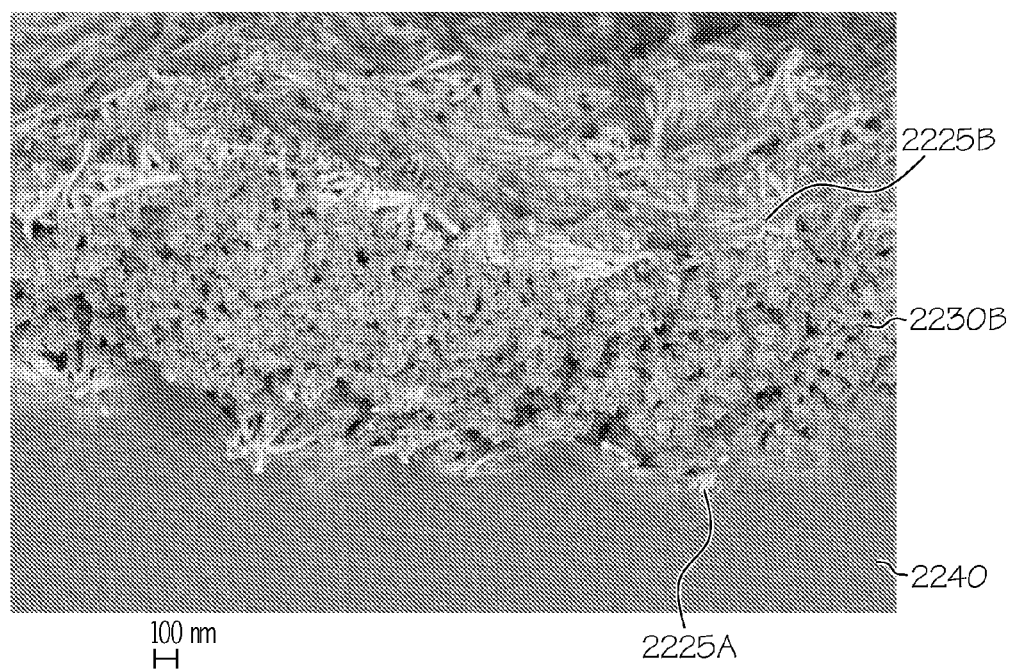

FIGS. 23A-B show a reconstructed electrode decal with two nanostructured thin catalytic layers. There are two nanostructured thin catalytic layer 2225A and 2225B separated by a Pt/Vulcan and ionomer mixture intermediate layer 2230B on the acceptor ePTFE substrate 2205B. FIGS. 24A-B show a CCM made by hot pressing the finished decal from FIG. 23 against a DuPont Nafion® NRE211 PEM 2240. Nanostructured thin catalytic layer 2225A is adjacent to the membrane 2240.

The following describes the fabrication method to prepare a catalyst coated diffusion media containing one or more nanostructured thin catalyst layer(s). The gas diffusion media layer normally contains carbon fiber paper or cloth substrate with a microporous layer (MPL) thereon. Suitable carbon fiber paper or carbon cloth materials are available, for example, from Toray Industries, Inc., Mitsubishi Rayon Inc., Freudenberg Group, and SGL Group. The microporous layer normally contains carbon powders and hydrophobic fluoropolymers. Because of the lack of inherent adhesive strength in the MPL and adhesion strength to the carbon fiber substrate, the nanostructured thin catalytic layer cannot be directly transferred to the gas diffusion media layer. Consequently, a pretreatment process was developed to maintain the integrity of the MPL layer and its adhesion to the carbon fiber substrate so as to enable the transfer of the nanostructured thin catalyst layer. The gas diffusion media layer with a microporous layer thereon is pretreated with a solution containing a temporary adhesive, or ionomer, or a combination of temporary adhesive and ionomer, before any transfer. The adhesive solution will seep into the microporous layer and the carbon fiber paper matrix. Once dried, the adhesive will be able to temporarily increase the inherent adhesion strength within the microporous layer and to the carbon fiber substrate. The nanostructured thin catalyst layer can then be transferred to the microporous layer from its original carrying substrate to MPL/CFP or the nanostructured thin catalyst layer donor decal as described above.

The CCDM can include one or more nanostructured thin catalytic layers, optionally with one or more intermediate layers. Depending on how the CCDM is made, either the first or second surface of the nanostructured thin catalytic layer(s) could be facing the MPL.

Figure 25A:
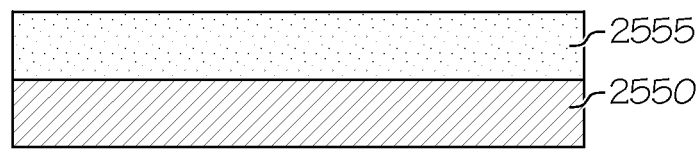
FIGS. 25A-B are an illustration of one embodiment of general method of pretreating diffusion media for fabricating a CCDM having a nanostructured thin catalytic layer electrode according to one or more embodiments.
Figure 25B:
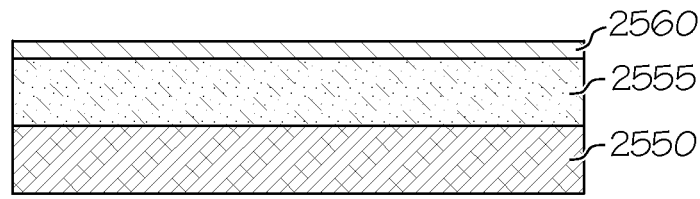

FIGS. 25A-B illustrate how the pretreatment of gas diffusion media is performed. The diffusion media includes carbon fiber substrate 2550 with adjacent microporous layer 2555.

A solution containing a temporary adhesive 2560 is coated on the microporous layer 2555. The solution can also include some ionomer together with the adhesive, if desired. The solution wets the MPL so that the solvent and the soluble temporary adhesive penetrate into the microporous layer 2555 and optionally also into the carbon fiber substrate 2550. The temporary adhesive temporarily binds the particles in the microporous layer together, and also binds the microporous layer to the carbon fiber paper. The temporary adhesive forms a thin bonding layer on top of the MPL 2555. An additive can be included in the solution to adjust the solution surface energy in order to help it penetrate into the microporous layer and carbon paper layer, if desired.

The adhesive solution 2560 can optionally include one or more of conductive particles, including, but not limited to carbon powder, and carbon fibers; catalyst; titanium dioxide; silica; nanofibers; and nanotubes and thus form a bonding layer containing the temporary adhesive layer and the optional material on top of the MPL 2555. The bonding layer can be made from an ink, if desired. Suitable adhesives include, but are not limited to, PVA, polyethylene oxide, polyacrylate, polyethylene vinyl acetate, and soluble cellulose.

One example of a suitable adhesive solution is composed of PVA dissolved in a mixture of water and alcohol. The alcohol helps wet the surface of the microporous layer, so the PVA temporary adhesive will get into the microporous layer and carbon fiber substrate when the solvent drains through the MPL and CFP.

Figure 26A:
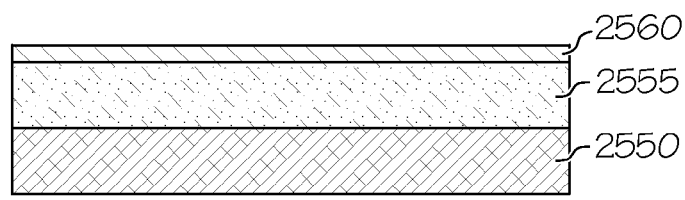
FIGS. 26A-D are an illustration of one embodiment of a general method of transferring a nanostructured thin catalytic layer electrode to the pretreated diffusion media of FIG. 25 and adding additional layers thereon according to one or more embodiments.

The method of transferring a nanostructured thin catalyst layer to the pretreated diffusion media is shown in FIGS. 26A-D. The pretreated diffusion media including the carbon fiber substrate 2550, microporous layer 2555, and bonding layer 2560 is shown in FIG. 26A. As shown, the temporary adhesive in the carbon fiber substrate 2550 and microporous layer 2555 helps to hold them together.

Figure 26B:
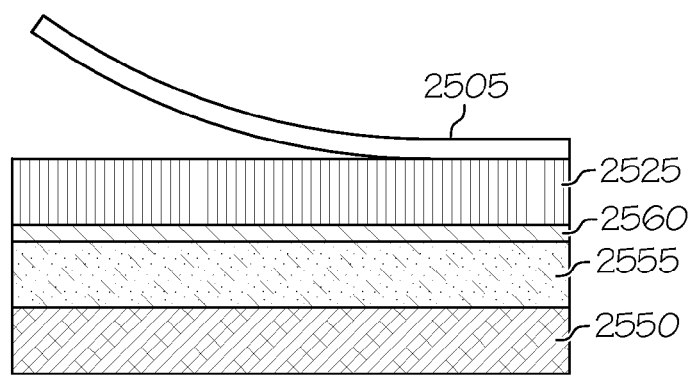

A nanostructured thin catalyst layer on its original carrying substrate or a donor decal as shown in FIG. 1D including a substrate 2505 and a nanostructured thin catalytic layer 2525 is inverted and placed on the pretreated diffusion media as shown in FIG. 26B. The electrode decal and diffusion media can be combined using a suitable process including, but not limited to, static pressing with heat and pressure, or for continuous roll production, laminating, nip rolling, or calendering.

Figure 26C:
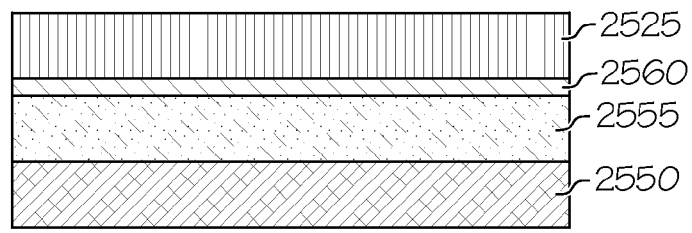

The substrate 2505 is removed, leaving the structure shown in FIG. 26C. If the CCDM is to include a single nanostructured thin catalytic layer, the adhesive in the bonding layer (or the whole bonding layer if there are no additional materials) and the adhesive in the MPL and CFP can be removed at this point using a suitable process. One example of a suitable process involves coating on top of FIG. 26C with a solvent to dissolve the adhesive. Suitable solvents include, but are not limited to, water/alcohol mixtures, such as for example, a water/isopropanol (IPA) mixture. When the solvent drains through the pores of the microporous layer and carbon fiber substrate, the adhesive in the MPL and CFP would also be removed. A vacuum is preferably applied while the adhesive is removed.

Figure 26D:
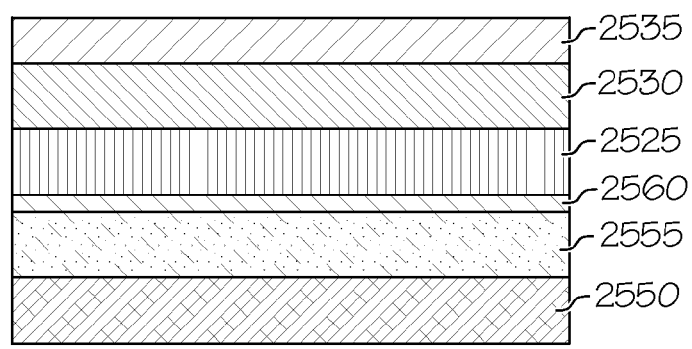

If more than one nanostructured thin catalytic layer will be transferred onto the diffusion media, then the bonding layer and the adhesive in the MPL and CFP are not removed at this point. Optionally, an intermediate layer 2530 can be deposited on the nanostructured thin catalytic layer 2525, as shown in FIG. 26D. The intermediate layer can include a temporary adhesive and one or more of ionomer, conductive particles, including, but not limited to, carbon powder, carbon fibers; catalyst; titanium dioxide; silica; nanofibers; and nanotubes. A bonding layer 2535 can also be applied onto the nanostructured thin catalytic layer 2525 or the intermediate layer 2530 to increase the adhesion strength of the multiple layers on the diffusion media. Additional nanostructured thin catalyst layers can be transferred by laminating additional donor decals (for example. those shown in FIG. 1D, FIG. 4C or FIG. 6H) against the bonding layer 2535.

A vacuum is preferably applied while the solution is coated on the nanostructured thin catalytic layer 2525, and the pores of the microporous layer and carbon fiber act as a drain.

EXAMPLE 6

FIG. 27 shows an example of the manufacture of a CCDM with a single nanostructured thin catalytic layer. The process starts with a pretreated diffusion media as shown in FIG. 25, having a carbon fiber substrate (MRC105 from Mitsubishi Rayon Inc.) 2750 and a microporous layer 2755 containing a mixture of acetylene back and PTFE which are precoated with 5 wt % PVA in a water and IPA (3:1) solution. The PVA will seep into the MPL and carbon fiber substrate when the solution is coated onto the MPL 2755. A donor decal from FIG. 1, having a nanostructured thin catalyst layer NSTF (0.15 mg Pt/cm$^2$) 2725 on a porous ePTFE substrate 2705, was pressed against the bonding layer 2760 (105° C., 1.4 MPa, and 4 minutes). The donor substrate 2705 was then peeled off to form the composite shown in FIG. 27B.

Figure 27A:
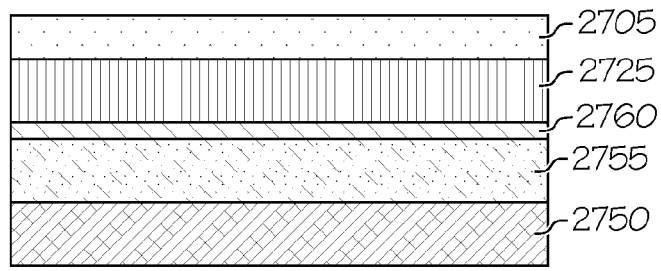
FIGS. 27A-E are an illustration of one embodiment of fabricating a catalyst coated diffusion media made with a nanostructured thin catalytic layer using method of FIG. 25 and FIG. 26 according to one or more embodiments.
Figure 27B:
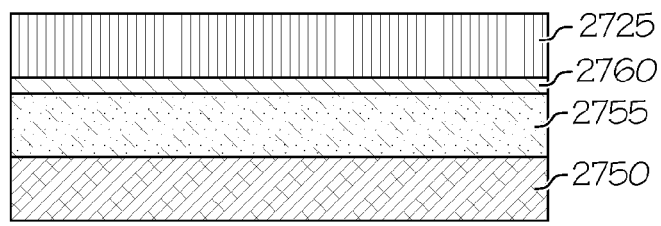
Figure 27C:
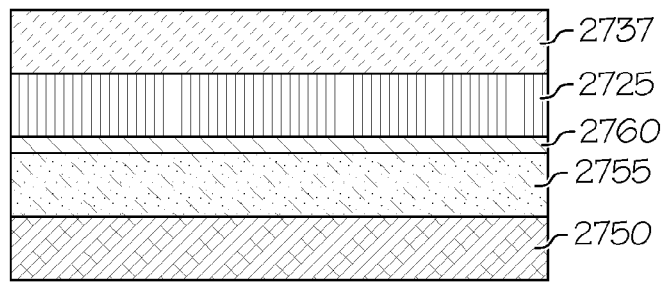
Figure 27D:
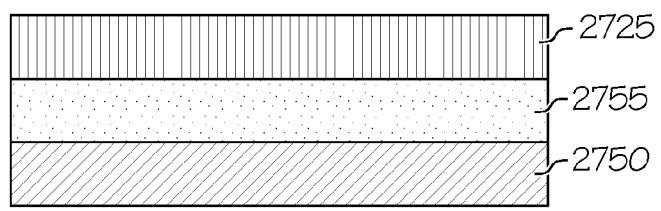

The PVA bonding layer 2760 and PVA inside of the MPL and CFP was then removed using a water/IPA solution (1:1 weight ratio) by coating the solution 2737 multiple times on top of 2725 as shown in FIG. 27C until the solution drained freely. A reconstructed CCDM with a layer of NSTF 2725 on the MPL layer 2755 was then formed as shown in FIG. 27D.

Figure 27E:
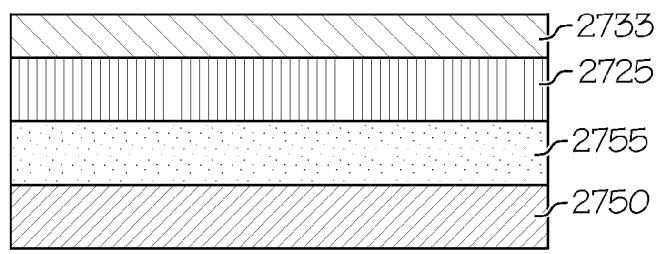

An ionomer solution diluted from DuPont Nafion® DE2020, 2733 was added as shown in FIG. 27E by coating the diluted ionomer solution (0.5 wt % with IPA:H$_2$O=1:1 solution) onto the NSTF layer 2725. The ionomer solution will drain across the NSTF layer and coat a thin layer ionomer film on the whiskers. Additional ionomer film can also be formed on top of the NSTF layer 2725 which would be against the PEM when MEA is fabricated and thus improve the interface between the NSTF and PEM.

Figure 28A:
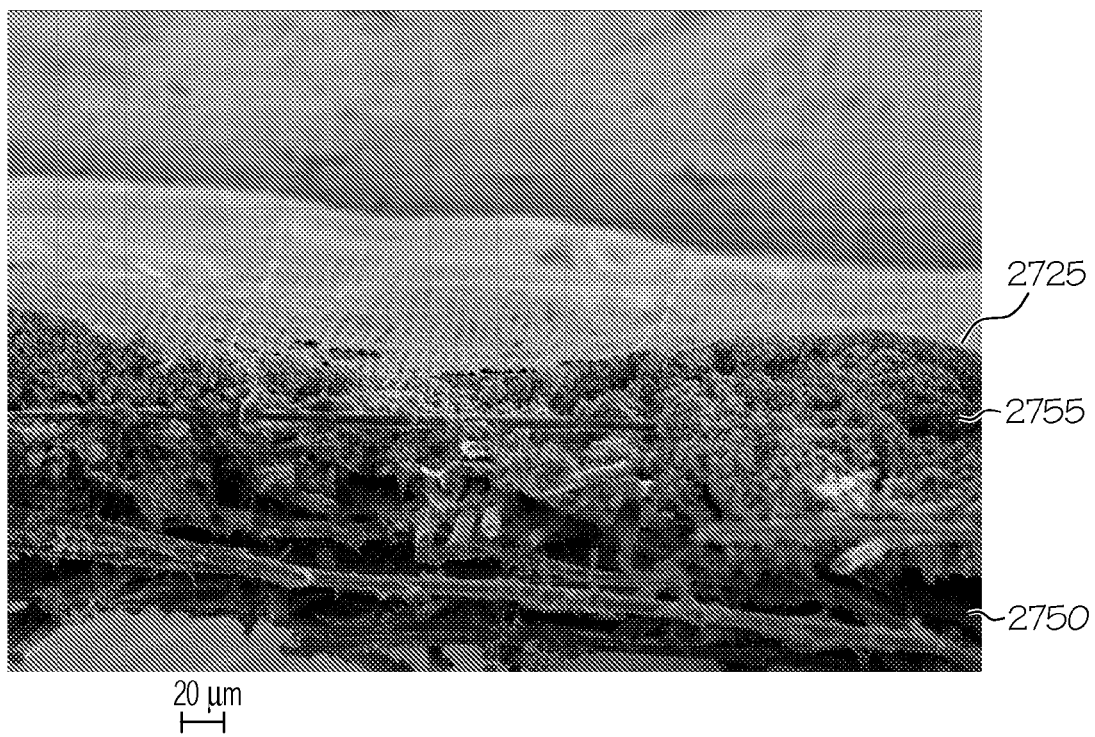
FIGS. 28A-B are SEM images of the cross-sections of embodiments of the catalyst coated diffusion media of FIG. 27.
Figure 28B:
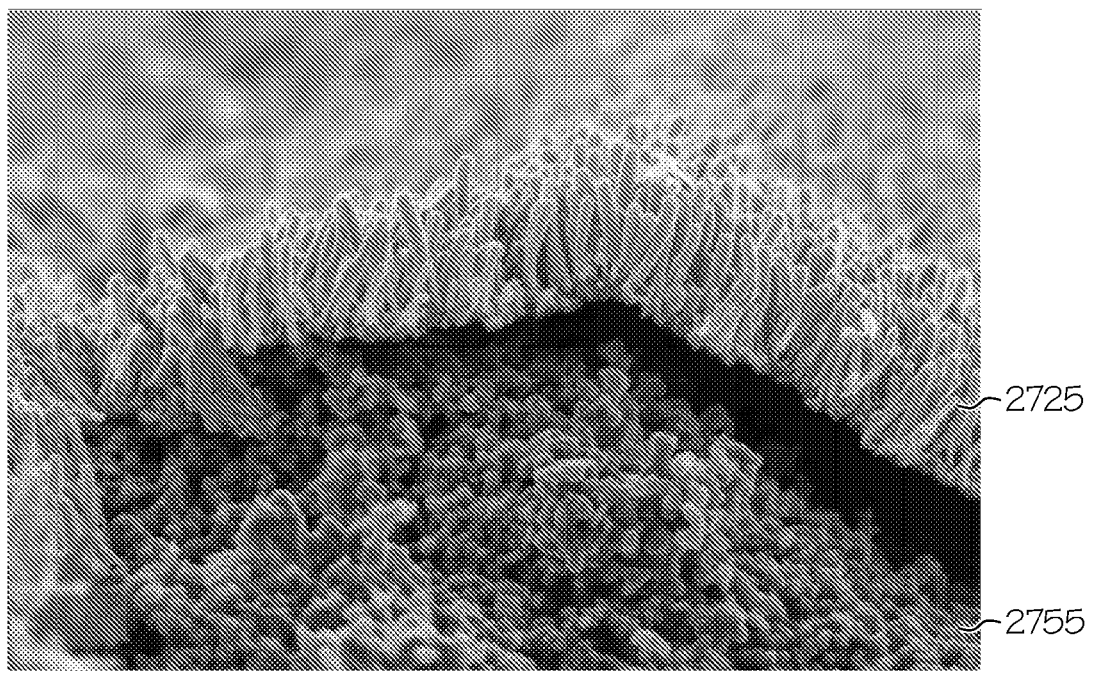
Figure 29A:
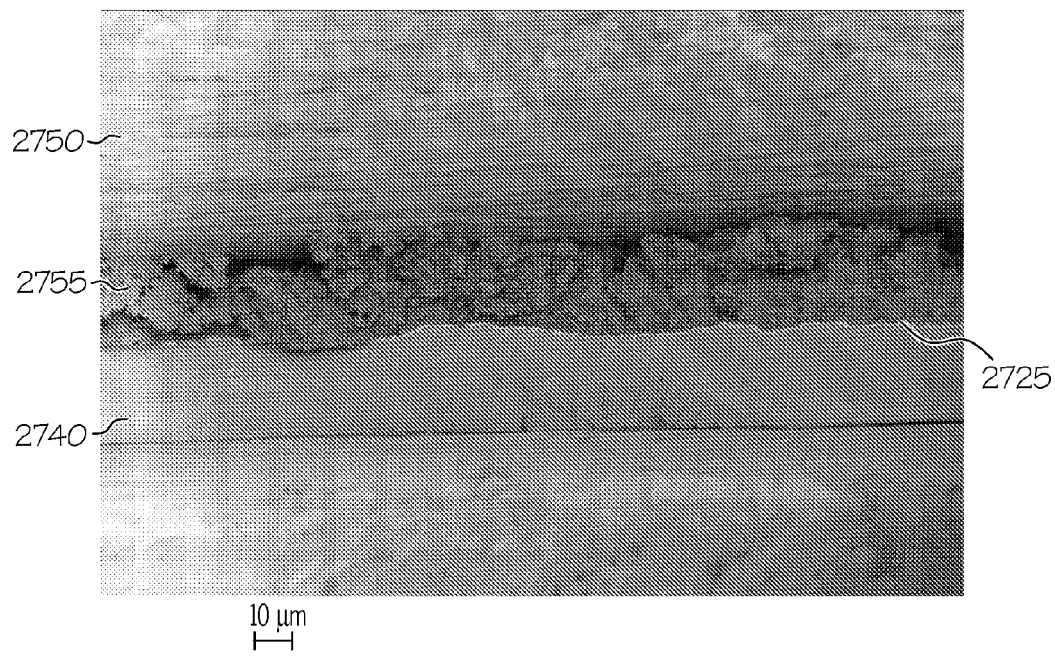
FIGS. 29A-B are SEM images of the cross-sections of the MEA made using the catalyst coated diffusion media of FIG. 28.
Figure 29B:
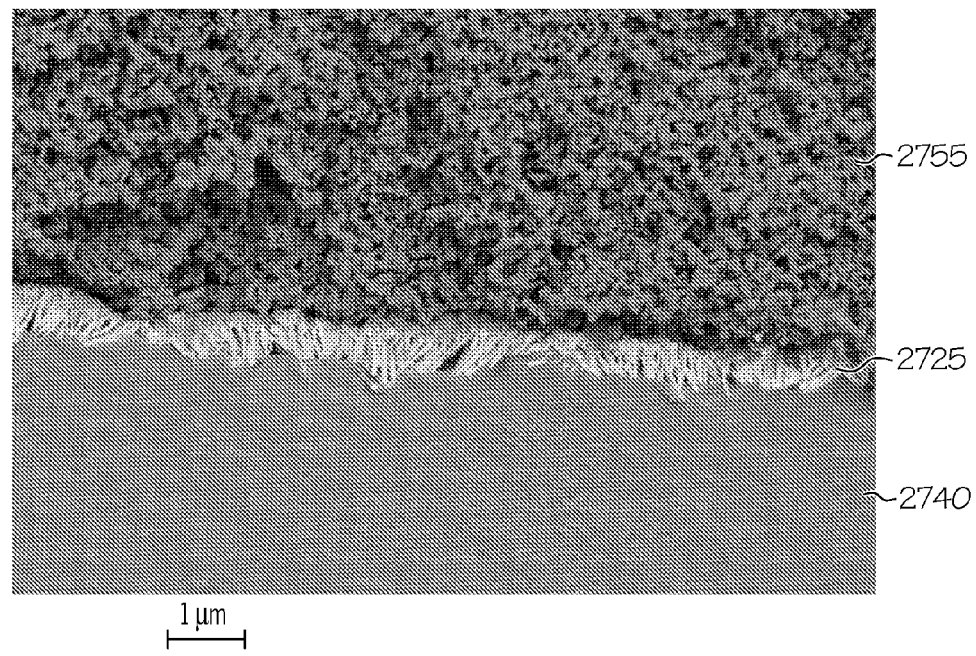

FIGS. 28A-B show the single nanostructured thin catalytic layer 2725 on the microporous layer 2755 and MRC 105 carbon fiber paper 2750. FIGS. 29A-B show the SEM images of the MEA prepared by hot pressing the finished CCDM from FIG. 28 against a DuPont Nafion® NRE211 PEM 2740. The NSTF layer 2725 is now positioned between MPL 2755 and the PEM 2740.

Alternatively, instead of using an adhesive alone as the bonding layer, the adhesive can be mixed with an ionomer, or an ionomer can be used alone. In any of these situations, at least one of conductive particles, carbon powder, carbon fibers, catalyst, titanium dioxide, silica, nanofibers, or nanotubes can be included in the bonding layer. If an adhesive is used in the bonding layer, it is removed as discussed above. If the adhesive is used in combination with ionomer and/or other materials, the ionomer and/or other materials are not removed with the adhesive, resulting in removal of a portion of the bonding layer, leaving a residual layer of the ionomer and/or other materials on the microporous layer. If ionomer is used without adhesive (with or without other materials), then at least some of the ionomer would have to be removed from the MPL to clear the gas transport passes for the fuel cell to run. However, ionomer is very difficult to remove, and the use of ionomer without another adhesive is not desirable.

EXAMPLE 7

In this example, as shown in FIG. 27E, instead of an ionomer solution as in Example 6, an ink composed of Nafion® DE2020 and Pt/Vulcan TEC10V50E catalyst from Tanaka Kikinzoku Kogyo K. K 2730 was coated on top of the NSTF layer 2725. The Pt loading in the Pt/Vulcan and ionomer mixture layer is 0.05 mg Pt/cm². When the solution drains across the NSTF layer, a thin layer ionomer film will be formed on the whiskers.

Figure 30A:
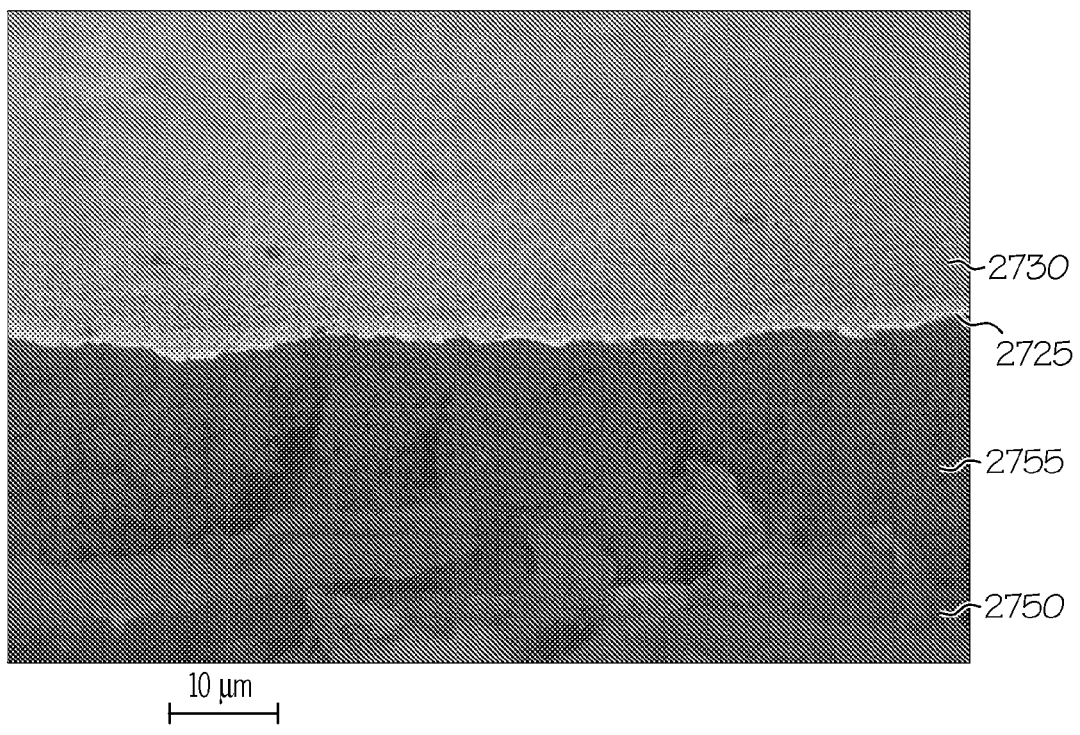
FIGS. 30A-B are SEM images of the cross-sections of embodiments of the catalyst coated diffusion media having a nanostructured thin catalytic layer and an additional catalyst layer coating according to method in FIG. 27.
Figure 30B:
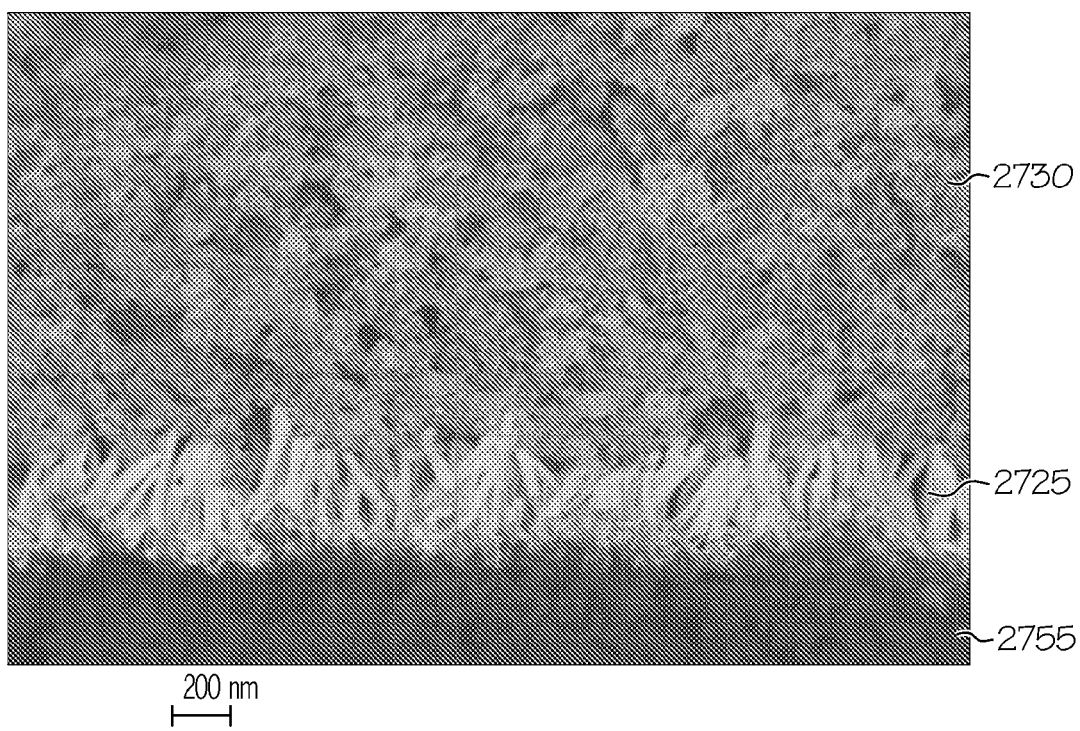
Figure 31A:
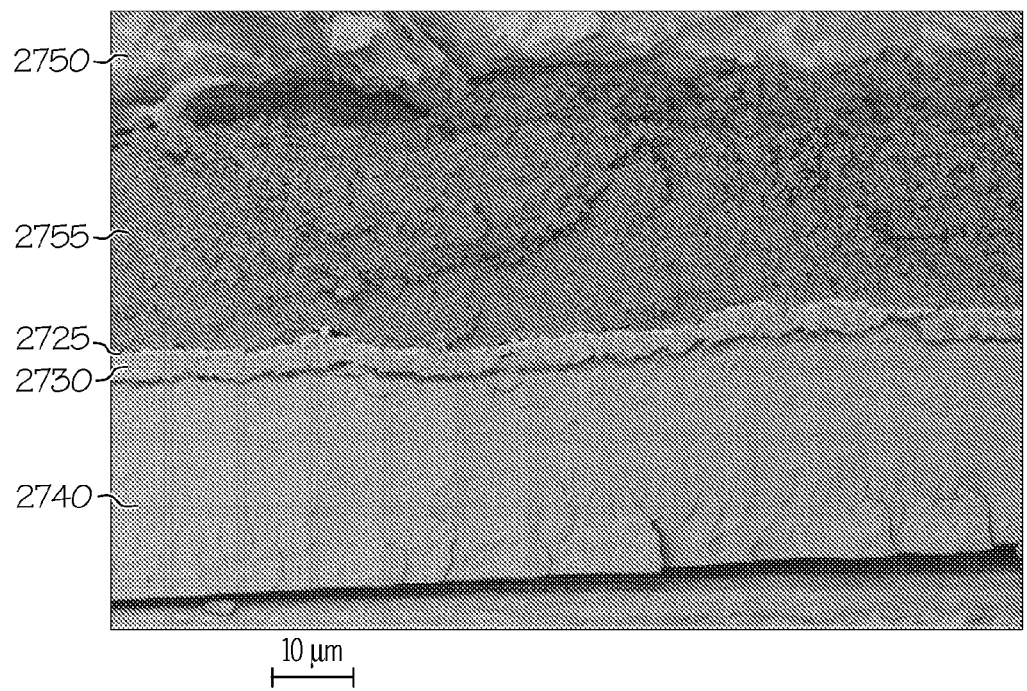
FIGS. 31A-B are SEM images of the cross-sections of MEAs made using the catalyst coated diffusion media of FIG. 30.
Figure 31B:
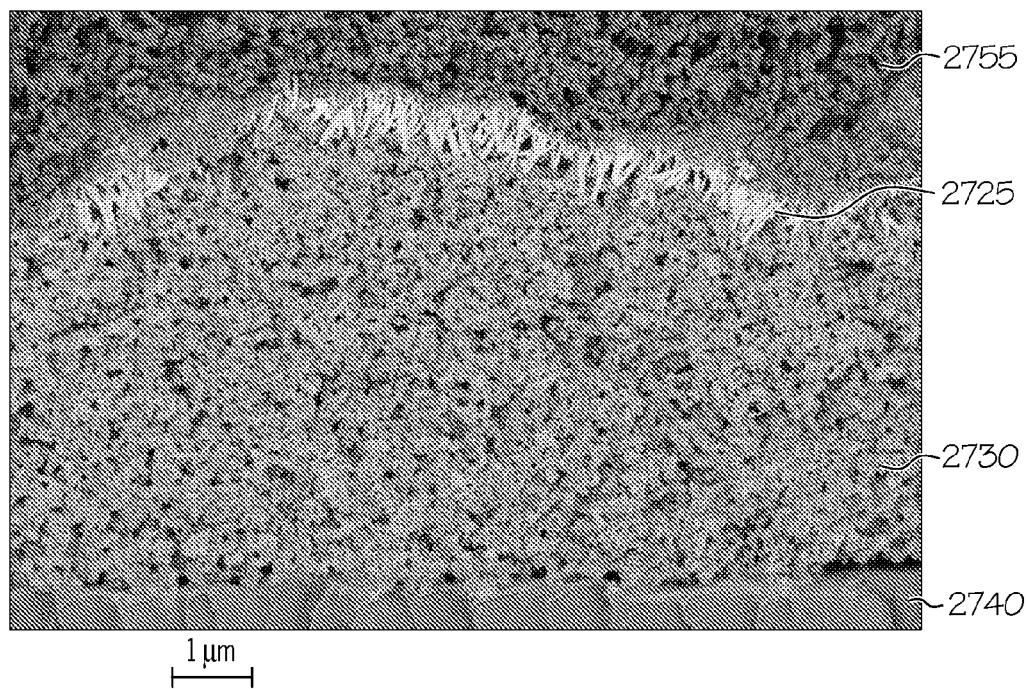

FIGS. 30A-B show a CCDM with the MRC 105 carbon fiber layer 2750, microporous layer 2755, nanostructured thin catalytic layer 2725, and Pt/Vulcan and ionomer mixture layer 2730. FIGS. 31A-B show the SEM images of the MEA prepared by hot pressing the finished CCDM from FIG. 30 against a DuPont Nation® NRE211 PEM 2740. The NSTF layer 2725 is now positioned between MPL 2755 and the Pt/Vulcan intermediate layer 2730.

Figure 32A:
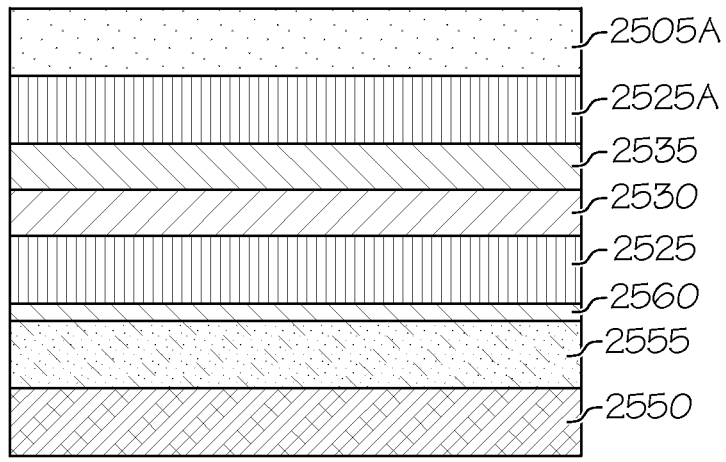
FIGS. 32A-D are an illustration of one embodiment of a general method of fabricating a catalyst coated diffusion media made with two nanostructured thin catalytic layers.
Figure 32B:
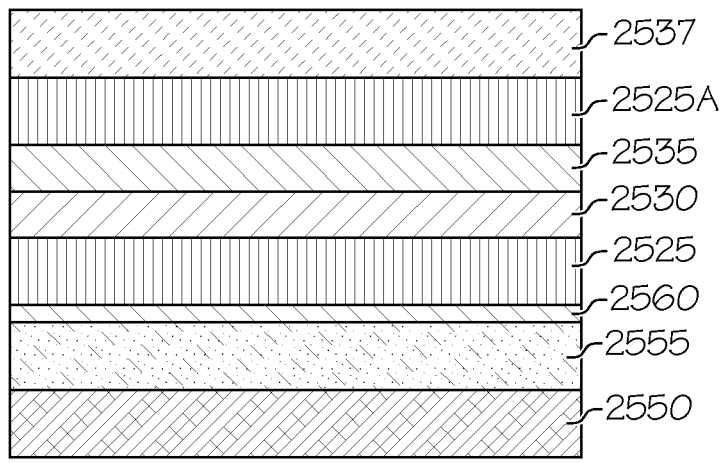
Figure 32C:
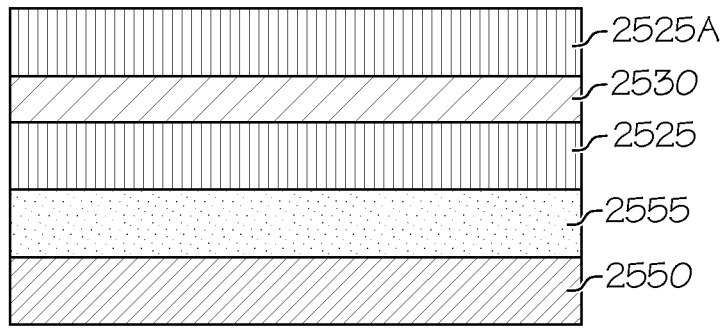
Figure 32D:
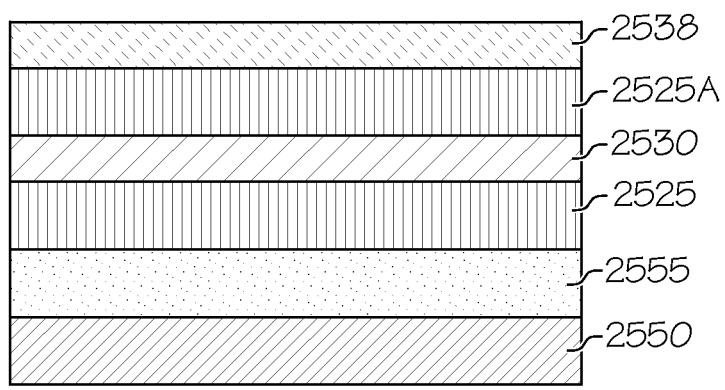

CCDM having two or more nanostructured thin catalytic layers can be made using similar process to that described in FIG. 3. As shown in FIGS. 32A-D, starting with composite as FIG. 26D, the bonding layer 2560 and the adhesive in the MPL and CFP are not removed, an intermediate layer 2530 is deposited on the nanostructured thin catalytic layer 2525 and additional temporary adhesive is coated on top of the intermediate layer 2530 to form a new bonding layer 2535. The intermediate layer can include a temporary adhesive and one or more of ionomer, conductive particles including, but not limited to, carbon powder, carbon fibers; catalyst; titanium dioxide; silica; nanofibers; and nanotubes. The donor decal of FIG. 1D, having the nanostructured thin catalyst layer 2525A on the porous ePTFE substrate 2505A, was hot pressed against bonding layer 2535 (105° C., 1.4 MPa, and 4 minutes) to form a composite structure. The porous substrate 2505A was removed as shown in FIG. 32B, and a cleaning solution 2537 was applied to remove the adhesive layer 2535, 2560 and adhesives in the intermediate layer 2530, MPL 2555, and CFP 2550, leaving the structure shown in FIG. 32C. An ionomer solution is coated on top of the second nanostructured thin catalytic layer 2525A forming ionomer layer 2538. When the solution drains across the NSTF layers and the intermediate layer, a thin layer ionomer film will be formed on the particles in the intermediate layer and whiskers in the NSTF layers. The excess ionomer layer built up on top of NSTF layer 2525A will help improve contact between the PEM and the CCDM when it is made into an MEA.

EXAMPLE 8

Figure 33:
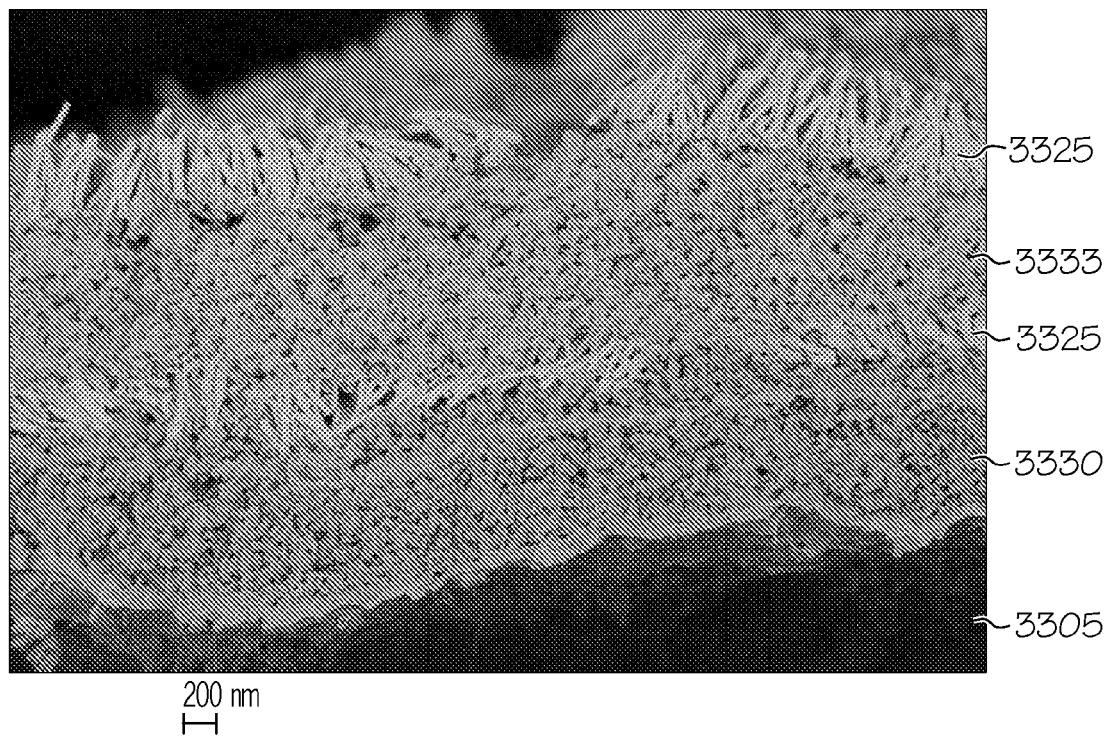
FIG. 33 is an SEM image of the cross-sections of embodiments of the reconstructed electrode decal containing two nano structured thin catalyst layers using the donor decal of FIG. 1 and the alternative acceptor decal of FIG. 5.

FIG. 33 shows a reconstructed electrode decal made by combining the donor decal from FIG. 1D and the acceptor decal of FIG. 5C, which results in a reconstructed electrode having two nanostructured thin catalytic layers 3325, 3325 and two intermediate layers 3330, 3330, one of carbon and one of carbon/Pt. After peeling off the porous substrate of the donor decal and removing the temporary adhesive layers by washing, the reconstructed electrode decal can be used to prepare either a CCM by compressing against a PEM, or a CCDM by transferring to a pretreated diffusion media as shown in FIG. 25.

Discussion of Results

Figure 34:
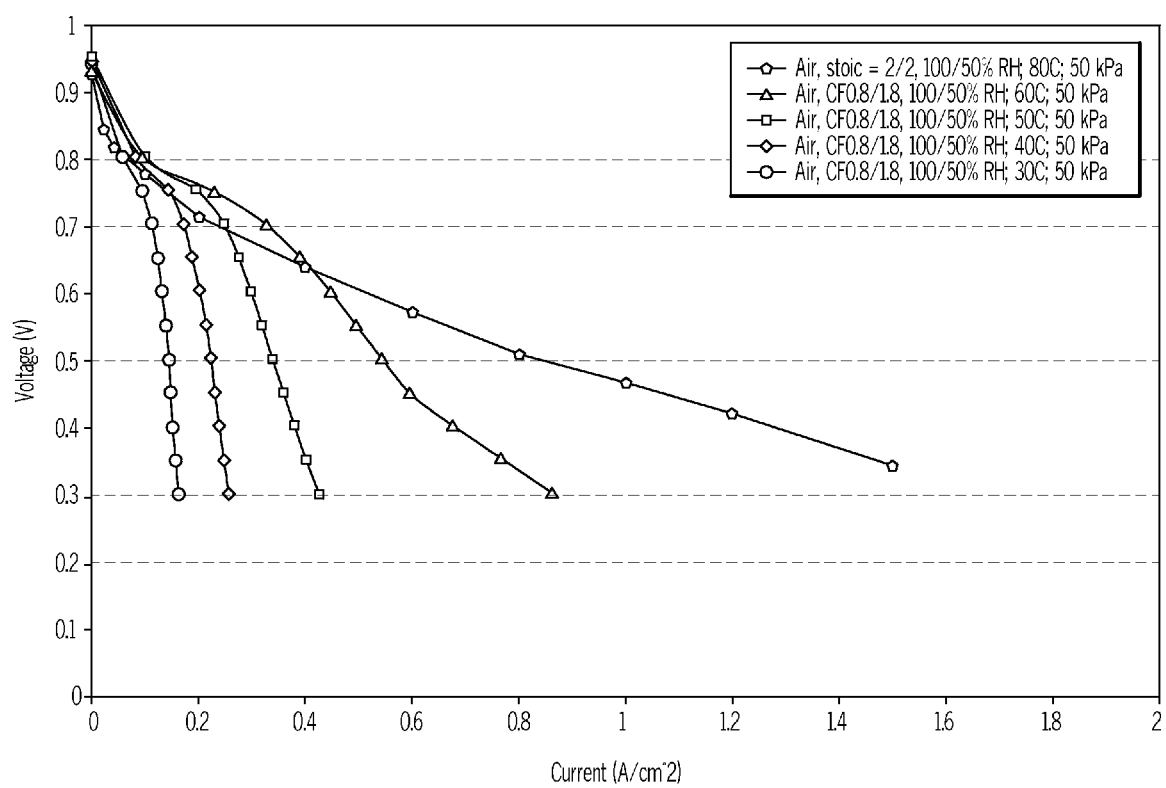
FIG. 34 is a graph showing the fuel cell performance of a prior art membrane electrode assembly by directly transferring the nanostructured thin catalytic layer (0.15 mg Pt/cm$^2$) to the PEM from the carrying substrate at various temperatures.
Figure 35:
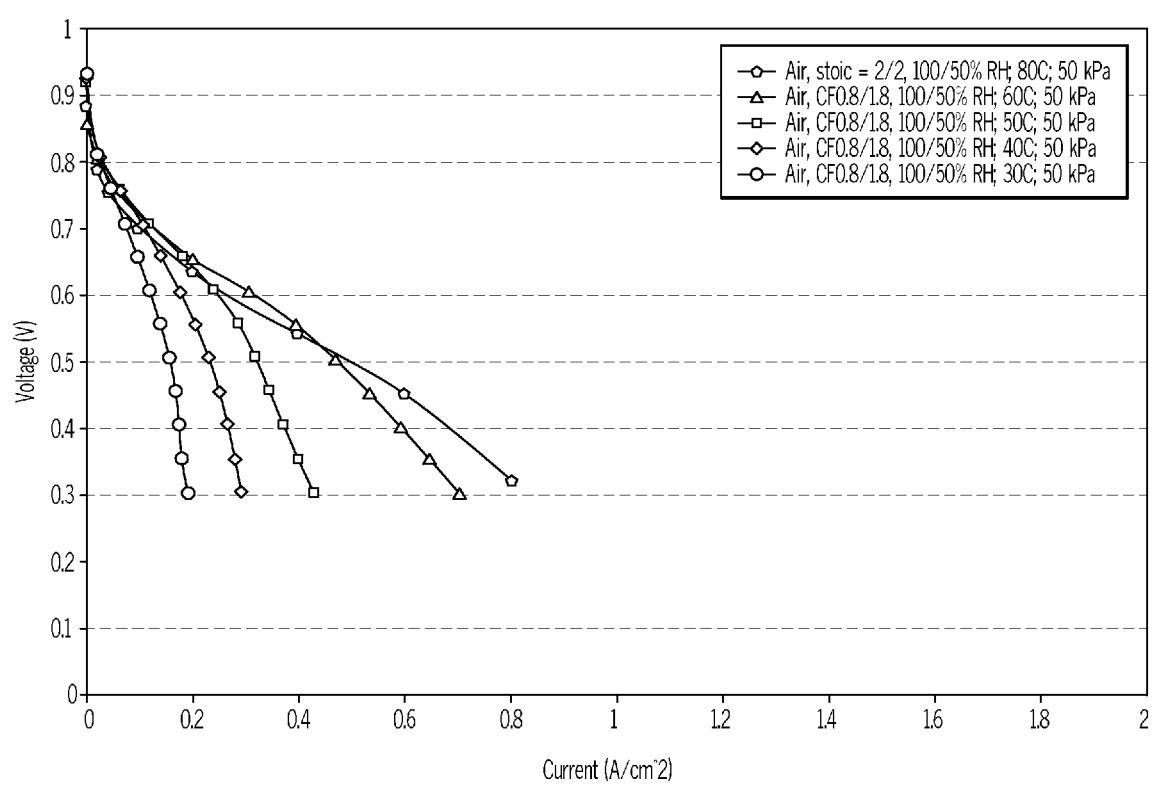
FIG. 35 is a graph showing the fuel cell performance of a prior art membrane electrode assembly by directly transferring the nanostructured thin catalytic layer (0.05 mg Pt/cm$^2$) to the PEM from the carrying substrate at various temperatures.
Figure 36:
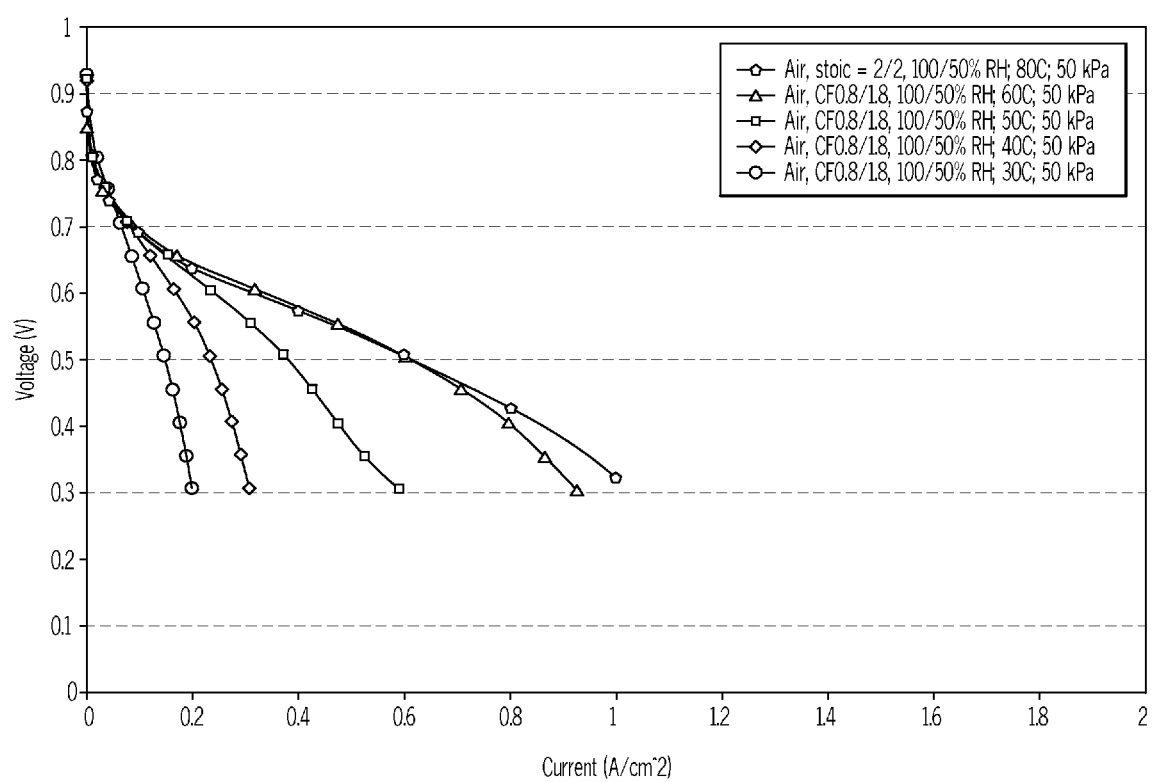
FIG. 36 is a graph showing the fuel cell performance of a catalyst coated membrane based membrane electrode assembly shown in FIG. 12, containing one nanostructured thin catalytic layer (0.05 mg Pt/cm$^2$) at various temperatures.
Figure 37:
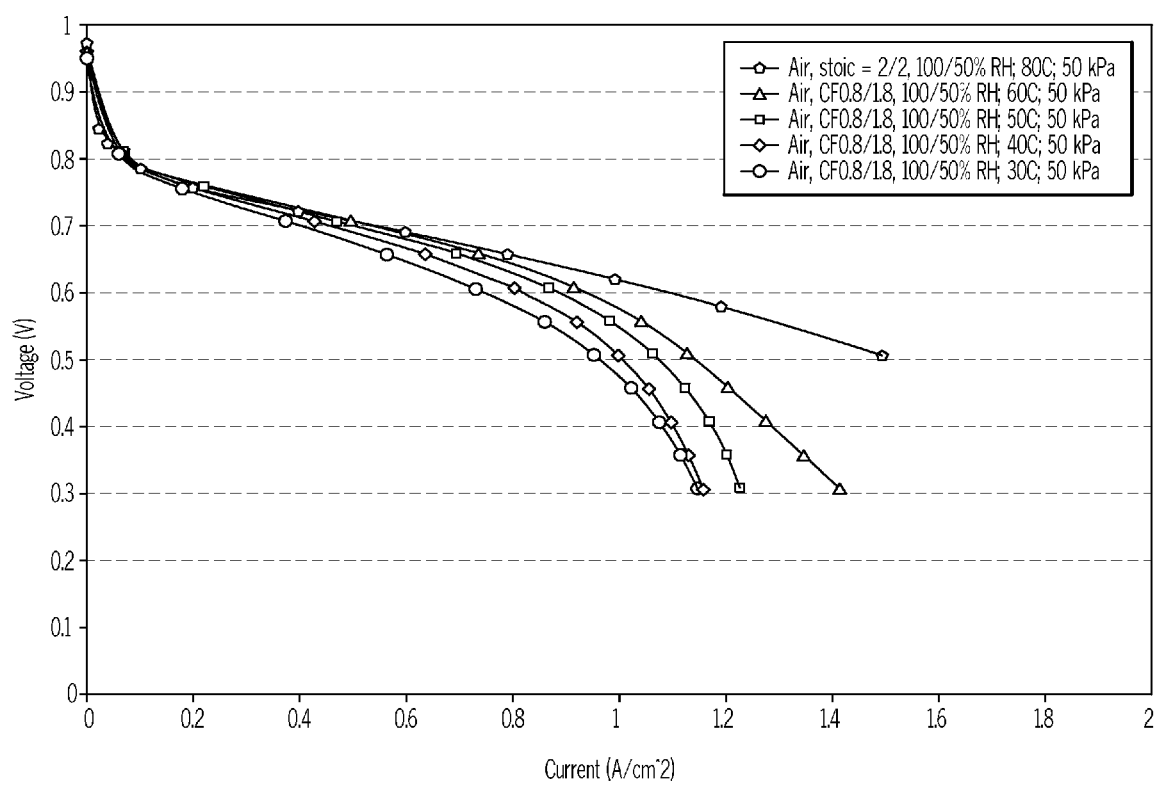
FIG. 37 is a graph showing the fuel cell performance of a catalyst coated membrane based membrane electrode assembly shown in FIG. 18, containing a nanostructured thin catalytic layer (0.05 mg Pt/cm$^2$) and a layer of Pt/C catalyst (0.05 mg Pt/cm$^2$) at various temperatures.
Figure 38:
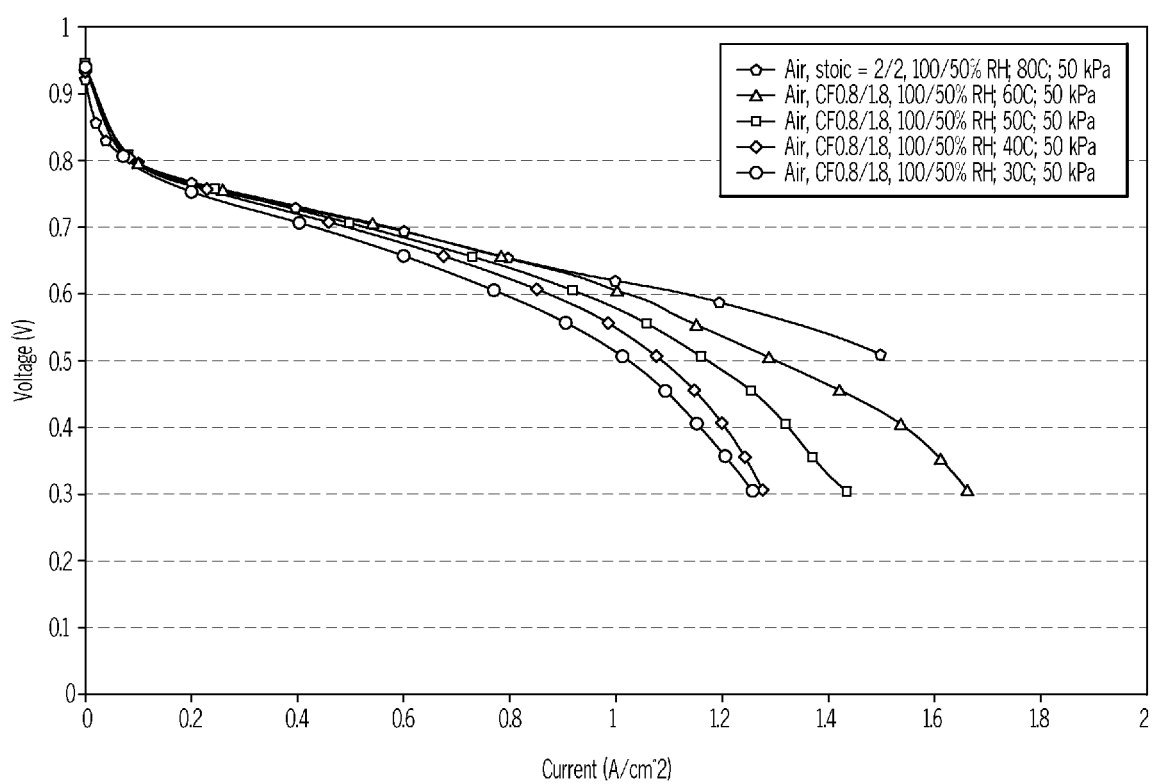
FIG. 38 is a graph showing the fuel cell performance of a catalyst coated membrane based membrane electrode assembly shown in FIG. 24, containing the two nanostructured thin catalytic layers and (2×0.05 mg Pt/cm$^2$) and a layer of Pt/C catalyst (0.05 mg Pt/cm$^2$) at various temperatures.

FIG. 34 shows the performance of an MEA made using a nanostructure thin film electrode of the prior art made by transferring the 3M NSTF catalyst directly from the polyimide carrying substrate to the 32 micron 3M proton exchange membrane for comparison. The Pt loading of the 3M NSTF catalytic layer was 0.15 mg Pt/cm². FIG. 35 shows the performance of an MEA made using a nanostructure thin film electrode of the prior art made by transferring the 3M NSTF catalyst directly from the carrying substrate to the Nafion® NRE211 proton exchange membrane for comparison. The Pt loading of the 3M NSTF catalytic layer was 0.05 mg Pt/cm². FIG. 36 shows the performance of an MEA made using the reconstructed electrode containing the 3M NSTF catalyst layer on ePTFE decal of Example 1 which was fabricated with DuPont Nafion® DE2020 ionomer and Nafion® NRE211 proton exchange membrane. FIG. 37 shows the performance of an MEA made using the reconstructed electrode containing the 3M NSTF catalytic layer (0.05 mg Pt/cm²) on ePTFE decal of Example 3 which was also fabricated with DuPont Nafion® DE2020 ionomer and Nafion® NRE211 proton exchange membrane. The intermediate layer between the NSTF catalytic layer and the membrane was 0.05 mg Pt/cm² TKK TEC10V50E Pt/Vulcan catalyst mixed with DuPont Nafion® DE2020 ionomer which was about 1 micron thick. FIG. 38 shows the performance of an MEA made using the reconstructed electrode containing two 3M NSTF catalyst layers (0.05 mg Pt/cm² in each layer) on ePTFE decal of Example 5 which was also fabricated with DuPont Nafion® DE2020 ionomer and Nafion® NRE211 proton exchange membrane. The intermediate layer between the two NSTF catalytic layers was 0.05 mg Pt/cm² TKK TEC10V50E Pt/Vulcan catalyst mixed with DuPont Nafion® DE2020 ionomer which was about 1 micron thick. As shown in FIG. 34-38, these MEAs were tested at various temperatures with the same cell inlet relative humidity at all tested temperatures, 100% for the anode side and 50% for the cathode side.

The reconstructed 3M NSTF electrode of Example 1 showed the same HAD (hydrogen adsorption/desorption) area (greater than or equal to 10 m²/g Pt after a break-in protocol) as the prior art MEA made by compressing the 3M NSTF catalyst layer directly on the proton exchange membrane. All of the reconstructed electrodes containing the nanostructured thin catalytic layers showed similar HAD areas when the scan was run to 0.6V and 1.1V versus SHE reference electrode during cyclovoltammetry measurements. It indicates that no contaminants were introduced into the reconstructed electrode containing the nanostructure thin catalytic layer because most of the contaminants would be oxidized at 1.1V if present and that would have resulted in an increased HAD area.

As it can be seen in FIG. 34 and FIG. 35, the performance of the electrode fabricated with the prior art method was very poor at low temperatures, which represents high humidity operating conditions.

For the performance of the reconstructed electrode of Example 1, by cleaning the residual perylene red layer, inverting the whisker layer, and adding some ionomer into the whisker matrix as shown in FIG. 36, there was some performance improvement compared to the electrode fabricated with the prior art as shown in FIG. 35 at the same Pt loading (0.05 mg Pt/cm²).

A significant improvement is demonstrated in FIG. 37 (Example 3) compared to FIG. 34 when a 1 micron thick layer of Pt/Vulcan catalyst (0.05 mg Pt/cm$^2$) mixed with ionomer was added between the 3M NSTF catalytic layer (0.05 mg Pt/cm$^2$) and the membrane with ionomer added to both the whisker layer and the Pt/Vulcan catalyst layer. Good performance was observed across the entire temperature range, from wet to dry operating conditions. It should be noted that the total Pt loading (NSTF+Pt/Vulcan) of Example 3 is only 0.10 mg Pt/cm$^2$, which is lower than the prior art MEA in FIG. 34 (0.15 mg Pt/cm$^2$). Further improvement was observed as shown in FIG. 38 (Example 5) for an electrode containing two layers of NSTF and an intermediate Pt/Vulcan layer between them across all of the testing temperatures. The total Pt loading (2xNSTF+Pt/Vulcan) of Example 5 is 0.15 mg Pt/cm$^2$, which is the same as the prior art MEA in FIG. 34 (0.15 mg Pt/cm$^2$).

Figure 39:
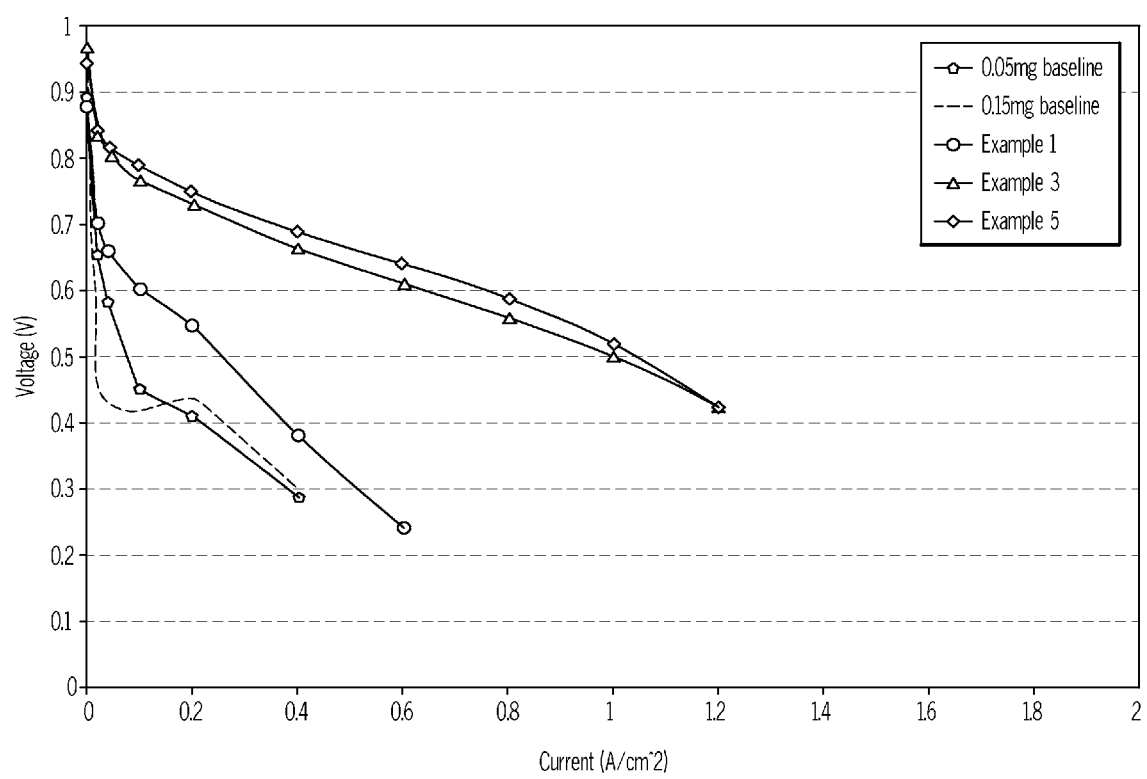
FIG. 39 is a graph showing the comparison of the fuel cell performance of catalyst coated membrane based membrane electrode assemblies shown in FIG. 12, FIG. 18, and FIG. 24, and the two prior art MEAs (at 0.05 mg Pt/cm$^2$ and 0.15 mg Pt/cm$^2$ loading) under a dry testing condition.
Figure 40:
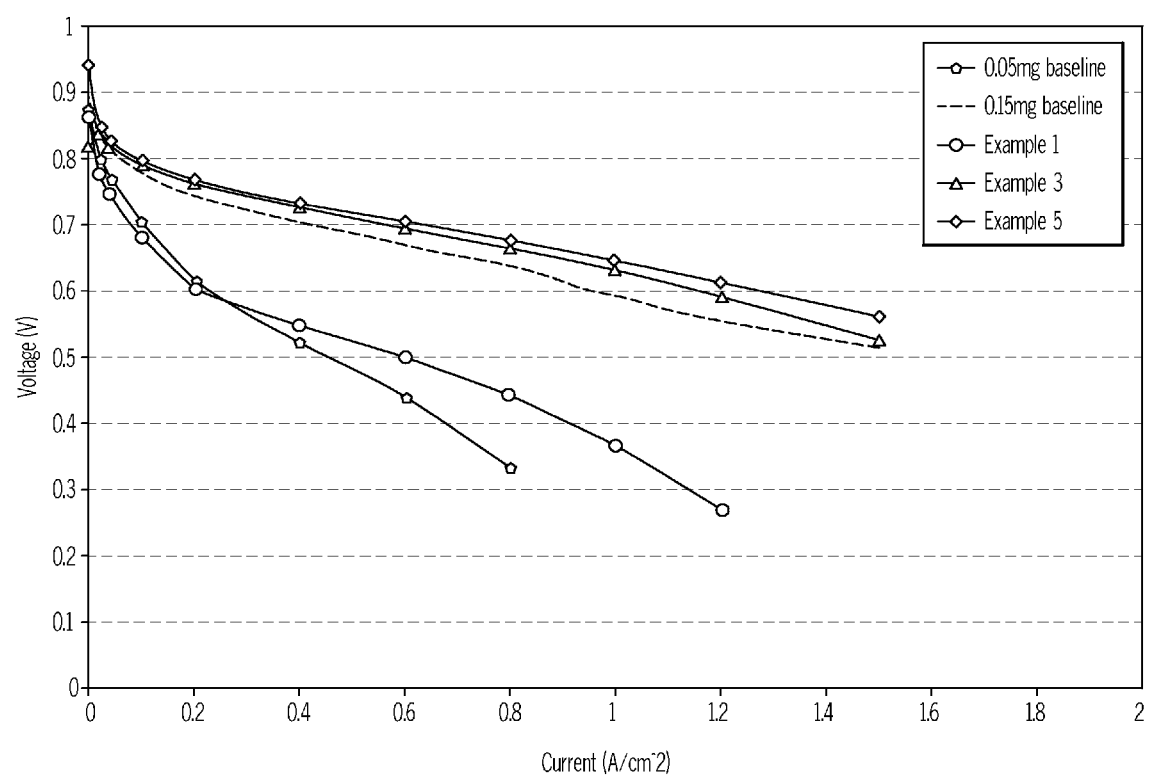
FIG. 40 is a graph showing the comparison of the fuel cell performance of catalyst coated membrane based membrane electrode assemblies shown in FIG. 12, FIG. 18, and FIG. 24, and the two prior art MEAs (at 0.05 mg Pt/cm$^2$ and 0.15 mg Pt/cm$^2$ loading) under a wet testing condition.

FIG. 39 shows the performance comparison of the two prior art MEAs as shown in FIG. 34 and FIG. 35, Example 1, Example 3, and Example 5 under a dry testing condition. The cell was tested at 80° C., and the Anode and Cathode inlet RH were kept at 30% and 10%, respectively. FIG. 40 compares the performance of the two prior art MEAs as shown in FIG. 34 and FIG. 35, Example 1, Example 3, and Example 5 under a wet testing condition. The cell was also tested at 80° C., but the Anode and Cathode inlet RH were both kept at 100%.

As it can be seen, Example 5 outperformed the other samples under both wet and dry testing conditions. Example 3 also showed very good performance considering that the total Pt loading is about ⅔ that of Example 5. The performance of the two prior art MEAs and Example 1 was much lower. The results clearly show the benefits of adding an additional Pt/C catalyst intermediate layer to increase the water storage capacity and thus improve the fuel cell performance with similar and even lower total Pt loading.

Figure 41:
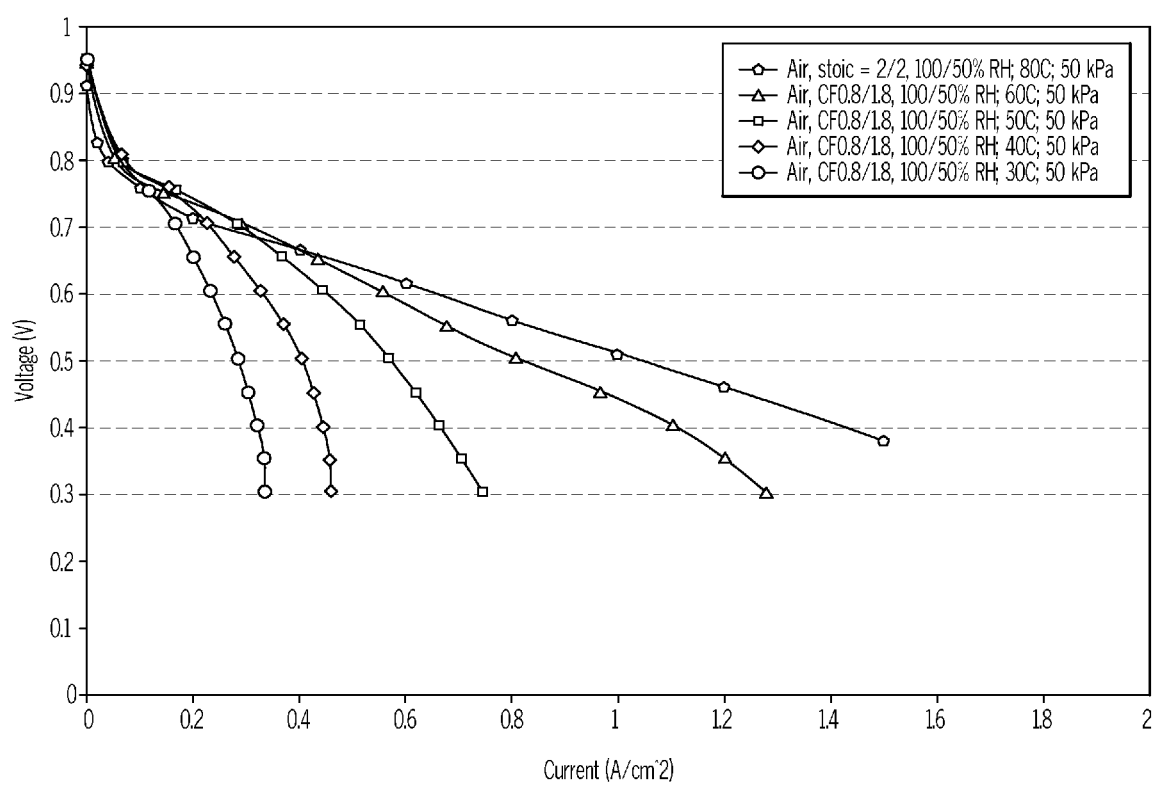
FIG. 41 is a graph showing the fuel cell performance of a catalyst coated diffusion media based membrane electrode assembly shown in FIG. 29, at various temperatures.
Figure 42:
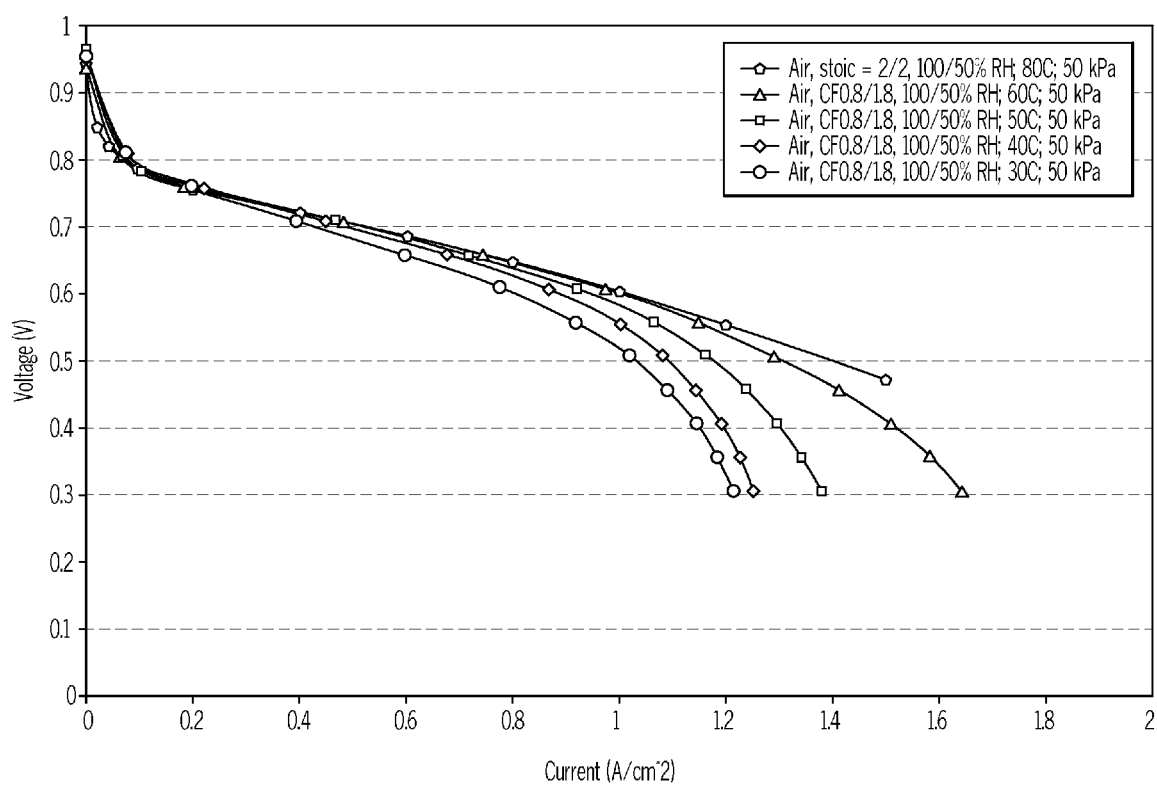
FIG. 42 is a graph showing the fuel cell performance of a catalyst coated diffusion media based membrane electrode assembly shown in FIG. 31, at various temperatures.

FIG. 41 shows the performance of an MEA made using the reconstructed CCDM electrode containing the 3M NSTF catalyst layer (0.15 mg Pt/cm$^2$) on a microporous layer coated MRC 105 gas diffusion media of Example 6 which is fabricated with DuPont Nafion® DE2020 ionomer and Nafion® NRE211 proton exchange membrane. FIG. 42 shows the performance of an MEA made using the reconstructed CCDM electrode containing the 3M NSTF catalyst layer (0.10 mg Pt/cm$^2$) and an intermediate Pt/C catalyst layer (0.05 mg Pt/cm$^2$) on a microporous layer coated MRC 105 gas diffusion media of Example 7 which is fabricated with DuPont Nafion® DE2020 ionomer and Nafion® NRE211 proton exchange membrane. The layer between the NSTF catalytic layer and the membrane was 0.05 mg Pt/cm$^2$ TKK TEC10V50E Pt/Vulcan catalyst mixed with DuPont Nafion® DE2020 ionomer which was about 1 micron thick, which makes the total Pt loading on this electrode 0.15 mg Pt/cm$^2$ as well. For the performance of the reconstructed CCDM based MEA of Example 6 as shown in FIG. 41, we can see the improved performance at low temperatures and comparable performance at high temperatures when compared to the electrode fabricated with the prior art CCM based MEA as shown in FIG. 34 at the same Pt loading (0.15 mg Pt/cm$^2$).

A significant improvement was demonstrated in FIG. 42 when a 1 micron thick layer of Pt/Vulcan catalyst mixed with ionomer was added between the 3M NSTF catalytic layer and the membrane with ionomer added to both the whisker layer and the Pt/Vulcan catalyst layer. Good performance was observed across the entire temperature range, from wet to dry operating conditions. It should be noted that performance of CCDM based Example 7 is very similar to the performance of CCM based Example 3 and Example 5 as shown in FIG. 37 and FIG. 38, respectively. The MEA structure is essentially the same for Example 3 and Example 7 even though they were prepared via CCM and CCDM method, respectively.

The various embodiments of the processes take advantage of the uniformly distributed catalyst or distributed in a desirable pattern on the carrying substrate produced using prior art processes. These embodiments avoid re-dispersing the nanostructured catalysts. They allow further cleaning of the catalyst layer (e.g., removing the residual materials used to produce the nanostructure supports, such as non crystallized perylene red backing of the 3M NSTF catalyst layer or residual catalyst or materials to fabricate the carbon nanotubes or nanofibers). Additional components or layers can be added into the nanostructured thin catalytic layer by coating on the stripped nanostructured thin catalyst layer on the porous transfer substrate or pre-coating the porous transfer substrate with a mixture of particles and adhesive. Since all of the processes are carried out on the porous transfer substrate, this invention is well suited for a continuous process and mass production.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a catalyst coated diffusion media comprising:
   providing an electrode decal comprising a carrying substrate with a nanostructured thin catalytic layer thereon, the nanostructured thin catalytic layer having a first surface and a second surface, the first surface of the nanostructured thin catalytic layer adjacent the carrying substrate;
   providing a porous transfer substrate with an adjacent adhesive layer;

adhering the second surface of the nanostructured thin catalytic layer adjacent to the adhesive layer to form a composite structure;

removing the carrying substrate from the composite structure such that a residual layer formed on the first surface of the nanostructured thin catalytic layer of the electrocatalyst decal becomes exposed; and removing the adhesive layer from the composite structure and further removing the residual layer from the composite structure to form a reconstructed electrode decal comprising the porous transfer substrate and the nanostructured thin catalytic layer, wherein the second surface of the nanostructured thin catalytic layer is adjacent to the porous transfer substrate;

providing a gas diffusion media layer comprising a conductive porous substrate and a microporous layer such that the microporous layer is adjacent to the first surface of the nanostructured thin catalytic layer;

applying a bonding layer adjacent to the microporous layer, the first surface of the nanostructured thin catalytic layer, or both such that the first surface of the nanostructured thin catalytic layer is adjacently adhered to the microporous layer with the bonding layer;

removing the porous transfer substrate; and removing at least a portion of the bonding layer;

to form the catalyst coated diffusion media comprising the conductive porous substrate, the microporous layer, and the nanostructured thin catalytic layer adjacent to the microporous layer on a side opposite the conductive porous substrate.

2. The method of claim 1 further comprising coating a solution onto the nanostructured thin catalytic layer after removing the carrying substrate and at least the portion of the bonding layer, the solution forming an additional layer on the first surface of the nanostructured thin catalytic layer.

3. The method of claim 2 wherein the solution includes at least one of an ionomer, conductive particles, carbon powder, carbon fibers, catalyst, titanium dioxide, silica, nanofibers, or nanotubes.

4. The method of claim 1 wherein applying the bonding layer comprises applying a solution comprising an adhesive, an ionomer, or both.

5. The method of claim 4 wherein the solution further comprises at least one of conductive particles, carbon powder, carbon fibers, catalyst, titanium dioxide, silica, nanofibers, or nanotubes.

6. The method of claim 4 wherein the solution further comprises a solvent which wets the microporous layer.

7. The method of claim 1 wherein the bonding layer is adjacent to the microporous layer, and wherein applying the bonding layer comprises applying a solution comprising polyvinyl alcohol, water, and an alcohol.

8. The method of claim 1 wherein the electrode decal further comprises an additional layer comprising at least one of an ionomer, conductive particles, carbon powder, carbon fibers, catalyst, titanium dioxide, silica, nanofibers, or nanotubes, wherein the additional layer is positioned between the porous transfer substrate and the nanostructured thin catalytic layer, or on the nanostructured thin catalytic layer on the side opposite the porous transfer substrate.

9. The method of claim 1 wherein the adhesive layer further comprises at least one of an ionomer, conductive particles, carbon powder, carbon fibers, catalyst, titanium dioxide, silica, nanofibers, or nanotubes.

10. The method of claim 1 wherein an additional layer is coated on the nanostructured thin catalytic layer on the reconstructed electrode decal after the carrying substrate and the adhesive are removed, wherein the additional layer comprises at least one of an ionomer, conductive particles, carbon powder, carbon fibers, catalyst, titanium dioxide, silica, nanofibers, or nanotubes.

11. The method of claim 1 wherein there is an additional layer between the porous transfer substrate and the adjacent adhesive layer, wherein the additional layer comprises at least one of an ionomer, conductive particles, carbon powder, carbon fibers, catalyst, titanium dioxide, silica, nanofibers, or nanotubes.

12. The method of claim 1 wherein the electrode decal includes at least two nanostructured thin catalytic layers.

13. The method of claim 1 wherein the nanostructured thin catalytic layer is adhered adjacent to the microporous layer using a hot press process.

* * * * *